(12) United States Patent
Chigira et al.

(10) Patent No.: US 6,338,199 B1
(45) Date of Patent: *Jan. 15, 2002

(54) SENSOR

(75) Inventors: Tatsuo Chigira; Hiroshi Yamamoto, both of Yokohama; Masami Sugimori, Yamato; Susumu Sugiyama, Nagoya, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/046,953

(22) Filed: Mar. 24, 1998

(30) Foreign Application Priority Data

| | | |
|---|---|---|
| Mar. 25, 1997 | (JP) | 9-090048 |
| Mar. 25, 1997 | (JP) | 9-090049 |
| Mar. 25, 1997 | (JP) | 9-090050 |

(51) Int. Cl.$^7$ ................................................ A01Q 1/34
(52) U.S. Cl. ....................................... 33/318; 33/321
(58) Field of Search ........................ 33/300, 318, 328, 33/324, 461, 126

(56) References Cited

U.S. PATENT DOCUMENTS 3,701,200 A * 10/1972 Hojo ........................... 33/321
4,442,435 A * 4/1984 Kiryu et al. ................... 33/321
4,706,389 A * 11/1987 Eisenhammer ............... 33/318

FOREIGN PATENT DOCUMENTS

JP      7-92175      4/1995

* cited by examiner

*Primary Examiner*—Bernard Roskoski
(74) *Attorney, Agent, or Firm*—Fitzpatrick, Cella, Harper & Scinto

(57) ABSTRACT

A sensor includes a plurality of weight portions which swivel, support parts each of which supports at one end a corresponding one of the plurality of weight portions in the same direction, and a driving part which supplies driving power to the support parts to swivel the plurality of weight portions. The driving part swivels at least one weight portion of the plurality of weight portions in a first direction and a remaining weight portion in a second direction opposite to the first direction so that the angular velocity about an axis parallel to a predetermined swivel locus of the at least one weight portion, excluding an acceleration component in the direction of the axis, can be detected from the difference between a deviation of a swivel locus of the at least one weight portion from the predetermined swivel locus and a deviation of a swivel locus of the remaining weight portion from a predetermined swivel locus thereof.

50 Claims, 21 Drawing Sheets

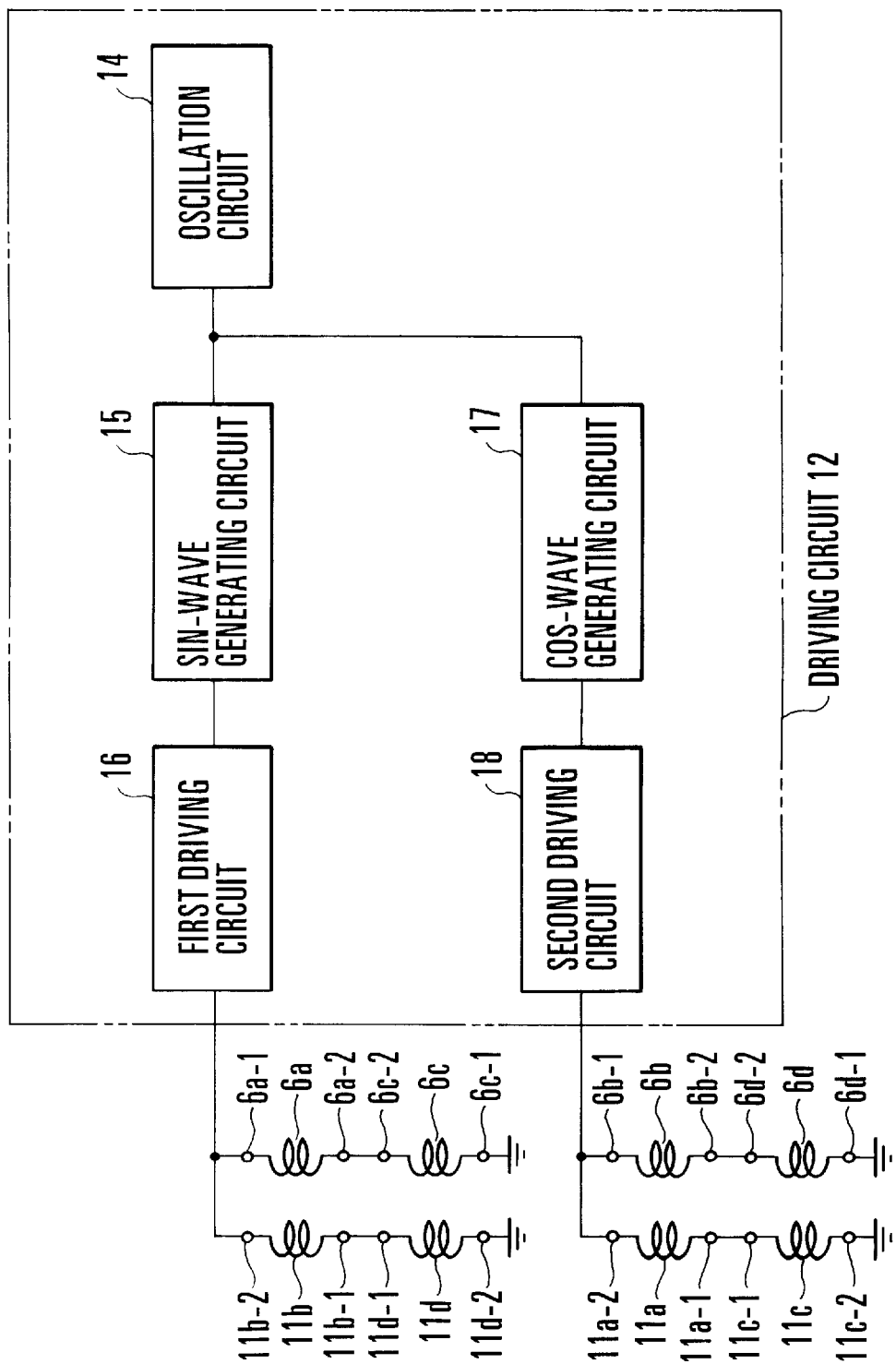

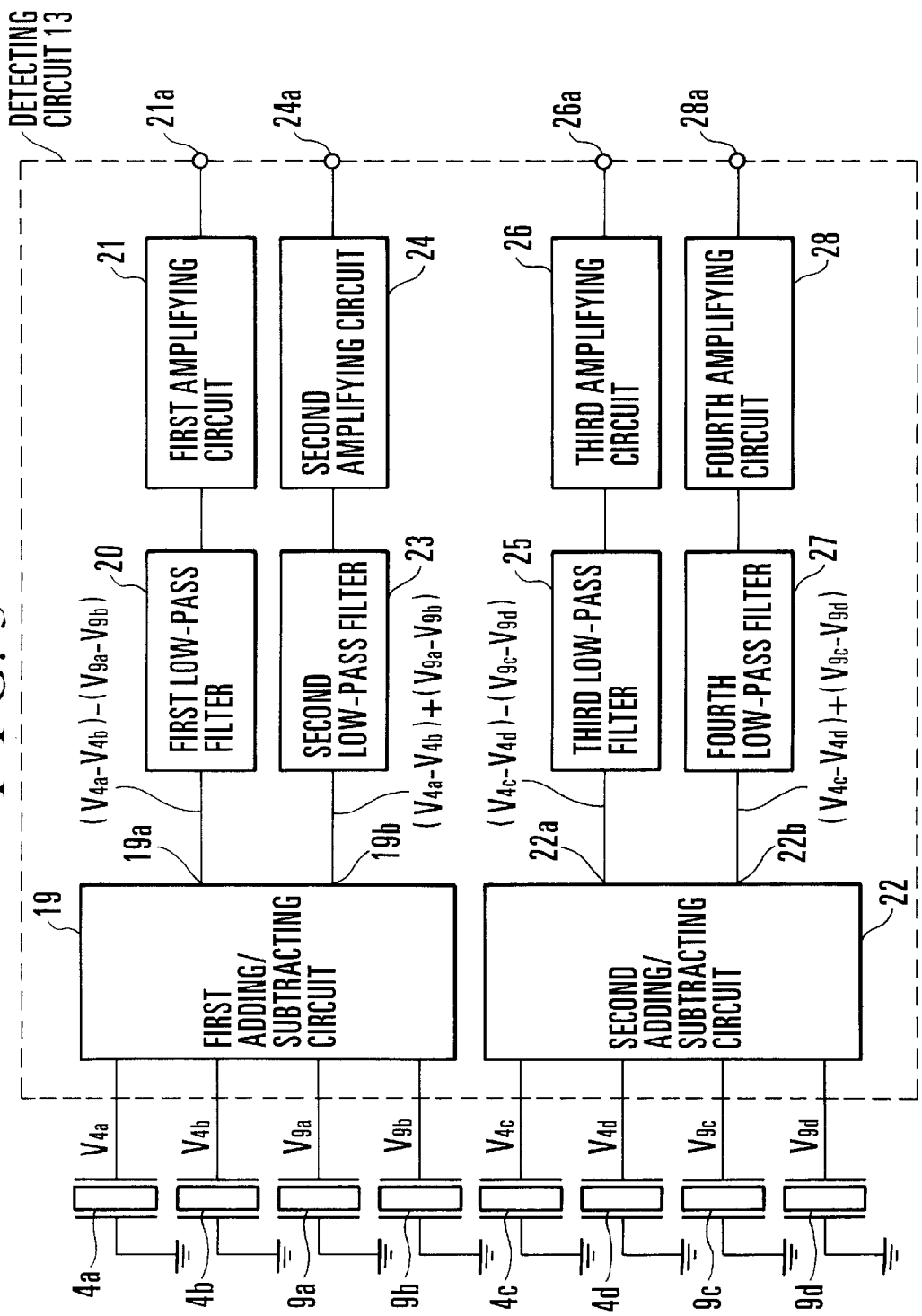

OSCILLATOR 2

OSCILLATOR 7

PIEZOELECTRIC ELEMENT OUTPUT
DURING STATIONARY STATE

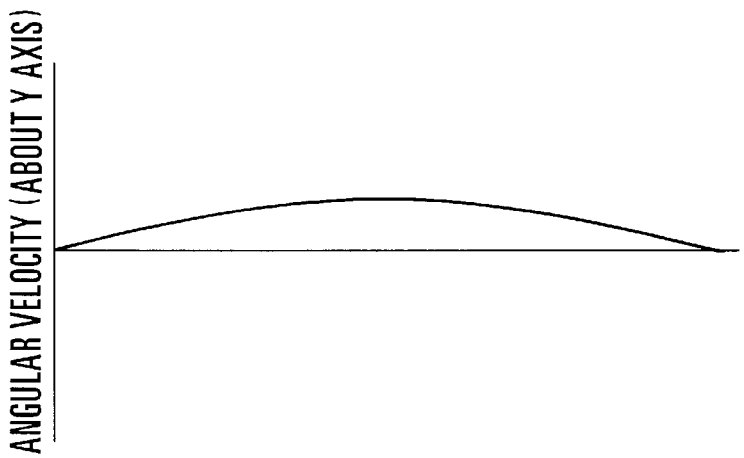
F I G. 9(a)
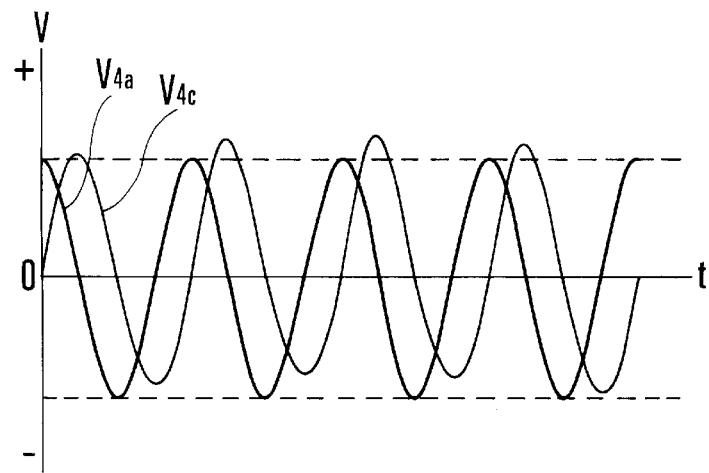
F I G. 9(b)
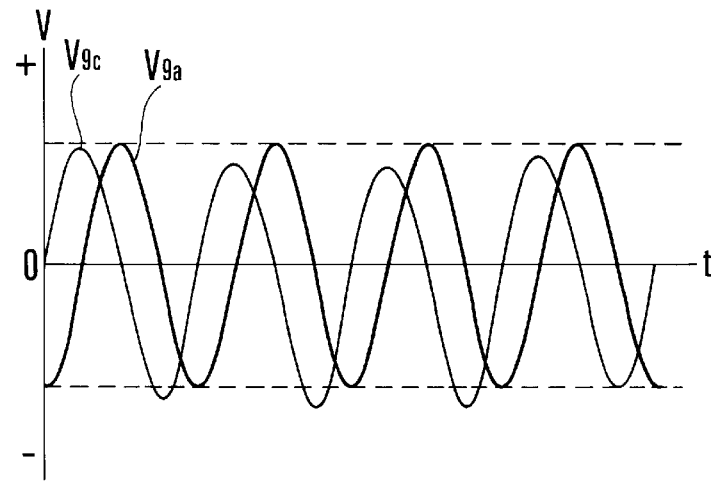
F I G. 9(c)

DURING APPLICATION OF ACCELERATION IN X-AXIS DIRECTION

DURING APPLICATION OF ACCELERATION IN Y-AXIS DIRECTION

DURING APPLICATION OF ANGULAR VELOCITY

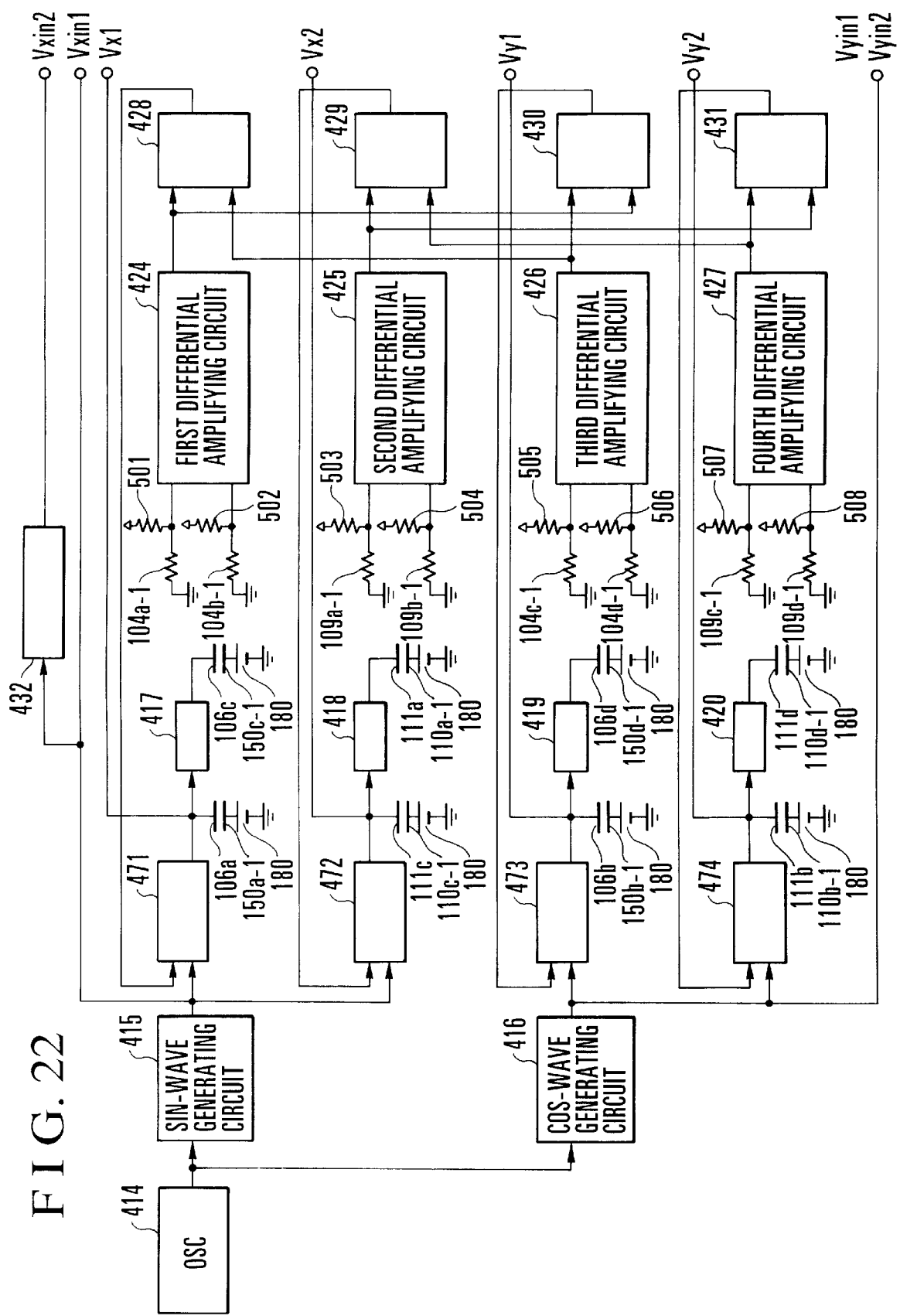

SENSOR

BACKGROUND OF THE INVENTION

1. Field of the Invention

The present invention relates to an improvement in a sensor for detecting the angular velocity and the acceleration which are applied to an apparatus.

2. Description of Related Art

Japanese Laid-Open Patent Application No. Hei 7-92175 has previously disclosed one type of gyrosensor for detecting angular velocities about two axes, which is suitable for use in an image-shake correcting system. The disclosed gyrosensor is an angular velocity sensor for detecting angular velocities about two axes by detecting whether the oscillation locus of an oscillator (or a plurality of oscillators), which is supported at one end (fixed at one end), is inclined by a Coriolis force, which is produced when an angular velocity is applied to the sensor while the oscillator is making a swivel motion.

However, since such angular velocity sensor has a structure in which the oscillator is provided with piezoelectric elements or one end of the oscillator having elasticity is fixed to a fixing member, the extent of miniaturization of the angular velocity sensor is limited. In addition, since the angular velocity sensor also has a structure in which two oscillators are fixed to the opposite sides of a common base and are made to swivel in the same direction, bulk micromachining is needed in the production of the angular velocity sensor by micromachining, so that time-consuming etching is needed and it is difficult in terms of cost to provide the aforesaid angular velocity signal as an angular velocity sensor for domestic use.

In addition, Japanese Laid-Open Patent Application No. Hei 7-92175 does not at all disclose a system for detecting an acceleration applied to the angular velocity sensor.

In addition, research in virtual reality has recently advanced and an announcement has been made of, for example, an application which detects the motion of a person through an angular velocity sensor and an acceleration sensor and visually displays an image corresponding to the motion detected. As a sensor for use with such application, it has been desired to develop a sensor capable of detecting not only angular velocities about two axes and accelerations in the directions of two axes, but also an angular velocity about, and an acceleration in the direction of, an axis extending in a direction perpendicular to the aforesaid mutually perpendicular two axes (an axis parallel to the longitudinal direction of the oscillator).

BRIEF SUMMARY OF THE INVENTION

An object of the present invention is to provide a sensor which can detect an angular velocity signal and/or an acceleration with high accuracy in spite of its reduced size and cost.

To achieve the above object, in accordance with one aspect of the present invention, there is provided a sensor which comprises a plurality of weight portions which swivel, support parts each of which supports at one end a corresponding one of the plurality of weight portions in the same direction, and a driving part which supplies driving power to the support parts to swivel the plurality of weight portions, the driving part swiveling at least one weight portion of the plurality of weight portions in a first direction and a remaining weight portion in a second direction opposite to the first direction so that an angular velocity about an axis parallel to a predetermined swivel locus of the at least one weight portion, excluding an acceleration component in the direction of the axis, can be detected from the difference between a deviation of a swivel locus of the at least one weight portion from the predetermined swivel locus and a deviation of a swivel locus of the remaining weight portion from a predetermined swivel locus thereof.

Other aspects of the present invention will become apparent from the following detailed description of preferred embodiments of the present invention, taken in conjunction with the accompanying drawings.

BRIEF DESCRIPTION OF THE SEVERAL VIEWS OF THE DRAWING

FIG. 2 is a block diagram showing the construction of a driving circuit of the sensor according to the first embodiment of the present invention;

FIG. 3 is a block diagram showing the construction of a detecting circuit of the sensor according to the first embodiment of the present invention;

FIGS. 9(a), 9(b) and 9(c) are views aiding in describing the output waveforms of the individual piezoelectric elements when an angular velocity about the Y axis is applied to the sensor of FIG. 1;

FIG. 22 is a block diagram showing the construction of a detecting circuit of a sensor according to a ninth embodiment of the present invention.

DETAILED DESCRIPTION OF THE INVENTION

Preferred embodiments of the present invention will be described below with reference to the accompanying drawings.

Figure 1:
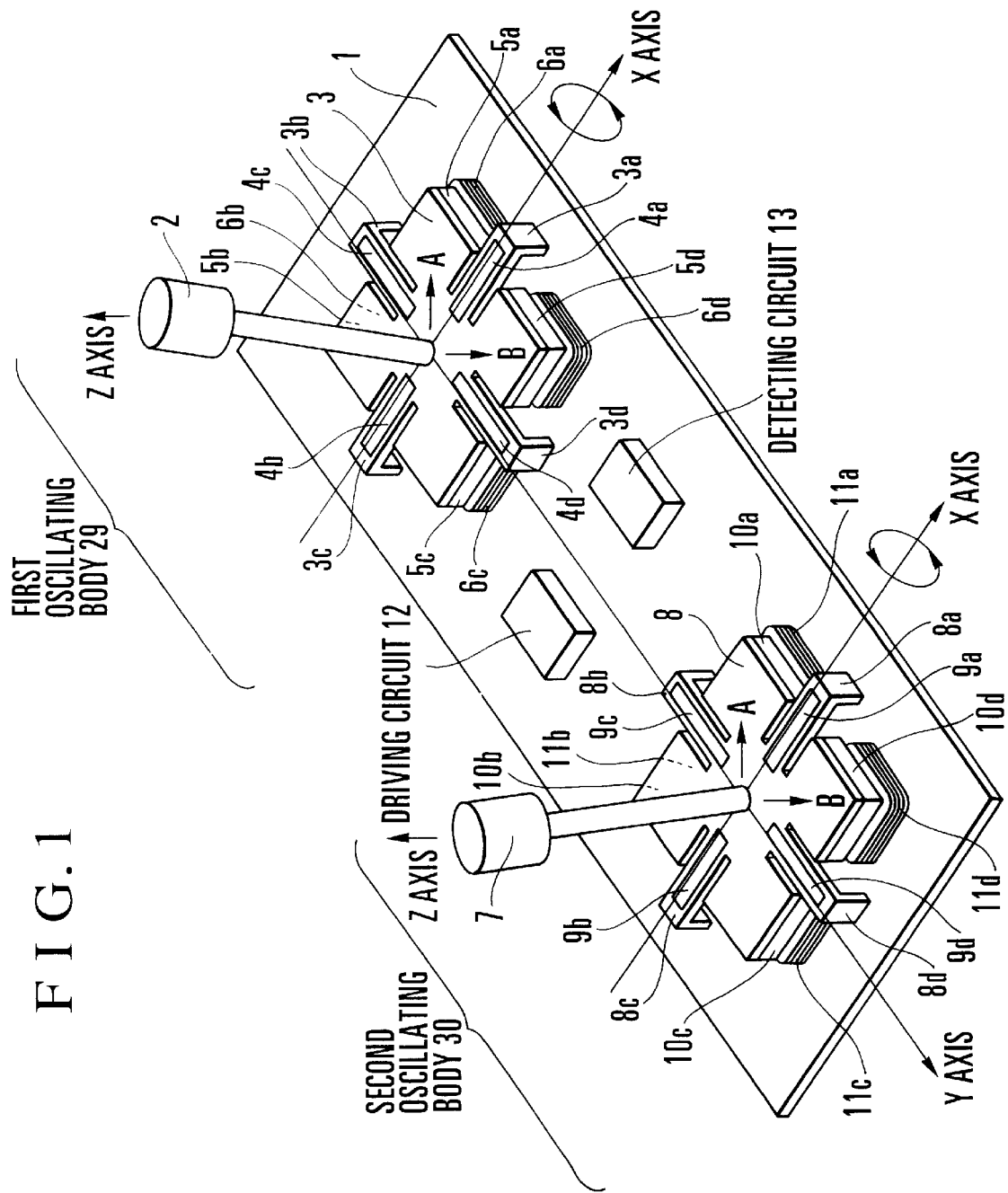
FIG. 1 is a diagrammatic perspective view showing the construction of a sensor according to a first embodiment of the present invention.

FIGS. 1 through 12(a), 12(b), 12(c) and 12(d) are views relating to a sensor according to a first embodiment of the present invention. FIG. 1 is a diagrammatic perspective view showing the mechanical construction of the sensor, FIG. 2 is a block diagram showing a driving circuit for causing an oscillator to make a swivel motion, and FIG. 3 is a block diagram showing a detecting circuit for detecting the inclination of the oscillator. FIGS. 4(a) and 4(b) through 12(a), 12(b), 12(c) and 12(d) will be referred to later.

The first embodiment of the present invention shown in FIGS. 1 through 12(a), 12(b), 12(c) and 12(d) is an example of a sensor in which each oscillator portion (oscillating body) includes parts worked by normal machining and is arranged in such a manner that an oscillator is caused to make a swivel motion by electromagnetic driving using coils and magnets and the inclination of the oscillator is detected by piezoelectric elements.

The first embodiment shown in FIG. 1 includes a substrate 1, a first oscillator 2, which constitutes a weight portion, a first oscillation base 3 having a plate-like shape, which elastically supports one end of the first oscillator 2, piezoelectric elements 4a to 4d, magnets 5a to 5d, coils 6a to 6d, a second oscillator 7, which constitutes a weight portion, a second oscillation base 8 having a plate-like shape, which elastically supports one end of the second oscillator 7, piezoelectric elements 9a to 9d, magnets 10a to 10d, coils 11a to 11d, a driving circuit 12 for causing each of the first oscillator 2 and the second oscillator 7 to make a swivel motion, and a detecting circuit 13 for detecting the inclination of each of the first oscillator 2 and the second oscillator 7 and detecting an angular velocity signal and an acceleration signal.

The substrate 1 is made from, for example, a ceramic substrate or a glass epoxy substrate, and a first oscillating body 29, a second oscillating body 30, the driving circuit 12 and the detecting circuit 13 are provided on the substrate 1. The first oscillating body 29 includes the first oscillator 2, the first oscillation base 3, the piezoelectric elements 4a to 4d, the magnets 5a to 5d and the coils 6a to 6d. The second oscillating body 30 includes the second oscillator 7, the second oscillation base 8, the piezoelectric elements 9a to 9d, the magnets 10a to 10d and the coils 11a to 11d. Furthermore, a power source terminal and a terminal through which to output an angular velocity signal and an acceleration signal are provided on the substrate 1, but neither of them is shown in FIG. 1.

The first oscillator 2 is formed, for example, by working brass by lathing, and is fixed to the first oscillation base 3 at its one end, as by press-fitting.

The first oscillation base 3 is made from, for example, a phosphor bronze plate, and has a flat portion of approximately square shape to which the magnets 5a to 5d are fixed, and first to fourth leg portions 3a, 3b, 3c and 3d which are respectively provided in the middle portions of four sizes of the square. Tip ends of the respective first to fourth leg portions 3a, 3b, 3c and 3d are fixed to the substrate 1.

Each of the first to fourth piezoelectric elements 4a to 4d is made of, for example, PZT (lead zirconate titanate), and has an approximately rectangular shape and is polarized in its thickness direction. The first to fourth piezoelectric elements 4a to 4d are fixed to the leg portions 3a, 3c, 3b and 3d of the first oscillation base 3 by adhesion, respectively.

The first and second piezoelectric elements 4a and 4b output a signal corresponding to an inclination of the first oscillator 2 in an X-axis direction, which is a first detecting-axis direction, while the third and fourth piezoelectric elements 4c and 4d output a signal corresponding to an inclination of the first oscillator 2 in a Y-axis direction, which is a second detecting-axis direction.

Each of the first to fourth magnets 5a to 5d is made from, for example, a ferrite-containing plastic magnet, and is magnetized in its thickness direction. The first to fourth magnets 5a to 5d are fixed to the first oscillation base 3 at the respective corners of the flat portion of approximately square shape by well-known means, such as adhesion, so that the pole of the surface of each of the magnets 5a to 5d that faces the substrate 1 is opposite to the pole of the surface of the adjacent one, for example, so that the surface of the first magnet 5a that faces the substrate 1 has the N pole, the surface of the second magnet 5b that faces the substrate 1 has the S pole, the surface of the third magnet 5c that faces the substrate 1 has the N pole, and the surface of the fourth magnet 5d that faces the substrate 1 has the S pole.

The first to fourth coils 6a to 6d are air-core coils, and are fixed to the substrate 1 by adhesion at positions opposite to the respective first to fourth magnets 5a to 5d. Each of the first to fourth coils 6a to 6d is shaped so that when they are fixed to the substrate 1 by adhesion, slight gaps are respectively formed between the first to fourth coils 6a to 6d and the surfaces of the first to fourth magnets 5a to 5d that face the substrate 1.

The second oscillator 7 is formed, for example, by working brass by lathing, and is fixed to the second oscillation base 8 at its one end, as by press-fitting.

The second oscillation base 8 is made from, for example, a phosphor bronze plate, and has a flat portion of approximately square shape to which the magnets 10a to 10d are fixed, and fifth to eighth leg portions 8a, 8b, 8c and 8d, which are respectively provided in the middle portions of four sizes of the square. Tip ends of the respective fifth to eighth leg portions 8a, 8b, 8c and 8d are fixed to the substrate 1.

Each of the fifth to eighth piezoelectric elements 9a, 9b, 9c and 9d is made of, for example, PZT, and has an approximately rectangular shape and is polarized in its thickness direction. The fifth to eighth piezoelectric elements 9a, 9b, 9c and 9d are fixed to the leg portions 8a, 8c, 8b and 8d of the second oscillation base 8 by adhesion, respectively.

The fifth and sixth piezoelectric elements 9a and 9b output a signal corresponding to the inclination of the second oscillator 7 in the X-axis direction, which is the first detecting-axis direction, while the seventh and eighth piezoelectric elements 9c and 9d output a signal corresponding to the inclination of the second oscillator 7 in the Y-axis direction, which is the second detecting-axis direction.

Each of the fifth to eighth magnets 10a, 10b, 10c and 10d is made from, for example, a ferrite-containing plastic magnet, and is magnetized in its thickness direction. The fifth to eighth magnets 10a, 10b, 10c and 10d are fixed to the second oscillation base 8 at the respective corners of the flat portion of approximately square shape by well-known means, such as adhesion, so that the pole of the surface of each of the magnets 10a to 10d that faces the substrate 1 is opposite to the pole of the surface of the adjacent one, for example, so that the surface of the fifth magnet 10a that faces the substrate 1 has the N pole, the surface of the sixth magnet 10b that faces the substrate 1 has the S pole, the surface of the seventh magnet 10c that faces the substrate 1 has the N pole, and the surface of the eighth magnet 10d that faces the substrate 1 has the S pole.

The fifth to eighth coils 11a, 11b, 11c and 11d are air-core coils, and are fixed to the substrate 1 by adhesion at positions opposite to the respective fifth to eighth magnets 10a, 10b, 10c and 10d. Each of the fifth to eighth coils 11a, 11b, 11c and 11d is shaped so that when they are fixed to the substrate 1 by adhesion, slight gaps are respectively formed between the fifth to eighth coils 11a, 11b, 11c and 11d and the surfaces of the fifth to eighth magnets 10a, 10b, 10c and 10d that face the substrate 1. In addition, each of the first to eighth coils 6a to 6d and 11a to 11d has first and second terminals, and is fixed to the substrate 1 so that if a current is made to flow through each of the coils 6a to 11d in the same direction, for example, from the first terminal to the second terminal, the same pole is produced on the side of each of the coils 6a to 11d that faces the corresponding one of the magnets 5a to 10d.

The first oscillator 2 and the second oscillator 7 have approximately the same resonant frequency in their bending directions.

In addition, the resonant frequency of the inclination-direction oscillation mode of the first oscillator 2 of the first oscillating body 29, which includes the first oscillator 2, the first oscillation base 3, the first to fourth magnets 5a to 5d and the first to fourth piezoelectric elements 4a to 4d, is selected to coincide with the aforesaid resonant frequency of the first oscillator 2 in the bending direction thereof. The setting of such resonant frequencies is effected by optimally setting the plate thickness of the first oscillation base 3 and the width and length of each of the leg portions 3a to 3d.

Similarly, the resonant frequency of the inclination-direction oscillation mode of the second oscillator 7 of the second oscillating body 30, which includes the second oscillator 7, the second oscillation base 8, the fifth to eighth magnets 10a to 10d and the fifth to eighth piezoelectric elements 9a to 9d, is selected to coincide with the aforesaid resonant frequency of the second oscillator 7 in the bending direction thereof. The setting of such resonant frequencies is effected by optimally setting the plate thickness of the second oscillation base 8 and the width and length of each of the leg portions 8a to 8d.

The driving circuit 12 is provided for causing a current to flow in each of the coils 6a to 6d and 11a to 11d with a predetermined frequency and phase, and includes an oscillation circuit 14, a sin-wave generating circuit 15, a first driving circuit 16, a cos-wave generating circuit 17 and a second driving circuit 18, as shown in FIG. 2. The driving circuit 12 is provided on the substrate 1 and has an output terminal electrically connected to each of the first to eighth coils 6a to 6d and 11a to 11d.

The detecting circuit 13 is provided for performing additions and subtractions on the output signals of the first to eighth piezoelectric elements 4a to 4d and 9a to 9d and outputting an angular velocity signal and an acceleration signal. As shown in FIG. 3, the detecting circuit 13 includes a first adding/subtracting circuit 19, a first low-pass filter 20, a second low-pass filter 23, a first amplifying circuit 21 and a second amplifying circuit 24, as well as a second adding/subtracting circuit 22, a third low-pass filter 25, a fourth low-pass filter 27, a third amplifying circuit 26 and a fourth amplifying circuit 28.

Although not shown in FIG. 1, the output terminal of the detecting circuit 13 outputs to the outside of the sensor a signal indicative of an angular velocity about the X axis, a signal indicative of an acceleration in the X-axis direction, a signal indicative of an angular velocity about the Y axis and a signal indicative of an acceleration in the Y-axis direction.

The driving circuit 12 used in the first embodiment will be described below with reference to FIG. 2.

The output terminal of the first driving circuit 16 in the driving circuit 12 is connected to a first terminal 6a-1 of the first coil 6a, a second terminal 6a-2 of the first coil 6a is connected to a second terminal 6c-2 of the third coil 6c, and a first terminal 6c-1 of the third coil 6c is connected to a ground level.

Through this connection, magnetic fields of opposite polarity are produced on the surfaces of the first and third coils 6a and 6c which face the respective magnets 5a and 5c. For example, assuming that the output terminal of the first driving circuit 16 is at its + output level, if the first coil 6a attracts the first magnet 5a, the third coil 6c repulses the third magnet 5c so that the second oscillator 7 is inclined in an A direction as viewed in FIG. 1, because the first, third, fifth and seventh magnets 5a, 5c, 10a and 10c are opposite in polarity to the second, fourth, sixth and eighth magnets 5b, 5d, 10b and 10d, as described previously.

Furthermore, the output terminal of the first driving circuit 16 in the driving circuit 12 is connected to a second terminal 11b-2 of the sixth coil 11b, a first terminal 11b-1 of the sixth coil 11b is connected to a first terminal 11d-1 of the eighth coil 11d, and a second terminal 11d-2 of the eighth coil 11d is connected to the ground level.

Through this connection, magnetic fields of opposite polarity are produced on the surfaces of the sixth and eighth coils 11b and 11d that face the respective magnets 10b and 10d. For example, assuming that the output terminal of the first driving circuit 16 is at the + output level, the sixth coil 11b attracts the sixth magnet 10b and the eighth coil 11d repulses the eighth magnet 10d so that the second oscillator 7 is inclined in a-B direction (a direction opposite to a B direction) as viewed in FIG. 1, because the first, third, fifth and seventh magnets 5a, 5c, 10a and 10c are opposite in polarity to the second, fourth, sixth and eighth magnets 5b, 5d, 10b and 10d, as described previously.

In addition, the output terminal of the second driving circuit 18 in the driving circuit 12 is connected to a first terminal 6b-1 of the second coil 6b, a second terminal 6b-2 of the second coil 6b is connected to a second terminal 6d-2 of the fourth coil 6d, and a first terminal 6d-1 of the fourth coil 6d is connected to the ground level.

Through this connection, magnetic fields of opposite polarity are produced on the surfaces of the second and fourth coils 6b and 6d that face the respective magnets 5b and 5d. For example, assuming that the output terminal of the second driving circuit 18 is at its + output level, the second coil 6b repulses the second magnet 5b and the fourth coil 6d attracts the fourth magnet 5d so that the second oscillator 7 is inclined in the B direction as viewed in FIG. 1, because the first, third, fifth and seventh magnets 5a, 5c, 10a and 10c are opposite in polarity to the second, fourth, sixth and eighth magnets 5b, 5d, 10b and 10d, as described previously.

Furthermore, the output terminal of the second driving circuit 18 in the driving circuit 12 is connected to a second terminal 11a-2 of the fifth coil 11a, a first terminal 11a-1 of the fifth coil 11a is connected to a first terminal 11c-1 of the seventh coil 11c, and a second terminal 11c-2 of the seventh coil 11c is connected to the ground level.

Through this connection, magnetic fields of opposite polarity are produced on the surfaces of the fifth and seventh coils 11a and 11c that face the respective magnets 10a and 10c. For example, assuming that the output terminal of the second driving circuit 18 is at the + output level, the fifth coil 11a repulses the fifth magnet 10a and the seventh coil 11c attracts the seventh magnet 10c so that the second oscillator 7 is inclined in a −A direction (a direction opposite to the A direction) as viewed in FIG. 1.

In the driving circuit 12 used in the first embodiment of the present invention shown in FIG. 2, the oscillation circuit 14 is a well-known oscillation circuit whose resonant frequency is set to a frequency at which the sine-wave generating circuit 15 and the cos-wave generating circuit 17 generate, in the respective coils 6a to 6d and 11a to 11d, signals having frequencies at which the first and second oscillating bodies 29 and 30 are made to resonate in directions in which to incline the respective oscillators 2 and 7. The output terminal of the oscillation circuit 14 is connected to the input terminal of each of the sine-wave generating circuit 15 and the cos-wave generating circuit 17.

The sine-wave generating circuit 15 is a circuit such as a frequency dividing circuit using, for example, a flip-flop circuit, for generating a sine wave on the basis of a signal applied to the input terminal. The output terminal of the sine-wave generating circuit 15 is connected to the input terminal of the first driving circuit 16.

The first driving circuit 16 is a circuit for amplifying a signal applied to the input terminal, with a predetermined gain, and supplying electrical power for driving the oscillators 2 and 7 to the coils 6a, 6c and 11b, 11d.

The cos-wave generating circuit 17 is a circuit such as a frequency dividing circuit using, for example, a flip-flop circuit, for generating a cosine wave which differs 90° in phase from the sine wave of the sine-wave generating circuit 15, on the basis of a signal applied to the input terminal. The output terminal of the cos-wave generating circuit 17 is connected to the input terminal of the second driving circuit 18.

The second driving circuit 18 is a circuit for amplifying, with a predetermined gain, a signal applied to the input terminal and supplying electrical power for driving the oscillators 2 and 7 to the coils 6b, 6d and 11a, 11c.

When a power source (not shown) of the sensor is turned on and the oscillation circuit 14 outputs a pulse of predetermined frequency, the sine-wave generating circuit 15 and the cos-wave generating circuit 17 generate a sine wave and a cosine wave, respectively, and the first and second driving circuits 16 and 18 start to supply electrical power to the corresponding coils.

When the sine wave and the cosine wave are applied to the corresponding coils by the first driving circuit 16 and the second driving circuit 18, respectively, the first oscillating body 29 and the second oscillating body 30 resonate with their input signals and the first and second oscillators 2 and 7 swivel in directions opposite to each other. This is because, as described previously, the respective relationships between the coils and the magnets of the first oscillating body 29 and the second oscillating body 30 are determined so that the respective inclination directions of the first oscillator 2 and the second oscillator 7 become opposite to each other (the B direction and the −B direction) for the supply of electrical power of the same polarity, and also because the resonant frequencies of the first and second oscillating bodies 29 and 30 are coincident with each other. In such phase relationship, the first and second oscillators 2 and 7 make their respective swivel motions in phase with each other in the Y-axis direction of the substrate 1 with large inertia, and out of phase with each other in the X-axis direction of the substrate 1 with small inertia, whereby it is possible to inhibit their swivel motions from adversely affecting each other.

Furthermore, in the first embodiment, since the coils are connected in the above-described manner, the positional phase difference between the swivel motions of the first oscillator 2 and the second oscillator 7 is 180 degrees in the X-axis direction shown in FIG. 1 and 0 degrees in the Y-axis direction shown in FIG. 1.

The detecting circuit 13 used in the first embodiment of the present invention will be described below with reference to FIGS. 1 and 3. In FIG. 3, constituent elements common to those shown in FIG. 1 are denoted by identical reference numerals.

Referring to FIG. 3, the piezoelectric elements 4a, 4b, 4c and 4d and the piezoelectric elements 9a, 9b, 9c and 9d are fixed by adhesion to the corresponding leg portions of the first and second oscillation bases 3 and 8, for detecting the respective inclinations of the first and second oscillators 2 and 7. If the leg portions, each having elasticity, of the first and second oscillation bases 3 and 8 are bent, the corresponding piezoelectric elements output predetermined voltages according to the amounts of bending of the respective leg portions. As described previously, the detecting circuit 13 includes the first adding/subtracting circuit 19, the first low-pass filter 20, the first amplifying circuit 21, the second low-pass filter 23, the second amplifying circuit 24, the second adding/subtracting circuit 22, the third low-pass filter 25, the third amplifying circuit 26, the fourth low-pass filter 27 and the fourth amplifying circuit 28.

Connected to the input terminal of the first adding/subtracting circuit 19 are the first and second piezoelectric elements 4a and 4b for detecting an inclination of the first oscillator 2 in the X-axis direction shown in FIG. 1, and the fifth and sixth piezoelectric elements 9a and 9b for detecting an inclination of the second oscillator 7 in the X-axis direction shown in FIG. 1.

The first adding/subtracting circuit 19 processes signals corresponding to the inclinations of the first and second oscillators 2 and 7 in the X-axis direction, and separates the component of inclinations of the first and second oscillators 2 and 7 due to Coriolis forces which act on the respective oscillators 2 and 7 during the rotation of the sensor about the X axis and the component of inclinations of the first and second oscillators 2 and 7 due to an acceleration received by the sensor in the X-axis direction. The first adding/subtracting circuit 19 outputs the former and latter components to the first low-pass filter 20 and the second low-pass filter 23 as AM-modulated signals, respectively.

Specifically, the first adding/subtracting circuit 19 subtracts a signal obtained by subtracting the signal of the sixth piezoelectric element 9b from the signal of the fifth piezoelectric element 9a, from a signal obtained by subtracting the signal of the second piezoelectric element 4b from the signal of the first piezoelectric element 4a, and outputs to the first low-pass filter 20 an output signal that corresponds to the component of the inclinations of the first and second oscillators 2 and 7 due to Coriolis forces that acts on the respective oscillators 2 and 7 during the rotation of the sensor about the X axis. In addition, the first adding/subtracting circuit 19 adds together the signal obtained by subtracting the signal of the sixth piezoelectric element 9b from the signal of the fifth piezoelectric element 9a, and the signal obtained by subtracting the signal of the second piezoelectric element 4b from the signal of the first piezoelectric element 4a, and outputs to the second low-pass filter 23 a signal that corresponds to the component of the inclinations of the first and second oscillators 2 and 7 due to the acceleration received by the sensor in the X-axis direction.

The first low-pass filter 20, which is a well-known low-pass filter, receives from the first adding/subtracting circuit 19 the AM-modulated signal that corresponds to the component of the inclinations of the first and second oscillators 2 and 7 due to the Coriolis forces that act on the respective oscillators 2 and 7 during the rotation of the sensor about the X axis, and converts the AM-modulated signal into a voltage signal and outputs to the first amplifying circuit 21 the electrical signal that corresponds to the component of the inclinations of the first and second oscillators 2 and 7 due to the Coriolis forces that act on the respective oscillators 2 and 7 during the rotation of the sensor about the X axis.

The first amplifying circuit 21 amplifies with a predetermined amplification factor the electrical signal that has received from the first low-pass filter 20 and that corresponds to the component of the inclinations of the first and second oscillators 2 and 7 due to the Coriolis forces that act on the respective oscillators 2 and 7 during the rotation of the sensor about the X axis, and outputs through an output terminal 21a an output signal corresponding to the angular velocity of the sensor about the X axis.

In the meantime, the second low-pass filter 23, which is a well-known low-pass filter, receives, from the first adding/subtracting circuit 19, the AM-modulated signal that corresponds to the component of the inclinations of the first and second oscillators 2 and 7 due to the acceleration received by the sensor in the X-axis direction, and converts the AM-modulated signal into a voltage signal and outputs to the second amplifying circuit 24 the electrical signal that corresponds to the component of the inclinations of the first and second oscillators 2 and 7 due to the acceleration received by the sensor in the X-axis direction.

The second amplifying circuit 24 amplifies with a predetermined amplification factor the electrical signal that has received from the second low-pass filter 23 and that corresponds to the component of the inclinations of the first and second oscillators 2 and 7 due to the acceleration received by the sensor in the X-axis direction, and outputs through an output terminal 24a an output signal corresponding to the component of the inclinations of the first and second oscillators 2 and 7 due to the acceleration received by the sensor in the X-axis direction.

Similarly, connected to the input terminal of the second adding/subtracting circuit 22 are the third and fourth piezoelectric elements 4c and 4d for detecting an inclination of the first oscillator 2 in the Y-axis direction shown in FIG. 1, and the fifth and eighth piezoelectric elements 9c and 9d for detecting an inclination of the second oscillator 7 in the Y-axis direction shown in FIG. 1.

The second adding/subtracting circuit 22 processes signals corresponding to the inclinations of the first and second oscillators 2 and 7 in the Y-axis direction, and separates the component of inclinations of the first and second oscillators 2 and 7 due to Coriolis forces that act on the respective oscillators 2 and 7 during the rotation of the sensor about the Y axis and the component of inclinations of the first and second oscillators 2 and 7 due to an acceleration received by the sensor in the Y-axis direction. The second adding/subtracting circuit 22 outputs the former and latter components to the third low-pass filter 25 and the fourth low-pass filter 27 as AM-modulated signals, respectively.

Specifically, the second adding/subtracting circuit 22 subtracts a signal obtained by subtracting the signal of the eighth piezoelectric element 9d from the signal of the seventh piezoelectric element 9c, from a signal obtained by subtracting the signal of the fourth piezoelectric element 4d from the signal of the third piezoelectric element 4c, and outputs to the third low-pass filter 25 an output signal that corresponds to the component of the inclinations of the first and second oscillators 2 and 7 due to Coriolis forces that act on the respective oscillators 2 and 7 during the rotation of the sensor about the Y axis. In addition, the second adding/subtracting circuit 22 adds together the signal obtained by subtracting the signal of the fourth piezoelectric element 4d from the signal of the third piezoelectric element 4c, and the signal obtained by subtracting the signal of the eighth piezoelectric element 9d from the signal of the seventh piezoelectric element 9c, and outputs to the fourth low-pass filter 27 a signal which corresponds to the component of the inclinations of the first and second oscillators 2 and 7 due to an acceleration received by the sensor in the Y-axis direction.

The third low-pass filter 25, which is a well-known low-pass filter, receives from the second adding/subtracting circuit 22 the AM-modulated signal which corresponds to the component of the inclinations of the first and second oscillators 2 and 7 due to the Coriolis forces which act on the respective oscillators 2 and 7 during the rotation of the sensor about the Y axis, and converts the AM-modulated signal into a voltage signal and outputs to the third amplifying circuit 26 the electrical signal which corresponds to the component of the inclinations of the first and second oscillators 2 and 7 due to the Coriolis forces which act on the respective oscillators 2 and 7 during the rotation of the sensor about the Y axis.

The third amplifying circuit 26 amplifies with a predetermined amplification factor the electrical signal which has received from the third low-pass filter 25 and which corresponds to the component of the inclinations of the first and second oscillators 2 and 7 due to the Coriolis forces which act on the respective oscillators 2 and 7 during the rotation of the sensor about the Y axis, and outputs through an output terminal 26a an output signal corresponding to the angular velocity of the sensor about the Y axis.

The fourth low-pass filter 27, which is a well-known low-pass filter, receives from the second adding/subtracting circuit 22 the AM-modulated signal which corresponds to the component of the inclinations of the first and second oscillators 2 and 7 due to the acceleration received by the sensor in the Y-axis direction, and converts the AM-modulated signal into a voltage signal and outputs to the fourth amplifying circuit 28 the electrical signal which corresponds to the component of the inclinations of the first and second oscillators 2 and 7 due to the acceleration received by the sensor in the Y-axis direction.

The fourth amplifying circuit 28 amplifies with a predetermined amplification factor the electrical signal which has received from the fourth low-pass filter 27 and which corresponds to the component of the inclinations of the first and second oscillators 2 and 7 due to the acceleration received by the sensor in the Y-axis direction, and outputs through an output terminal 28a an output signal corresponding to the component of the inclinations of the first and second oscillators 2 and 7 due to the acceleration received by the sensor in the Y-axis direction.

The operation of the sensor according to the first embodiment of the present invention will be described below with reference to FIGS. 4(a), 4(b) through 12(a) to 12(d).

Figure 4A:
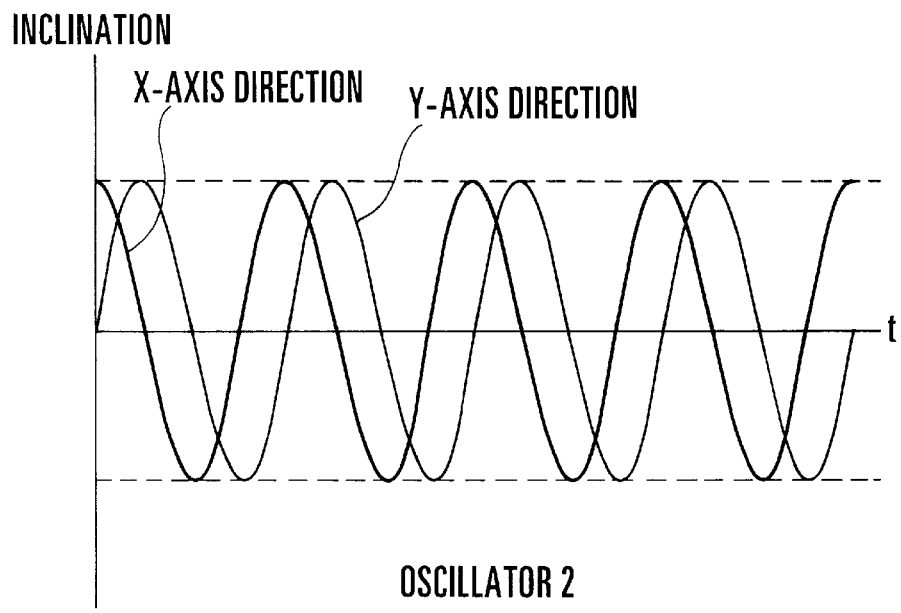
FIGS. 4(a) and 4(b) are waveform diagrams respectively showing the motions of the first and second oscillators, shown in FIG. 1, as their respective inclinations.
Figure 4B:
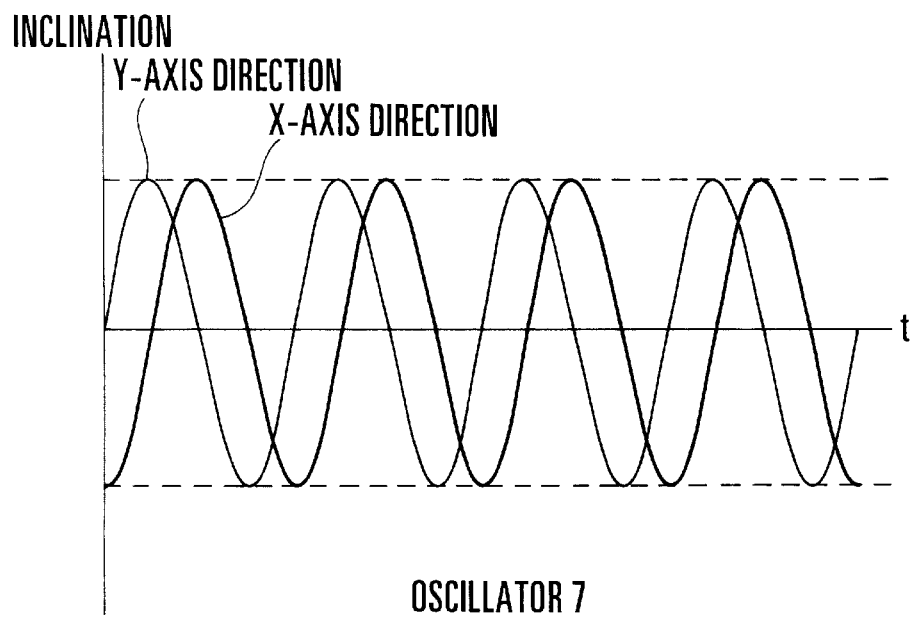

FIGS. 4(a) and 4(b) are views respectively representing the motions of the first and second oscillators 2 and 7 of the sensor according to the first embodiment of the present invention as the inclinations of the first and second oscillators 2 and 7. In FIGS. 4(a) and 4(b), the respective vertical axes represent the inclinations of the first and second oscillators 2 and 7, and each of the horizontal axes denotes time t. In FIG. 4(a), the X-axis component and the Y-axis component of the inclination of the first oscillator 2 are respectively denoted by a thick line and a thin line, and, in FIG. 4(b), the X-axis component and the Y-axis component of the inclination of the second oscillator 7 are respectively denoted by a thick line and a thin line.

Figure 5:
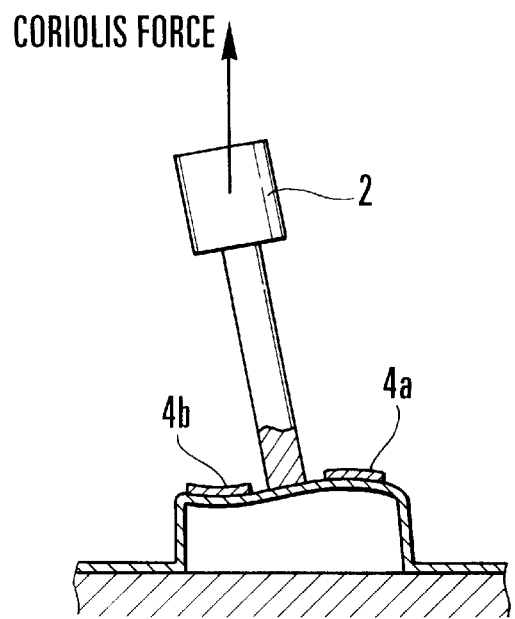
FIG. 5 is a view aiding in describing a Coriolis force applied to each of the first and second oscillators shown in FIG. 1.

FIG. 5 is a view aiding in describing the Coriolis force which acts on the first oscillator 2, and shows a cross section taken in the direction of the X axis which passes through the first oscillator 2 in FIG. 1.

Figure 6:
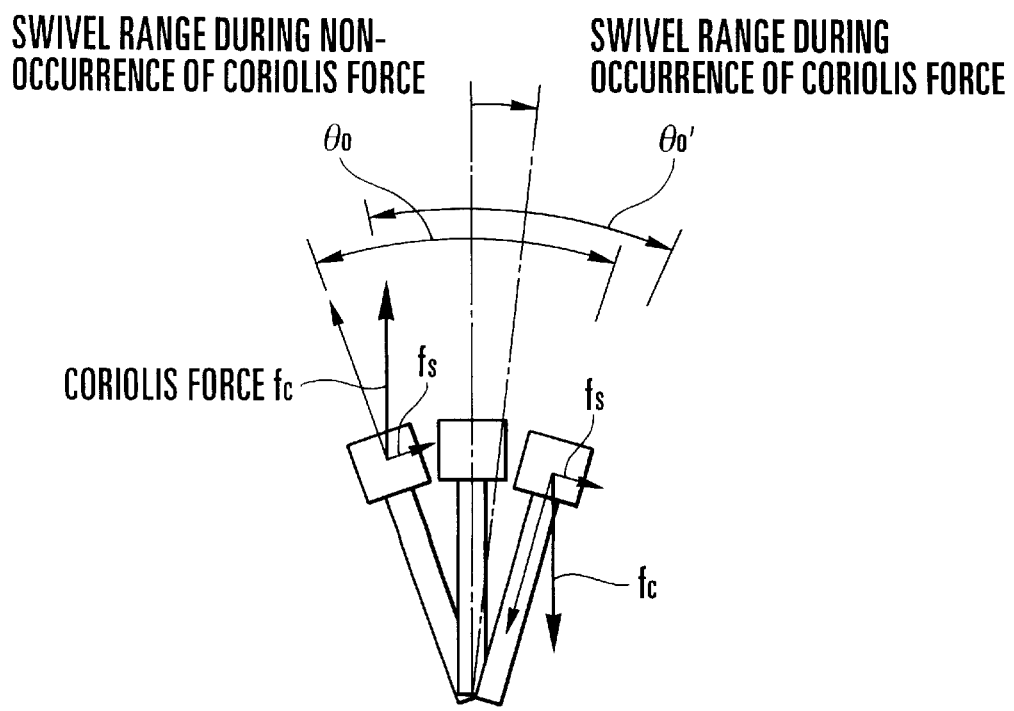
FIG. 6 is a view aiding in describing the manner in which a swivel locus is inclined by a Coriolis force applied to each of the first and second oscillators shown in FIG. 1.

FIG. 6 is a view aiding in describing the manner in which the swivel locus of an oscillator is inclined (varied) by a Coriolis force acting on the oscillator. In FIG. 6, symbol fc denotes a Coriolis force, symbol fs denotes the force of an oscillator-inclining component of the Coriolis force, symbol θo denotes the swivel range of the oscillator on which the Coriolis force is not acting, and symbol θo' denotes the swivel range of the oscillator on which the Coriolis force is acting.

FIGS. 7(a) and 7(b), FIGS. 8(a), 8(b) and 8(c), FIGS. 9(a), 9(b) and 9(c), and FIGS. 10(a), 10(b), 10(c) and 10(d) are views aiding in describing the output signals of individual piezoelectric elements for detecting the inclinations of the corresponding oscillators, and in each of these figures, the vertical axis represents output voltages V of the piezoelectric elements, while the horizontal axis represents time t.

FIGS. 11(a) and 11(b) and 12(a), 12(b), 12(c) and 12(d) are views aiding in describing the output signals of the individual adding/subtracting circuits, which are angular velocity signals and acceleration signals, and in which in each of these figures, the vertical axis represents output voltages of the individual adding/subtracting circuits, while the horizontal axis represents time.

When the power source of the sensor is turned on and the oscillation circuit 14 in the driving circuit 12 outputs a pulse, the above-described coils attract and repulse the corresponding magnets and the first oscillator 2 starts a motion which contains an oscillation component in which its inclination in the X-axis direction leads its inclination in the Y-axis direction by 90 degrees in phase, as shown in FIG. 4(a). This motion is the swivel motion of the first oscillator 2. Specifically, in the first embodiment, the first oscillator 2 makes a counterclockwise swivel motion as viewed from above the first oscillator 2 in FIG. 1, owing to the above-described arrangement of the coils and the magnets as well as the above-described connection of the coils. Similarly, the second oscillator 7 starts a motion which contains an oscillation component in which its inclination in the X-axis direction lags behind its inclination in the Y-axis direction by 90 degrees in phase, as shown in FIG. 4(b). This motion is the swivel motion of the second oscillator 7. Specifically, in the first embodiment, the second oscillator 7 makes a clockwise swivel motion as viewed from above the second oscillator 7 in FIG. 1, owing to the above-described arrangement of the coils and the magnets as well as the above-described connection of the coils.

In addition, owing to the above-described arrangement of the coils and the magnets as well as the above-described connection of the coils, in the swivel motions of the first and second oscillators 2 and 7, their oscillation components in the Y-axis direction are in phase with each other, while their oscillation components in the X-axis direction are 180 degrees out of phase with each other.

If each of the oscillators 2 and 7 which are making such swivel motions is rotated in the direction indicated by an arrow about its X axis in FIG. 1, a Coriolis force proportional to the Y-axis direction velocity component of the swivel motion of the oscillator acts in the Z-axis direction. The action of such Coriolis force on the first oscillator 2 will be described below by way of example, with reference to FIG. 5. As shown in FIG. 5 which is a cross-sectional view taken in the X-axis direction, of the first oscillating body 29 placed in a position which is most inclined in the direction opposite to the X-axis direction indicated by the arrow shown in FIG. 1 (for the sake of convenience, this opposite direction will be referred to as the −X-axis direction, and the respective directions opposite to the Y-axis direction and the Z-axis direction will similarly be referred to the −Y-axis direction and the −Z-axis direction), the Coriolis force in the Z-axis direction is applied to the first oscillator 2 to the greatest extent when the first oscillator 2 is placed in the position most inclined in the −X-axis direction. When in a position opposite to that shown in FIG. 5, i.e., in a position which is most inclined in the +X-axis direction which is opposite in phase to the −X-axis direction, the Coriolis force in the −Z-axis direction is applied to the first oscillator 2 to the greatest extent. If there is no angular velocity about the Y axis, no Coriolis force occurs when the first oscillator 2 is placed in a position most inclined in the Y-axis direction.

Since inverse Coriolis forces act on the oscillator 2 at 180-degrees offset positions during one rotation while the first oscillator 2 is making a swivel motion in the above-described manner, the swivel locus of the first oscillator 2 becomes inclined as shown in FIG. 6. In FIG. 6, as described previously, symbol fc denotes the Coriolis force, symbol fs denotes the force of an oscillator-inclining component of the Coriolis force, symbol θo denotes the swivel range of the oscillator on which the Coriolis force is not acting, and symbol θo' denotes the swivel range of the oscillator on which the Coriolis force is acting. Since inverse Coriolis forces act on the oscillator 2 at 180-degrees offset positions, the directions of the oscillator-inclining components of the respective Coriolis forces become the same, whereby the swivel range of the oscillator is inclined from θo to θo'.

Similarly, the oscillation locus of the second oscillator 7 is also inclined by the Coriolis force, but since the swivel direction of the second oscillator 7 is opposite to that of the first oscillator 2, the directions in which the Coriolis forces act on both oscillators 2 and 7 become opposite to each other, so that the second oscillator 7 is inclined in the direction opposite to the aforesaid direction of inclination of the first oscillator 2.

Such inclinations of the oscillators 2 and 7 can be detected by measuring a voltage which is generated by each of the first to eighth piezoelectric elements 4a to 4d and 9a to 9d when they are bent similarly to the first and second piezoelectric element 4a and 4b shown in FIG. 5.

A method of detecting the inclinations of the oscillators by means of the output voltages of the piezoelectric elements and detecting an angular velocity and an acceleration which are applied to the sensor will be described below with reference to the output waveforms of the first piezoelectric element 4a and the third piezoelectric element 4c for detecting the motion of the first oscillator 2 and the output waveforms of the fifth piezoelectric element 9a and the seventh piezoelectric element 9c for detecting the motion of the second oscillator 7.

In the first embodiment, the output voltage of each of the first piezoelectric element 4a, the third piezoelectric element 4c, the fifth piezoelectric element 9a and the seventh piezoelectric element 9c and the output voltage of the corresponding one of the second, fourth, sixth and eighth piezoelectric elements 4b, 4d, 9b and 9d, which differ 180 degrees in phase from the respective piezoelectric elements 4a, 4c, 9a and 9c are subjected to subtraction processing in the aforesaid adding/subtracting circuits, thereby forming a detection signal indicative of a particular direction. For the sake of clarity in description, the following description refers to the output signals (voltages) of the first piezoelectric element 4a, the third piezoelectric element 4c, the fifth piezoelectric element 9a and the seventh piezoelectric element 9c, and their respective output signals are denoted by $V_{4a}$, $V_{4c}$, $V_{9a}$ and $V_{9c}$.

Figure 7A:
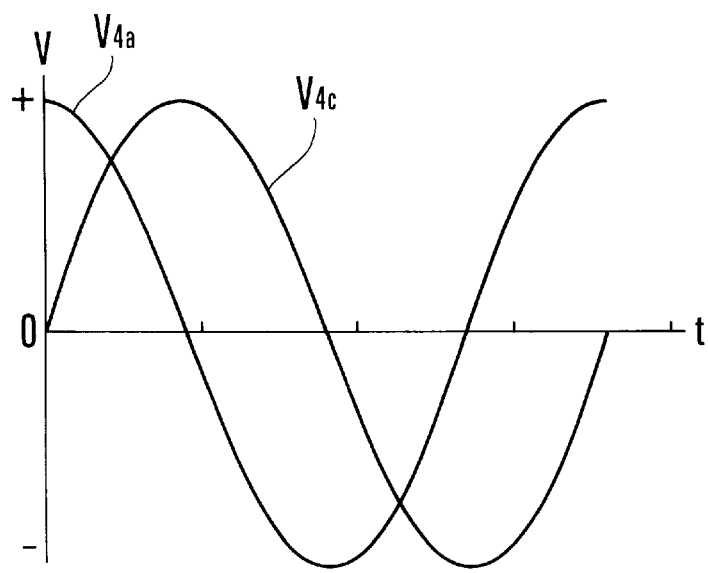
FIGS. 7(a) and 7(b) are views showing the output waveforms of individual piezoelectric elements when the sensor of FIG. 1 is stationary.
Figure 7B:
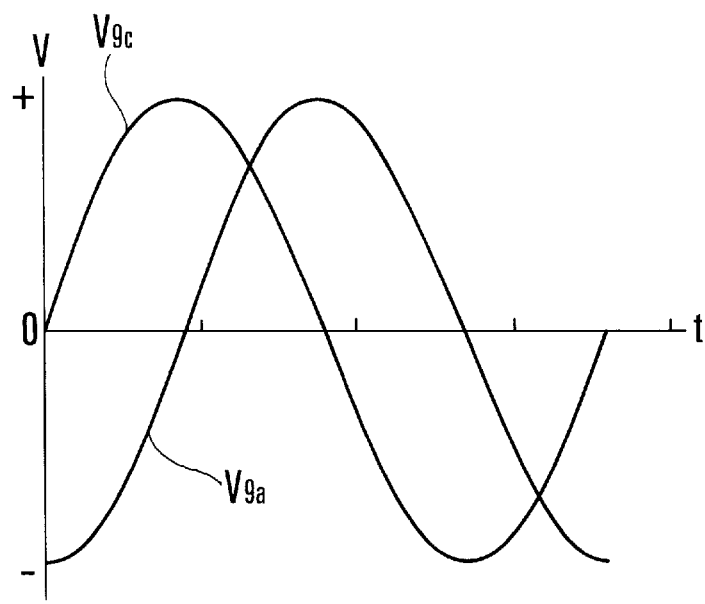

When the first and second oscillators 2 and 7 are being oscillated and the sensor is in a stationary state, the output signal $V_{4a}$ of the first piezoelectric element 4a for detecting the inclination of the first oscillator 2 in the X-axis direction and the output signal $V_{4c}$ of the third piezoelectric element 4c for detecting the inclination of the first oscillator 2 in the Y-axis direction are sine waves which are 90 degrees out of phase with each other, as shown in FIG. 7(a), while the output signal $V_{9a}$ of the fifth piezoelectric element 9a for detecting the inclination of the second oscillator 7 in the X-axis direction and the output signal $V_{9c}$ of the seventh piezoelectric element 9c for detecting the inclination of the second oscillator 7 in the Y-axis direction are sine waves which are 90 degrees out of phase with each other, as shown in FIG. 7(b). Furthermore, because the first oscillator 2 and the second oscillator 7 are swiveling in opposite directions and their swivel motions are in phase in the Y-axis direction and 180 degrees out of phase in the X-axis direction, the output signal $V_{4a}$ of the first piezoelectric element 4a for detecting the inclination of the first oscillator 2 in the X-axis direction and the output signal $V_{9a}$ of the fifth piezoelectric element 9a for detecting the inclination of the second oscillator 7 in the X-axis direction are 180 degrees out of phase with each other, while the output signal $V_{4c}$ of the third piezoelectric element 4c for detecting the inclination of the first oscillator 2 in the Y-axis direction and the output signal $V_{9c}$ of the seventh piezoelectric element 9c for detecting the inclination of the second oscillator 7 in the Y-axis direction are coincident with each other in phase, as shown in FIGS. 7(a) and 7(b).

During the above-described state, the output signals of the respective piezoelectric elements contain equal + and − components, when the signals pass through the low-pass filters, become zero and no signal is provided at the output side of the sensor.

The output signals of the piezoelectric elements during the application of an angular velocity to the sensor according to the first embodiment of the present invention will be described below.

Figure 8A:
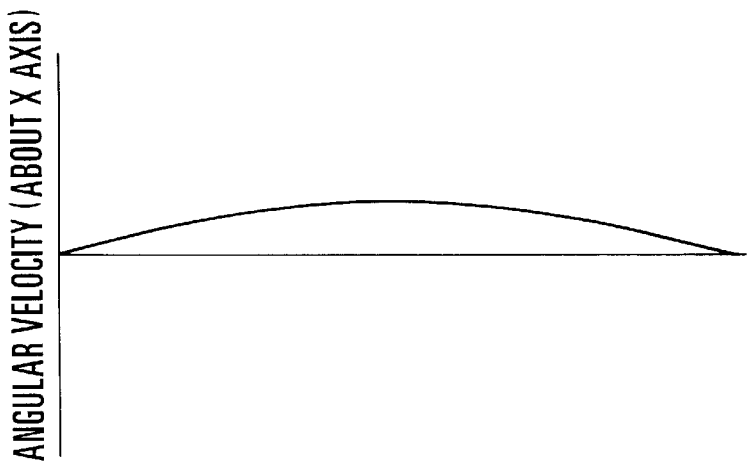
FIGS. 8(a), 8(b) and 8(c) are views aiding in describing the output waveforms of the individual piezoelectric elements when an angular velocity about the X axis is applied to the sensor of FIG. 1.
Figure 8B:
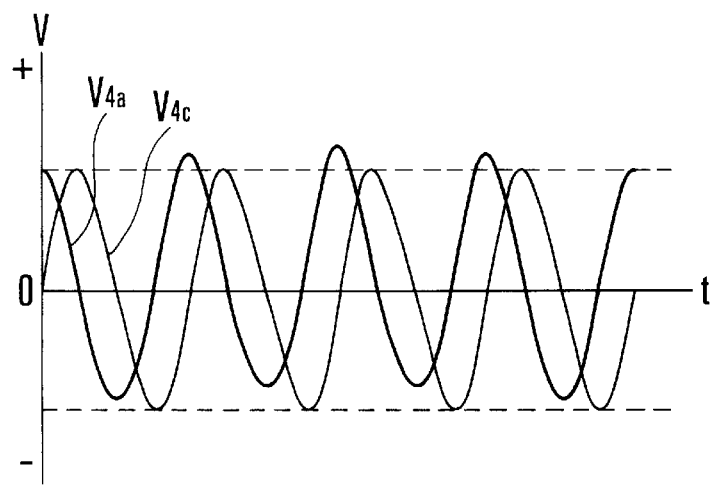
Figure 8C:
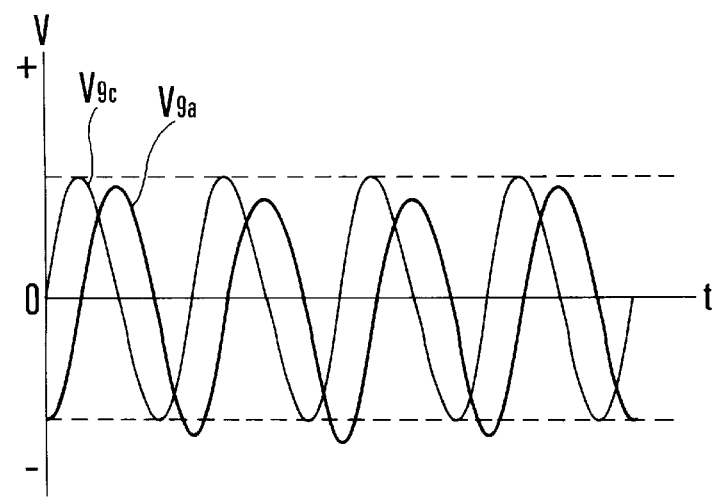

If an angular velocity about the X axis, which has a waveform such as that shown in FIG. 8(a), is applied to the sensor, the output signals $V_{4a}$ and $V_{4c}$ of the first and third piezoelectric elements 4a and 4c for detecting the inclination of the first oscillator 2 become as shown in FIG. 8(b). Specifically, the output signal $V_{4a}$ of the first piezoelectric element 4a for detecting the inclination of the first oscillator 2 in the X-axis direction is enlarged in amplitude on its + side and reduced in amplitude on its − side according to the angular velocity applied to the sensor. During this time, the output signal $V_{4c}$ of the third piezoelectric element 4c for detecting the inclination of the first oscillator 2 in the Y-axis direction does not vary. On the other hand, the output signals $V_{9a}$ and $V_{9c}$ of the fifth and seventh piezoelectric elements 9a and 9c for detecting the inclination of the second oscillator 7 become as shown in FIG. 8(c). Specifically, the output signal $V_{9a}$ of the fifth piezoelectric element 9a for detecting the inclination of the second oscillator 7 in the X-axis direction is enlarged in amplitude on its − side and reduced in amplitude on its + side according to the angular velocity applied to the sensor. During this time, the output signal $V_{9c}$ of the seventh piezoelectric element 9c for detecting the inclination of the first oscillator 2 in the Y-axis direction does not vary.

If an angular velocity about the Y axis, which has a waveform such as that shown in FIG. 9(a) similar to FIG. 8(a), is applied to the sensor, the output signals $V_{4a}$ and $V_{4c}$ of the first and third piezoelectric elements 4a and 4c for detecting the inclination of the first oscillator 2 become as shown in FIG. 9(b). Specifically, the output signal $V_{4a}$ of the first piezoelectric element 4a for detecting the inclination of the first oscillator 2 in the X-axis direction does not vary, whereas the output signal $V_{4c}$ of the third piezoelectric element 4c for detecting the inclination of the first oscillator 2 in the Y-axis direction is enlarged in amplitude on its + side and reduced in amplitude on its − side according to the angular velocity. On the other hand, the output signals $V_{9a}$ and $V_{9c}$ of the fifth and seventh piezoelectric elements 9a and 9c for detecting the inclination of the second oscillator 7 become as shown in FIG. 9(c). Specifically, the output signal $V_{9a}$ of the fifth piezoelectric element 9a for detecting the inclination of the second oscillator 7 in the X-axis direction does not vary, whereas the output signal $V_{9c}$ of the seventh piezoelectric element 9c for detecting the inclination of the first oscillator 2 in the Y-axis direction is enlarged in amplitude on its − side and reduced in amplitude on its + side.

The output signals of the piezoelectric elements during the application of an acceleration to the sensor according to the first embodiment of the present invention will be described below.

Figure 10A:
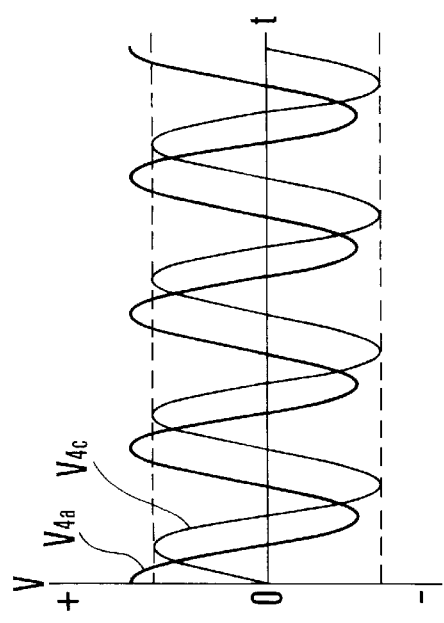
FIGS. 10(a), 10(b), 10(c) and 10(d) are views aiding in describing the output waveforms of the individual piezoelectric elements when accelerations in the X-axis direction and Y-axis direction are applied to the sensor of FIG. 1.
Figure 10B:
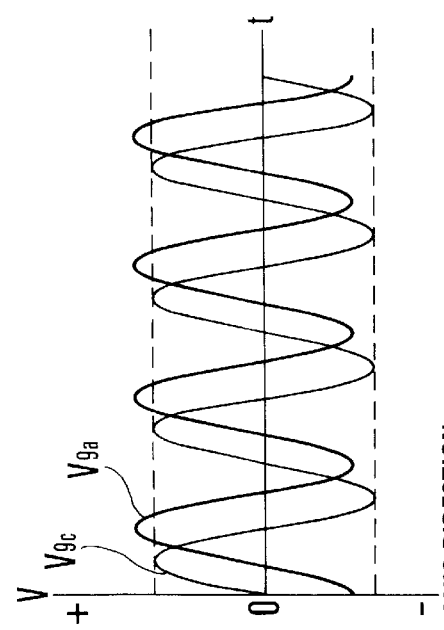

If an acceleration is applied to the sensor, the oscillators are inclined by the applied acceleration. If an acceleration in the X-axis direction is applied to the sensor, the oscillation locus of the first oscillator 2 is inclined in the X-axis direction, and the output waveform of the first piezoelectric element 4a for detecting the inclination of the first oscillator 2 in the X-axis direction is shifted in the + direction, as shown in FIG. 10(a). On the other hand, since the acceleration acts in the X-axis direction, the output waveform of the third piezoelectric element 4c for detecting the inclination of the first oscillator 2 in the Y-axis direction does not vary, as shown in FIG. 10(a). Similarly, the oscillation locus of the second oscillator 7 is also inclined in the X-axis direction, and the output waveform of the fifth piezoelectric element 9a for detecting the inclination of the second oscillator 7 in the X-axis direction is shifted in the + direction, as shown in FIG. 10(b). On the other hand, since the acceleration acts in the X-axis direction, the output waveform of the seventh piezoelectric element 9c for detecting the inclination of the first oscillator 2 in the Y-axis direction does not vary, as shown in FIG. 10(b).

Figure 10C:
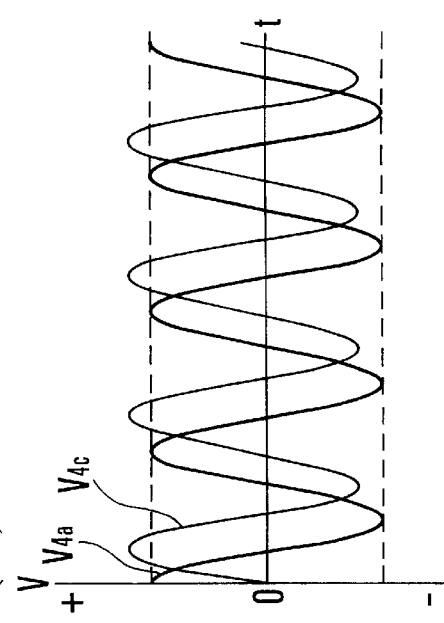
Figure 10D:
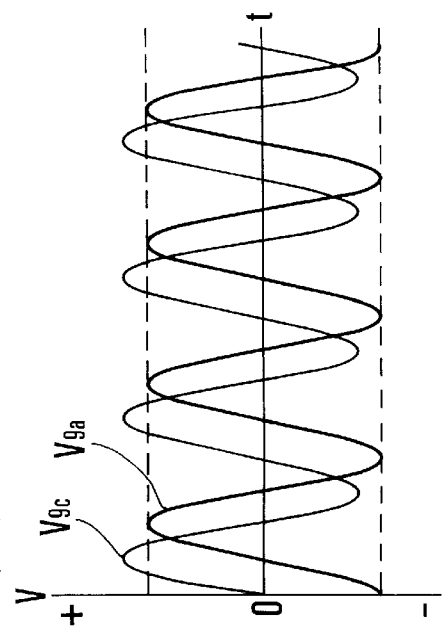

If an acceleration in the Y-axis direction is applied to the sensor, the oscillation locus of the first oscillator 2 is inclined in the Y-axis direction, and the output waveform of the first piezoelectric element 4a for detecting the inclination of the first oscillator 2 in the X-axis direction does not vary, as shown in FIG. 10(c), whereas the output waveform of the third piezoelectric element 4c for detecting the inclination of the first oscillator 2 in the Y-axis direction is shifted in the + direction, as shown in FIG. 10(c). Similarly, the oscillation locus of the second oscillator 7 is also inclined in the Y-axis direction, and the output waveform of the fifth piezoelectric element 9a for detecting the inclination of the second oscillator 7 in the X-axis direction does not vary, as shown in FIG. 10(d), whereas the output waveform of the seventh piezoelectric element 9c for detecting the inclination of the first oscillator 2 in the Y-axis direction is shifted in the + direction, as shown in FIG. 10(d).

A detection signal indicative of the inclination of the first oscillator 2 in the X-axis direction and a detection signal indicative of the inclination of the second oscillator 7 in the X-axis direction are respectively detected as different values in which angular velocity components having the same value and the opposite signs are respectively combined with acceleration components having the same value and the same sign. The first adding/subtracting circuit 19 shown in FIG. 3 calculates the difference between these detection signals to thereby eliminate the acceleration components uniformly multiplexed with the respective detection signals and detect the angular velocity about the X axis which is applied to the sensor, and supplies the corresponding output signal to a first output terminal 19a. In addition, similarly to the first adding/subtracting circuit 19, the second adding/subtracting circuit 22 calculates the difference between the detection signal indicative of the inclination of the first oscillator 2 in the Y-axis direction and the detection signal indicative of the inclination of the second oscillator 7 in the Y-axis direction to thereby eliminate the acceleration components uniformly multiplexed with the respective detection signals and detect the angular velocity about the Y axis which is applied to the sensor, and supplies the corresponding output signal to a first output terminal 22a.

Figure 11A:
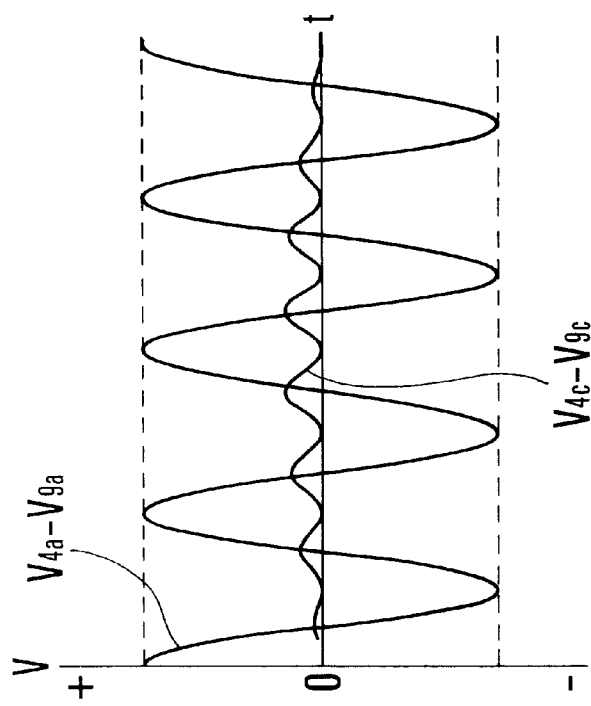
FIGS. 11(a) and 11(b) are views aiding in describing the output waveforms of predetermined parts in a detecting circuit when angular velocities about the X axis and the Y axis are applied to the sensor of FIG. 1.

Accordingly, when the angular velocity about the X axis is applied to the sensor, the output waveform outputted from the first output terminal 19a of the first adding/subtracting circuit 19 for outputting the angular velocity signal about the X axis and the output waveform outputted from the first output terminal 22a of the second adding/subtracting circuit 22 for outputting the angular velocity signal about the Y axis become as shown in FIG. 11(a).

Specifically, a signal which is modulated at an oscillating frequency and whose direct-current component varies according to the applied angular velocity about the X axis as indicated by "$V_{4a}-V_{9a}$" in FIG. 11(a) is obtained by subtracting the detection signal indicative of the inclination of the fifth piezoelectric element 9a in the X-axis direction from the detection signal indicative of the inclination of the first piezoelectric element 4a in the X-axis direction (refer to FIGS. 8(a) to 8(c)). The signal $V_{4a}-V_{9a}$ is passed through the first low-pass filter 20 and is then amplified to a signal of predetermined magnitude in the first amplifying circuit 21, thereby providing the angular velocity about the X axis. On the other hand, the output waveform outputted from the first output terminal 22a of the second adding/subtracting circuit 22 becomes zero as indicated by "$V_{4c}-V_{9c}$" in FIG. 11(a), the second adding/subtracting circuit 22 being arranged to obtain the angular velocity signal about the Y axis when the angular velocity about the X axis is applied to the sensor, by subtracting the detection signal indicative of the inclination of the seventh piezoelectric element 9c in the Y-axis direction from the detection signal indicative of the inclination of the third piezoelectric element 4c in the Y-axis direction.

Figure 11B:
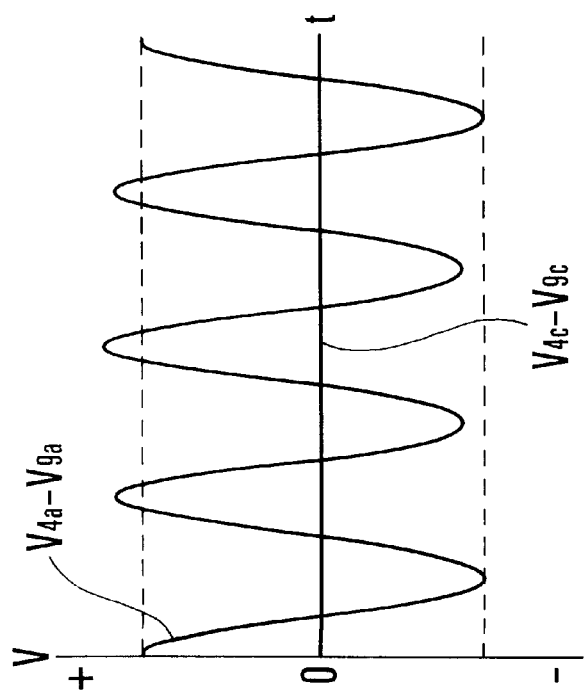

If an angular velocity about the Y axis is applied to the sensor, the output waveform outputted from the first output terminal 19a of the first adding/subtracting circuit 19 for outputting the angular velocity signal about the X axis and the output waveform outputted from the first output terminal 22a of the second adding/subtracting circuit 22 for outputting the angular velocity signal about the Y axis become as shown in FIG. 11(b).

Specifically, a signal which is modulated at an oscillating frequency and whose direct-current component and amplitude vary according to the applied angular velocity about the Y axis as indicated by "$V_{4c}-V_{9c}$" in FIG. 11(b) is obtained by subtracting the detection signal indicative of the inclination of the seventh piezoelectric element 9c in the Y-axis direction from the detection signal indicative of the inclination of the third piezoelectric element 4c in the Y-axis direction (refer to FIG. 9(a) to 9(c)). The signal $V_{4c}-V_{9c}$ is passed through the third low-pass filter 25 and is then amplified to a signal of predetermined magnitude in the third amplifying circuit 26, thereby providing the angular velocity about the Y axis.

On the other hand, the output waveform outputted from the first output terminal 19a of the first adding/subtracting circuit 19 becomes a waveform which is symmetrical between "+" and "−", as indicated by "$V_{4a}-V_{9a}$" in FIG. 11(b), the first adding/subtracting circuit 19 being arranged to obtain the angular velocity signal about the X axis when the angular velocity about the Y axis is applied to the sensor, by subtracting the detection signal indicative of the inclination of the fifth piezoelectric element 9a in the X-axis direction from the detection signal indicative of the inclination of the first piezoelectric element 4a in the X-axis direction. The signal $V_{4a}-V_{9a}$ becomes zero by being passed through the first low-pass filter 20.

Acceleration signals to be outputted from second output terminals 19b and 22b of the respective first and second adding/subtracting circuits 19 and 22 when the acceleration is applied to the sensor will be described below.

The first adding/subtracting circuit 19 shown in FIG. 3 calculates the sum of the detection signal indicative of the inclination of the first oscillator 2 in the X-axis direction and the detection signal indicative of the inclination of the second oscillator 7 in the X-axis direction, each of the detection signals containing the component of an angular velocity signal as a variation in amplitude (a displacement of a swivel radius) and the component of an acceleration signal as an inclination of the swivel center of the corresponding oscillator. That is to say, the detection signal indicative of the inclination of the first oscillator 2 in the x-axis direction and the detection signal indicative of the inclination of the second oscillator 7 in the X-axis direction are respectively detected as different values in which acceleration components having the same value and the same sign are respectively combined with angular velocity components having the same value and the opposite signs, and the first adding/subtracting circuit 19 shown in FIG. 3 calculates the sum of these detection signals to thereby detect an acceleration which is applied to the first adding/subtracting circuit 19 in the X-axis direction and from which the angular velocity component has been eliminated, and then supplies the corresponding output signal to the second output terminal 19b. In addition, similarly to the first adding/subtracting circuit 19, the second adding/subtracting circuit 22 calculates the sum of the detection signal indicative of the inclination of the first oscillator 2 in the Y-axis direction and the detection signal indicative of the inclination of the second oscillator 7 in the Y-axis direction to thereby detect an acceleration which is applied to the sensor in the Y-axis direction and from which the angular velocity component has been eliminated, and then supplies the corresponding output signal to the second output terminal 22b.

Figure 12A:
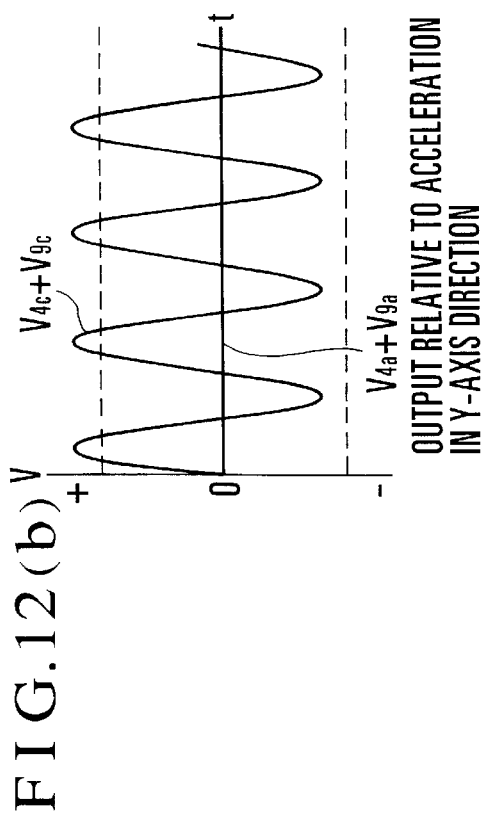
FIGS. 12(a), 12(b), 12(c) and 12(d) are views aiding in describing the output waveforms of the predetermined parts in the detecting circuit when accelerations in the X-axis direction and the Y-axis direction are applied to the sensor of FIG. 1.

Accordingly, when a constant acceleration is applied in the X-axis direction, the output waveform outputted from the second output terminal 19b of the first adding/subtracting circuit 19 for outputting the acceleration signal in the X-axis direction and the output waveform outputted from the second output terminal 22b of the second adding/subtracting circuit 22 for outputting the acceleration signal in the Y-axis direction become as shown in FIG. 12(a).

Specifically, a direct-current signal which is varied according to the applied acceleration in the X-axis direction as indicated by "$V_{4a}+V_{9a}$" in FIG. 12(a) is obtained by adding together the detection signal indicative of the inclination of the fifth piezoelectric element 9a in the X-axis direction and the detection signal indicative of the inclination of the first piezoelectric element 4a in the X-axis direction (refer to FIGS. 10(a) and 10(b)). The signal $V_{4a}+V_{9a}$ is passed through the second low-pass filter 23 and is then amplified to a signal of predetermined magnitude in the second amplifying circuit 24, thereby providing the acceleration in the X-axis direction.

On the other hand, the output waveform outputted from the second output terminal 22b of the second adding/subtracting circuit 22 becomes a sine wave centered at zero, as indicated by "$V_{4c}+V_{9c}$" in FIG. 12(a), and becomes zero by being passed through the fourth low-pass filter 27, the second adding/subtracting circuit 22 being arranged to obtain the acceleration signal in the Y-axis direction when the acceleration in the X-axis direction is applied to the sensor, by adding together the detection signal indicative of the inclination of the third piezoelectric element 4c in the Y-axis direction and the detection signal indicative of the inclination of the seventh piezoelectric element 9c in the Y-axis direction.

Figure 12B:
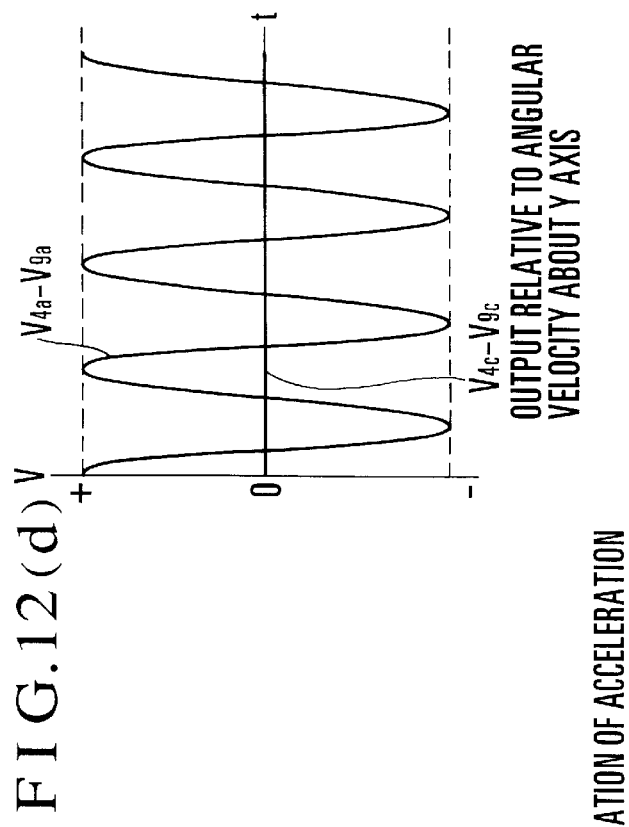

If the acceleration in the Y-axis direction is applied to the sensor, the output waveform outputted from the second output terminal 19b of the first adding/subtracting circuit 19 for outputting the acceleration signal in the X-axis direction and the output waveform outputted from the second output terminal 22b of the second adding/subtracting circuit 22 for outputting the acceleration signal in the Y-axis direction become as shown in FIG. 12(b).

Specifically, a signal which is modulated at an oscillating frequency and whose direct-current component varies according to the applied acceleration in the Y-axis direction as indicated by "$V_{4c}+V_{9c}$" in FIG. 12(b) is obtained by adding together the detection signal indicative of the inclination of the third piezoelectric element 4c in the Y-axis direction and the detection signal indicative of the inclination of the seventh piezoelectric element 9c in the Y-axis direction (refer to FIG. 10(c) and 10(d)). The signal $V_{4c}+V_{9c}$ is passed through the fourth low-pass filter 27 and is then amplified to a signal of predetermined magnitude in the fourth amplifying circuit 28, thereby providing the acceleration in the Y-axis direction.

If the acceleration in the Y-axis direction is applied to the sensor, the output waveform outputted from the second output terminal 19b of the first adding/subtracting circuit 19 becomes zero as indicated by $V_{4a}+V_{9a}$ in FIG. 12(b), the first adding/subtracting circuit 19 being arranged to obtain the acceleration signal about the X axis, by adding together the detection signal indicative of the inclination of the first piezoelectric element 4a in the X-axis direction from the detection signal indicative of the inclination of the fifth piezoelectric element 9a in the X-axis direction.

Figure 12C:
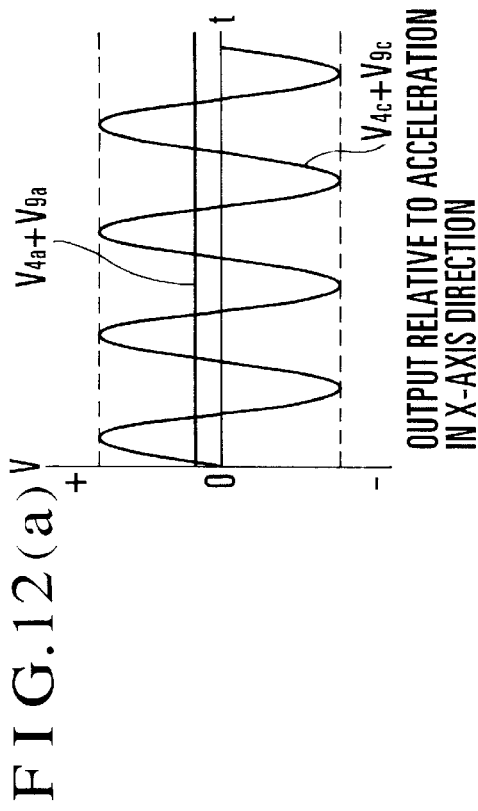

If the acceleration in the Y-axis direction is applied to the sensor, the angular velocity signal about the X axis which is outputted from the first output terminal 19a of the first adding/subtracting circuit 19 becomes a sine wave centered at zero, as indicated by "$V_{4a}-V_{9a}$" in FIG. 12(c), and becomes zero by being passed through the first low-pass filter 20. The angular velocity signal about the Y axis which is outputted from the first output terminal 22a of the second adding/subtracting circuit 22 becomes zero, as indicated by "$V_{4c}-V_{9c}$" in FIG. 12(c).

Figure 12D:
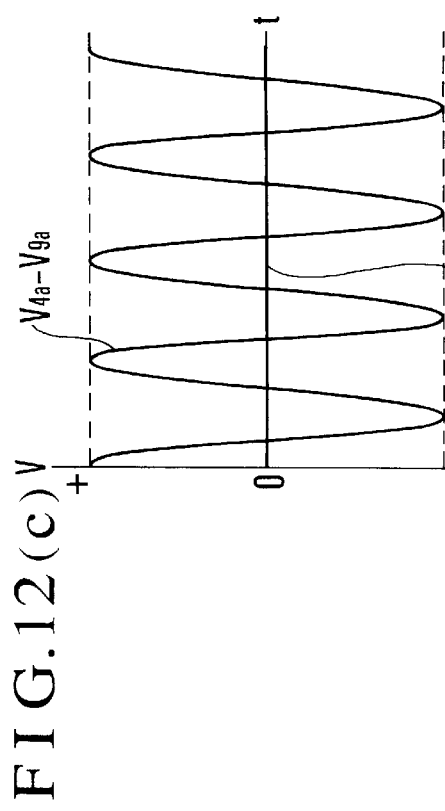

If the acceleration in the Y-axis direction is applied to the sensor, the angular velocity signal about the X axis which is outputted from the first output terminal 19a of the first adding/subtracting circuit 19 becomes a sine wave centered at zero, as indicated by "$V_{4a}-V_{9a}$" in FIG. 12(d), and becomes zero by being passed through the first low-pass filter 20. The angular velocity signal about the Y axis which is outputted from the first output terminal 22a of the second adding/subtracting circuit 22 becomes zero, as indicated by "$V_{4c}-V_{9c}$" in FIG. 12(d).

In the above-described manner, the adding/subtracting circuits perform subtraction processing on the inclinations of two oscillators in the X-axis direction and subtraction processing on the inclinations of the two oscillators in the Y-axis direction, the two oscillators being arranged to swivel in the opposite directions. The subtraction results are passed through the corresponding low-pass filters and are then amplified with a predetermined gain, thereby providing angular velocity signals about the X axis and the Y axis. In addition, the adding/subtracting circuits perform addition processing on the inclinations of such two oscillators in the X-axis direction and addition processing on the inclinations of the two oscillators in the Y-axis direction. The addition results are passed through the corresponding low-pass filters and are then amplified with a predetermined gain, thereby providing an acceleration signal.

Figure 13:
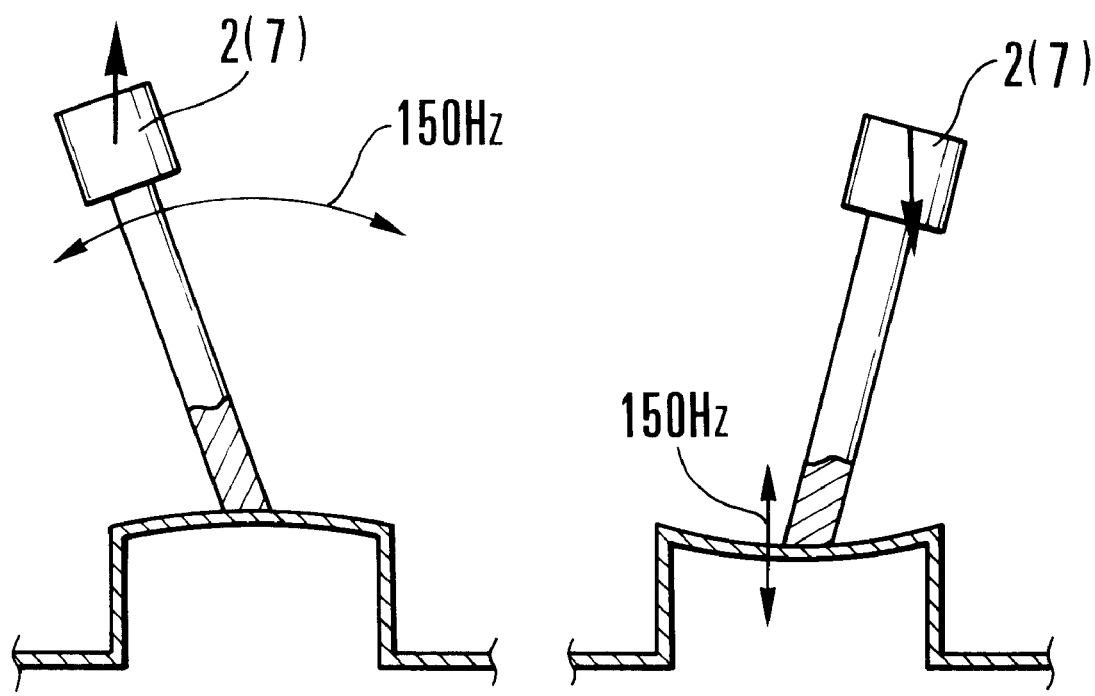
FIG. 13 is a view aiding in describing Coriolis forces which act on oscillators of a sensor according to a second embodiment of the present invention.

Although the above-described first embodiment is arranged to detect a Coriolis force from the oscillation locus of each oscillator which is inclined by the component of a force of the Coriolis force which inclines the oscillator, such Coriolis force can also be detected by making the resonant frequency of the oscillator in the Z-axis direction approximately coincident with an oscillating frequency, causing a resonance in the Z-axis direction in the oscillator by a Coriolis force, and detecting the resonance. This example will be described below with reference to FIGS. 13 and 14 as a second embodiment of the present invention.

The mechanical construction of the second embodiment of the present invention is basically identical to that of the above-described first embodiment, and only the conditions of the first and second oscillators differ between the first and second embodiments. Accordingly, the conditions of both oscillators will be described below with reference to FIGS. 1 and 13.

Referring to FIG. 1, in the above-described first embodiment, the first and second oscillators 2 and 7 and the leg portions of the first oscillation bases 3 and 8 are arranged so that the resonant frequencies of the inclination-direction normal oscillation modes of the first and second oscillators 2 and 7 approximately coincide with each other in the states of the oscillators and those of the oscillating bodies. However, in the second embodiment of the present invention, in the states of the oscillating bodies, the natural frequencies of the inclination-direction oscillation modes of the first and second oscillators 2 and 7 respectively coincide with the natural frequencies of the oscillation modes of the oscillators 2 and 7 in the Z-axis direction.

If, in the states of the oscillating bodies, the natural frequencies of the inclination-direction oscillation modes of the respective oscillators 2 and 7 are to be made coincident with the natural frequencies of the oscillation modes of the respective oscillators 2 and 7 in the Z-axis direction, it is only necessary to select the length and mass of each of the oscillators 2 and 7 and the lengths and cross sections of the leg portions of each of the oscillation bases so that the resonant frequencies of the inclination-direction oscillation modes of the respective oscillators 2 and 7 coincide with those of the oscillation modes of the respective oscillators 2 and 7 in the Z-axis direction.

In the detecting circuit 13 used in the second embodiment of the present invention, it is only necessary to alter the portion of each of the adding/subtracting circuits which processes the output signals of piezoelectric elements for detecting the inclination of the corresponding oscillator in the same direction as the inclination direction of the other oscillator. Specifically, although the above-described first embodiment is arranged in such a manner that the output signal of a piezoelectric element for detecting the inclination of an oscillator in the −X-axis (−Y-axis) direction is subtracted from the output signal of an piezoelectric element for detecting the inclination of an oscillator in the X-axis (Y-axis) direction, the second embodiment is arranged to obtain an angular velocity signal by adding together the output signal of a piezoelectric element for detecting the inclination of the oscillator in the −X-axis (−Y-axis) direction and the output signal of the piezoelectric element for detecting the inclination of the oscillator in the X-axis (Y-axis) direction.

Figure 14:
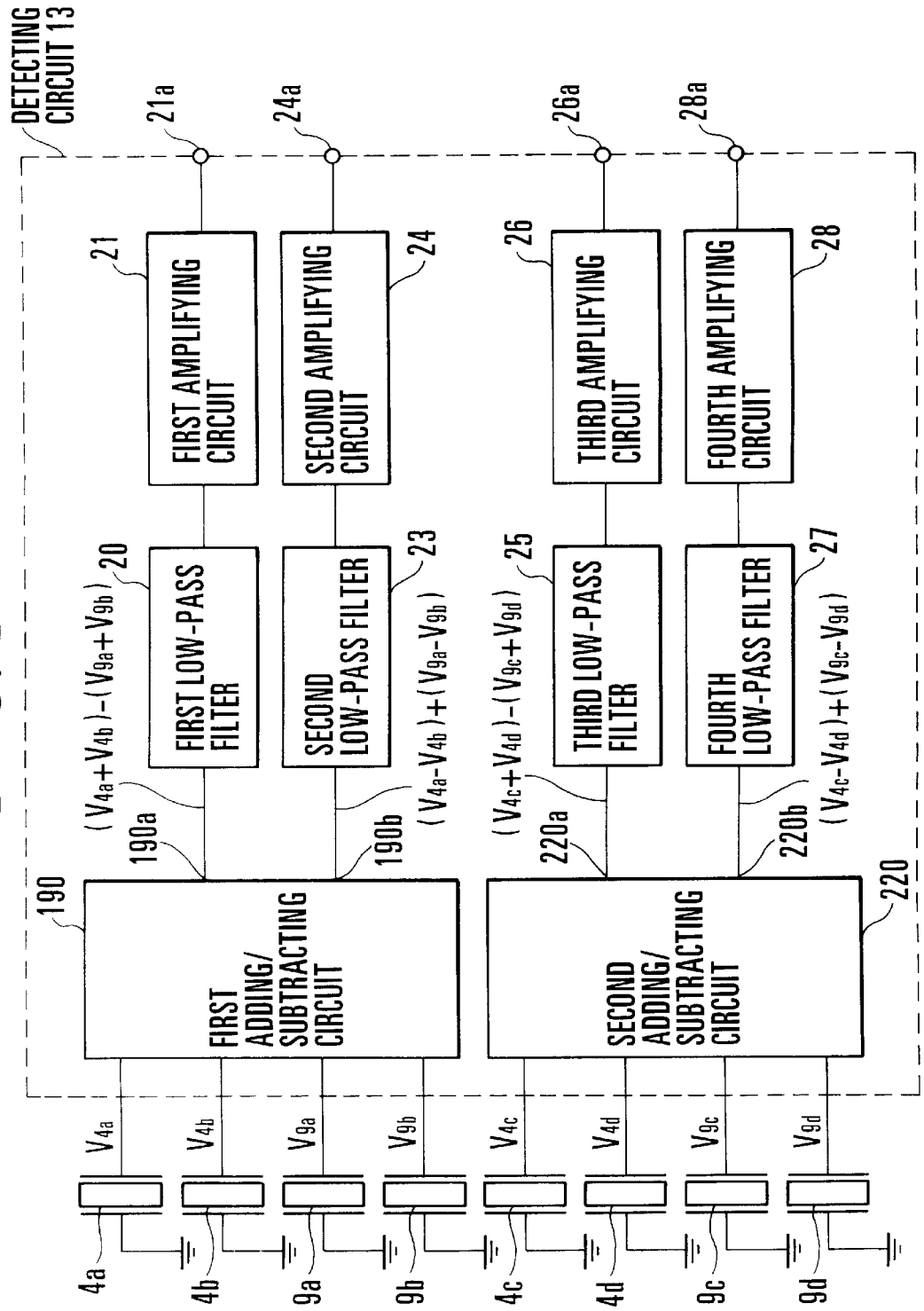
FIG. 14 is a view showing the construction of a detecting circuit of a sensor according to the second embodiment of the present invention.

Specifically, in the detecting circuit used in the second embodiment, as shown in FIG. 14, the functions of first and second adding/subtracting circuits 190 and 220 differ from those of the first and second adding/subtracting circuit 19 and 22 used in the above-described first embodiment.

The first adding/subtracting circuit 190 calculates the difference between the sum of the output signal of the first piezoelectric element 4a for detecting the inclination of the first oscillator 2 in the X-axis direction and the output signal of the second piezoelectric element 4b for detecting the inclination of the first oscillator 2 in the −X-axis direction and the sum of the output signal of the fifth piezoelectric element 9a for detecting the inclination of the second oscillator 7 in the X-axis direction and the output signal of the sixth piezoelectric element 9b for detecting the inclination of the second oscillator 7 in the −X-axis direction, and supplies such difference to a first output terminal 190a as an angular velocity signal. In addition, the first adding/subtracting circuit 190 calculates the sum of the difference between the output signal of the first piezoelectric element 4a for detecting the inclination of the first oscillator 2 in the X-axis direction and the output signal of the second piezoelectric element 4b for detecting the inclination of the first oscillator 2 in the −X-axis direction and the difference between the output signal of the fifth piezoelectric element 9a for detecting the inclination of the second oscillator 7 in the X-axis direction and the output signal of the sixth piezoelectric element 9b for detecting the inclination of the second oscillator 7 in the −X-axis direction, and supplies such sum to a second output terminal 190b as an acceleration signal.

Similarly, the second adding/subtracting circuit 220 calculates the difference between the sum of the output signal of the third piezoelectric element 4c for detecting the inclination of the first oscillator 2 in the −Y-axis direction and the output signal of the fourth piezoelectric element 4d for detecting the inclination of the first oscillator 2 in the Y-axis direction and the sum of the output signal of the seventh piezoelectric element 9c for detecting the inclination of the second oscillator 7 in the −Y-axis direction and the output signal of the eighth piezoelectric element 9d for detecting the inclination of the first oscillator 2 in the Y-axis direction, and supplies such difference to a first output terminal 220a as an angular velocity signal. In addition, the second adding/subtracting circuit 220 calculates the sum of the difference between the output signal of the third piezoelectric element 4c for detecting the inclination of the first oscillator 2 in the −Y-axis direction and the output signal of the fourth piezoelectric element 4d for detecting the inclination of the first oscillator 2 in the Y-axis direction and the difference between the output signal of the seventh piezoelectric element 9c for detecting the inclination of the second oscillator 7 in the −Y-axis direction and the output signal of the eighth piezoelectric element 9d for detecting the inclination of the second oscillator 7 in the Y-axis direction, and supplies such sum to a second output terminal 220b as an acceleration signal.

As described previously in connection with the first embodiment, the output signals of the first and second adding/subtracting circuits 190 and 220 are smoothed by the low-pass filters 20, 23 and 25, 27, and are then amplified with the predetermined amplification factors by the amplifying circuits 21, 24 and 26, 28, thereby providing an angular velocity signal about the X axis and an acceleration signal in the X-axis direction as well as an angular velocity about the Y axis and an acceleration signal in the Y-axis direction.

In the second embodiment described above, it is possible to detect the displacement and distortion of each oscillator in a direction in which a Coriolis force acts on the oscillator, whereby it is possible to obtain an output signal which is more sensitive to an applied angular velocity.

Although the first and second embodiments of the present invention are assumed to be manufactured by normal machining, it is also possible to manufacture the sensor according to the present invention by using a so-called micromachining technique to which a semiconductor manufacturing technique is applied.

An example of a sensor manufactured by such micromachining technique will be described below with reference to FIG. 15 as a third embodiment of the present invention.

Figure 15:
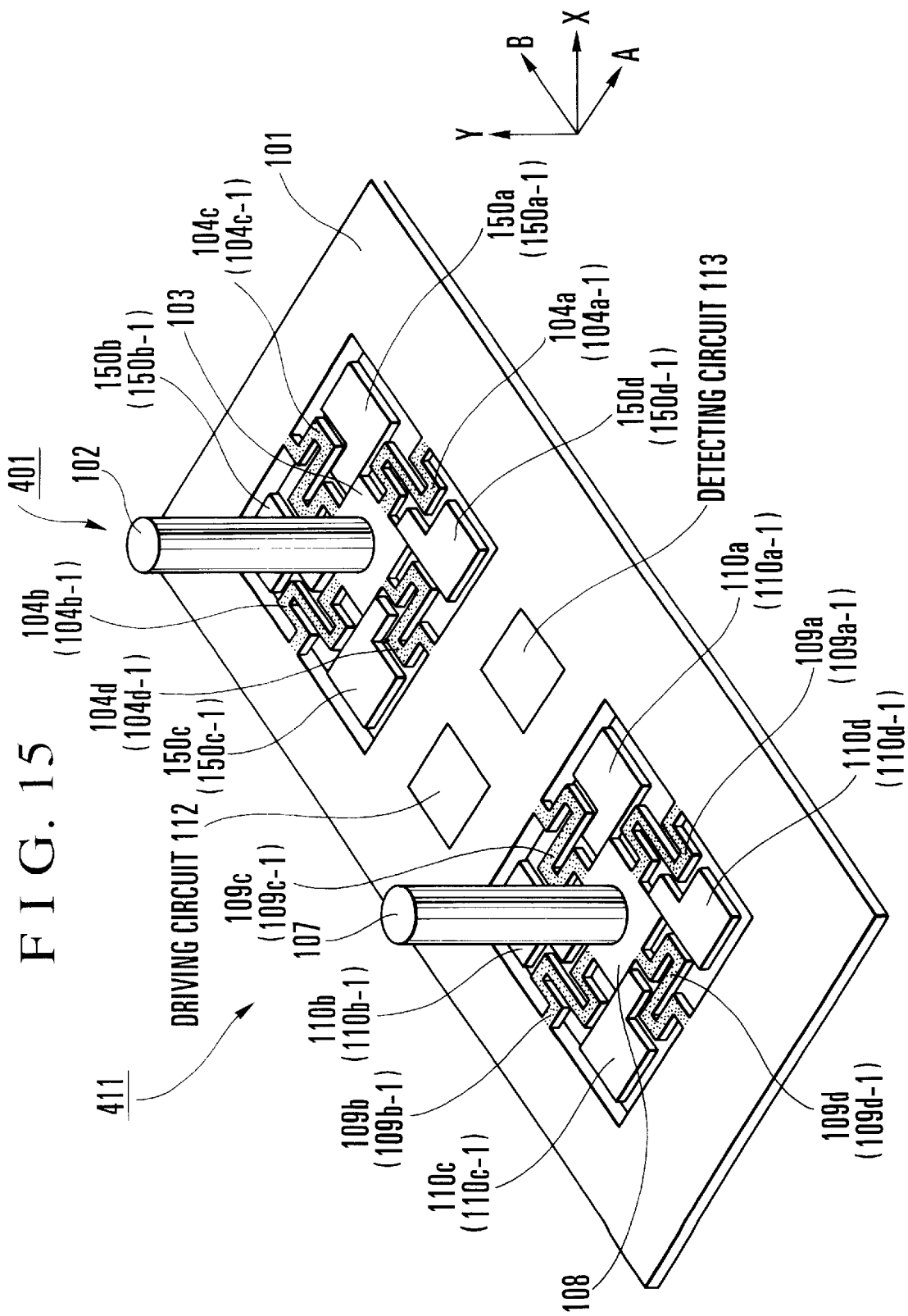
FIG. 15 is a diagrammatic perspective view showing the construction of a sensor according to a third embodiment of the present invention.

FIG. 15 is a diagrammatic perspective view of a sensor according to the third embodiment of the present invention. The sensor shown in FIG. 15 includes a silicon substrate 101, a first oscillator 102, a first oscillation base 103, spring portions 104a, 104b, 104c and 104d for elastically supporting a first oscillator 102 which constitutes a weight portion, via the first oscillation base 103, movable electrodes 105a, 105b, 105c and 105d, a second oscillator 107, a second oscillation base 108, spring portions 109a, 109b, 109c and 109d for elastically supporting the second oscillator 107 which constitutes a weight portion, via the second oscillation base 108, movable electrodes 110a, 110b, 110c and 110d, a driving circuit 112 and a detecting circuit 113.

The silicon substrate 101 is prepared by forming a circuit on a silicon wafer through a CMOS process and subjecting the silicon wafer to surface micromachining using etching and film forming techniques. Provided on the silicon substrate 101 are the first oscillation base 103, the first to fourth spring portions 104a to 104d, the first to fourth movable electrodes 150a to 150d, first to fourth fixed (driving) electrodes 106a to 106d (not shown), the second oscillation base 108, the first to fourth spring portions 109a to 109d, the first to fourth movable electrodes 110a to 110d, and fifth to eighth fixed electrodes 111a to 111d (not shown). The first oscillation base 103 is elastically supported on the silicon substrate 101 by the first to fourth spring portions 104a to 104d. The second oscillation base 108 is elastically supported on the silicon substrate 101 by the fifth to eighth spring portions 109a to 109d.

The first and second oscillators 102 and 107 each of which is formed, for example, by an application of an LIGA process, are respectively fixed to the first and second oscillation bases 103 and 108 by means such as adhesion or junction.

Each of the first to eighth spring portions 104a to 104d and 109a to 109d which elastically support the first and second oscillators 102 and 107 has a flexible shape which is folded in a zigzag manner in opposite directions perpendicular to its lengthwise direction. Because of such flexible shape, the amounts of inclinations of the first and second oscillators 102 and 107 can be increased, i.e., a large oscillation can be given to each of the first and second oscillators 102 and 107, even with a slight force.

Further, the driving circuit 112 and the detecting circuit 113 are provided on the silicon substrate 101 by a CMOS process. Although not shown in FIG. 15, a power source terminal and a terminal through which to output an angular velocity signal and an acceleration signal are provided on the silicon substrate 101.

First to fourth movable electrodes 150a-1, 150b-1, 150c-1 and 150d-1 (not shown) are respectively provided on the surfaces of the first to fourth movable electrodes 150a to 150d which are opposite to the first oscillator 102. Each of the first to fourth movable electrodes 150a-1, 150b-1, 150c-1 and 150d-1 is opposed to the corresponding one of the first to fourth fixed electrodes 106a to 106d (not shown) with a slight gap therebetween. The first to fourth movable electrodes 150a-1, 150b-1, 150c-1 and 150d-1 are electrically connected so that the voltages at the respective first to fourth movable electrodes 150a-1 to 150d-1 can be made constant, and the first to fourth fixed electrodes 106a to 106d (not shown) are connected to the driving circuit 112. When a signal of natural frequency which enables the first oscillator 102 to make an approximate swivel motion is applied to these electrodes, the first oscillator 102 is caused to make a swivel motion by a Coulomb force which acts between the first to fourth movable electrodes 150a-1, 150b-1, 150c-1 and 150d-1 and the first to fourth fixed electrodes 106a to 106d.

Similarly, fifth to eighth movable electrodes 110a-1, 110b-1, 110c-1 and 110d-1 (not shown) are respectively provided on the surfaces of the fifth to eighth movable electrodes 110a to 110d which are opposite to the second oscillator 107. Each of the fifth to eighth movable electrodes 110a-1, 110b-1, 110c-1 and 110d-1 is opposed to the corresponding one of the fifth to eighth fixed electrodes 111a to 111d (not shown) with a slight gap therebetween. The fifth to eighth movable electrodes 110a-1, 110b-1, 110c-1 and 110d-1 are electrically connected so that the voltages at the respective fifth to eighth movable electrodes 110a-1 to 110d-1 can be made constant, and the fifth to eighth fixed electrodes 111a to 111d (not shown) are connected to the driving circuit 112. When a signal of natural frequency which enables the second oscillator 107 to make an approximate swivel motion is applied to these electrodes, the second oscillator 107 is caused to make a swivel motion by a Coulomb force which acts between the fifth to eighth movable electrodes 110a-1, 110b-1, 110c-1 and 110d-1 and the fifth to eighth fixed electrodes 111a to 111d.

First to eighth piezoresistive elements 104a-1, 104b-1, 104c-1, 104d-1, 109a-1, 109b-1, 109c-1 and 109d-1 are respectively provided on the first to eighth spring portions 104a, 104b, 104c, 104d, 109a, 109b, 109c and 109d by means such as the diffusion of phosphorus in silicon, and the inclinations of each of the first and second oscillators 102 and 107 in both A and B directions shown in FIG. 15 can be detected by detecting and comparing the resistance values of the respective piezoresistive elements.

Incidentally, reference numeral 401 denotes a first oscillating body, and reference numeral 411 denotes a second oscillating body.

As is apparent from the above description, the third embodiment of the present invention to which micromachining is applied has the unique effects that not only is it possible to miniaturize of the sensor, but also that a large number of high-precision position oscillators can be easily manufactured, and also that since it is also possible to average the signals detected from the respective oscillators, precision can be easily enhanced.

In addition, in the third embodiment, since the piezoresistive elements, which are used for detecting the inclinations of the oscillators, can be constructed integrally with the spring portions, it is possible to reduce the dispersion of natural frequencies due to the adhesion of piezoelectric elements or the like, thereby realizing a higher-precision sensor. In addition, since the piezoresistive elements can be lowered in impedance, it is also possible to obtain a signal having less noise.

Incidentally, although in the third embodiment all the first to eighth electrodes are used as driving electrodes, it is also possible to provide a sensor in which, for example, the first, second, fifth and sixth electrodes are used for driving purpose and the third, fourth, seventh and eighth electrodes are used for detecting purpose, and which is arranged to detect the capacity between the movable electrodes and the fixed electrodes by means of a well-known capacity detecting circuit.

As is apparent from the above description, the sensors according to the first to third embodiments of the present invention have the following effects and advantages.

i) The piezoelectric elements are provided on the first and second oscillation bases unlike conventional arrangements in which piezoelectric elements are provided on oscillators (the first and second embodiments) or the piezoresistive elements which serve as detecting elements are provided on the first to eighth spring portions, whereby it is possible to freely determine the shapes and sizes of the oscillators (for example, as shown in FIG. 1, the free end portion and the shaft portion of each oscillator are made heavy and thin, respectively) so that a further miniaturization of the sensor can be realized.

ii) Since it is possible to freely determine the sizes and the like of the oscillators in this manner, the mass of the oscillators can be easily increased by increasing their pillar lengths, as shown in FIG. 1 and others, whereby the accuracy of detection of angular velocity and the like can be made far higher.

iii) In addition to the increase in the mass of the oscillators, since the first and second oscillation bases and the first to eighth spring portions for supporting the first and second oscillators have elasticity, large oscillations can be given to the respective oscillators, whereby the swivel motions of the respective oscillators can be enlarged.

iv) Since the first and second oscillators are made to swivel with a predetermined phase difference in directions opposite to each other to detect Coriolis forces and accelerations applied to the respective oscillators, it is possible to provide the effect of detecting angular velocities and accelerations relative to two axes with a high sensitivity.

Specifically, the angular velocities and the accelerations relative to the two-axis directions are detected by separating the respective Coriolis forces and the accelerations by making use of the fact that while the first and second oscillators are swiveling in the opposite directions, if an angular velocity occurs about the first or second axis, a Coriolis force acts on each of the oscillators in opposite directions, depending on the swivel position of the oscillator.

In addition, since the swivel phase difference between an oscillator which swivels in a forward direction and an oscillator which swivels in a backward direction is set to a predetermined phase difference, the variation and distortion of the swivel locus of each of the oscillators due to Coriolis forces which act in the opposite directions, depending on the swivel direction of the oscillator, are compared with each other at the same time, thereby detecting the angular velocity without performing sample-and-hold processing.

In addition, since the swivel phase difference between the oscillator which swivels in the forward direction and the oscillator which swivels in the backward direction is set to a predetermined phase difference, a vibration occurring in the sensor is reduced by the swivel motions of the oscillators themselves, whereby a detection signal of comparatively good S/N ratio can be obtained.

In addition, since a Coriolis force due to an angular velocity and an acceleration can be separated in spite of the aforesaid system which causes each pillar-shaped oscillator to make a swivel motion, it is possible to obtain a comparatively large output signal even from a small-size oscillator produced by micromachining.

In the description of the first to third embodiments, reference has mainly been made to the structure of each of the oscillators of the sensor, and in the description of the first and second embodiments, reference has also been made to a circuit arrangement for processing signals outputted from the oscillators and obtaining angular velocity signals and acceleration signals. However, in the above-described signal processing circuit, for example, during the detection of angular velocity signals, as is apparent from the difference in signal waveform between FIGS. 11(a) and 11(b), the angular velocity signals ($V_{4a}-V_{9a}$ and $V_{4c}-V_{9c}$) which differ from each other between the Y-axis direction and the X-axis direction are obtained, so that the accuracy of detection of each of the signals is not extremely high.

A signal processing circuit system capable of obtaining an angular velocity signal and an acceleration signal with far higher accuracy will be described below as a fourth embodiment of the present invention.

Figure 16:
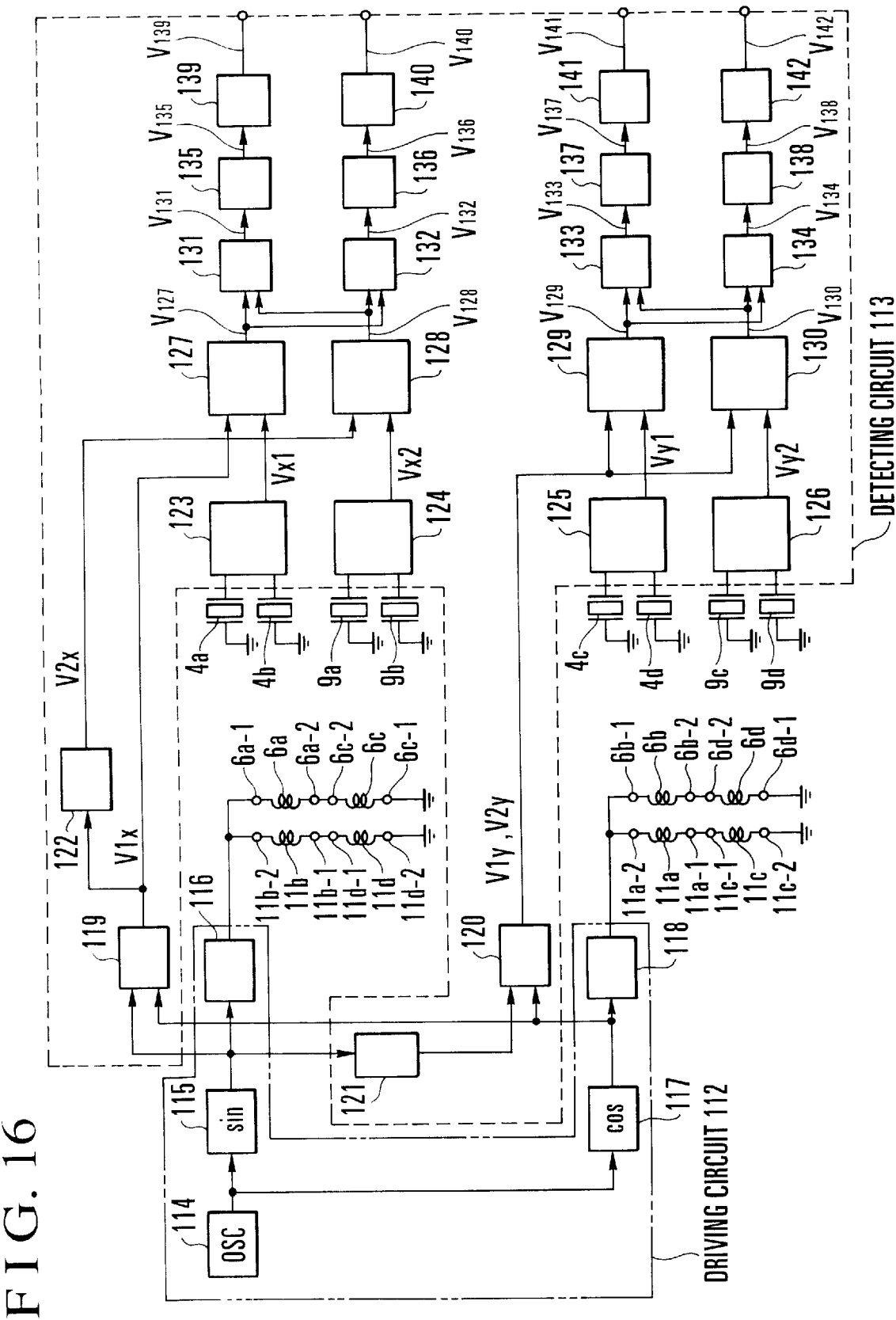
FIG. 16 is a block diagram showing a driving circuit and a detecting circuit of a sensor according to a fourth embodiment of the present invention.

FIG. 16 is a block diagram showing the signal processing circuit system of a sensor according to the fourth embodiment of the present invention, and more specifically, the constructions of the driving circuit 112 and the detecting circuit 113. Incidentally, since the mechanical structure of each oscillator of the sensor is similar to that shown in FIG. 1, the detailed description thereof is omitted.

Referring to FIG. 16, the driving circuit 112 is a driving circuit for causing a current to flow in each coil with a predetermined frequency and phase, and includes an oscillation circuit 114, a sine-wave generating circuit 115, a first driving circuit 116, a cosine-wave generating circuit 117 and a second driving circuit 118. The driving circuit 112 is provided on the substrate 1 shown in FIG. 1. The output terminal of the first driving circuit 116 is connected to the first coil 6a and the third coil 6c and to the sixth coil 11b and the eighth coil 11d so that electrical power is supplied to these coils 6a, 6c and 11b, 11d. The output terminal of the second driving circuit 118 is connected to the second coil 6b and the fourth coil 6d and to the fifth coil 11a and the seventh coil 11c so that electrical power is supplied to these coils 6b, 6d and 11a, 11c. The output terminals of the sine-wave generating circuit 115 and the cosine-wave generating circuit 117 are connected to the detecting circuit 113.

The detecting circuit 113 mutually processes the output signal of the sine-wave generating circuit 115 of the driving circuit 112 and the output signal of the cosine-wave generating circuit 117 to produce oscillating signals for the detection-axis directions of the respective first and second oscillators 2 and 7, as shown in FIG. 1. The detecting circuit 113 then produces a difference signal between the oscillating signal for the first oscillator 2 and an amplitude signal of the first oscillator 2 in the detection-axis direction thereof and a difference signal between the oscillating signal for the second oscillator 7 and an amplitude signal of the second oscillator 7 in the detection-axis direction thereof, the amplitude signals being obtained from the output signals of the first to fourth piezoelectric elements 4a to 4d. Further, the detecting circuit 113 calculates the difference between the difference signal of the first oscillator 2 and the difference signal of the second oscillator 7, performs predetermined filtering processing on the difference signal, amplifies the obtained signal with a predetermined amplification factor, and outputs an angular velocity signal. In addition, the detecting circuit 113 calculates the sum of the difference signal of the first oscillator 2 and the difference signal of the second oscillator 7, performs predetermined filtering processing on the sum signal, amplifies the obtained signal with a predetermined amplification factor, and outputs an acceleration signal.

Specifically, the detecting circuit 113 includes a first signal combining circuit 119, a second signal combining circuit 120, a first inverting amplifier circuit 121, a second inverting amplifier circuit 122, first to fourth differential amplifying circuits 123, 124, 125 and 126, a first computational processing circuit 127 for calculating the difference between the output signal of the first differential amplifying circuit 123 and the output signal of the first signal combining circuit 119, a second computational processing circuit 128 for calculating the difference between the output signal of the second differential amplifying circuit 124 and the output signal of the first signal combining circuit 119, a third computational processing circuit 129 for calculating the difference between the output signal of the third differential amplifying circuit 125 and the output signal of the second signal combining circuit 120, a fourth computational processing circuit 130 for calculating the difference between the output signal of the fourth differential amplifying circuit 126 and the output signal of the second signal combining circuit 120, a first signal processing circuit 131 for outputting the difference between the output signal of the first computational processing circuit 127 and the output signal of the second computational processing circuit 128, a second signal processing circuit 132 for outputting the sum of the output signal of the first computational processing circuit 127 and the output signal of the second computational processing circuit 128, a third signal processing circuit 133 for outputting the difference between the output signal of the third computational processing circuit 129 and the output signal of the fourth computational processing circuit 130, a fourth signal processing circuit 134 for outputting the sum of the output signal of the third computational processing circuit 129 and the output signal of the fourth computational processing circuit 130, a first low-pass filter 135, a second low-pass filter 136, a third low-pass filter 137, a fourth low-pass filter 138, a first amplifying circuit 139, a second amplifying circuit 140, a third amplifying circuit 141 and a fourth amplifying circuit 142.

The output terminal of the detecting circuit 113 having the above-described arrangement and construction outputs to the outside of the sensor an angular velocity signal about the X axis, an acceleration signal in the X-axis direction, an angular velocity signal about the Y axis and an acceleration signal in the Y-axis direction.

In the driving circuit 112 used in the fourth embodiment of the present invention shown in FIG. 16, the oscillation circuit 114 is a well-known oscillation circuit whose resonant frequency is set to a frequency at which the sine-wave generating circuit 115 and the cosine-wave generating circuit 117 generate, in the respective coils 6a, 6c, 11b, 11d and 6b, 6d, 11a, 11c, signals having frequencies at which the first and second oscillating bodies 29 and 30 are made to resonate in directions in which to incline the respective oscillators 2 and 7. The output terminal of the oscillation circuit 114 is connected to the input terminal of each of the sin-wave generating circuit 115 and the cosine-wave generating circuit 117.

The sine-wave generating circuit 115 is a circuit such as a frequency dividing circuit using, for example, a flip-flop circuit, for generating a sine wave on the basis of a signal applied to the input terminal. The output of the sine-wave generating circuit 115 is connected to the input terminal of the first driving circuit 116.

The first driving circuit 116 is a circuit for amplifying a signal applied to the input terminal, with a predetermined gain, and supplying electrical power for driving the oscillators 2 and 7 to the coils 6a, 6c and 11b, 11d.

The cosine-wave generating circuit 117 is a circuit such as a frequency dividing circuit using, for example, a flip-flop circuit, for generating a cosine wave which differs 90° in phase from the sin wave of the sine-wave generating circuit 115, on the basis of a signal applied to the input terminal. The output of the cosine-wave generating circuit 117 is connected to the input terminal of the second driving circuit 118.

The second driving circuit 118 is a circuit for amplifying with a predetermined gain a signal applied to the input terminal and supplying electrical power for driving the oscillators 2 and 7 to the coils 6b, 6d and 11a, 11c.

When a power source (not shown) of the sensor is turned on and the oscillation circuit 114 outputs a pulse of predetermined frequency, the sin-wave generating circuit 115 and the cosine-wave generating circuit 117 generate a sine wave and a cosine-wave, respectively, and the first and second driving circuits 116 and 118 start to supply electrical power to the corresponding coils.

When the sine wave and the cosine wave are applied to the corresponding coils by the first driving circuit 116 and the second driving circuit 118, respectively, the first oscillating body 29 and the second oscillating body 30 resonate with their input signals and the first and second oscillators 2 and 7 swivel in directions opposite to each other. This is because, as described previously, the respective relationships between the coils and the magnets of the first oscillating body 29 and the second oscillating body 30 are determined so that the respective inclination directions of the first oscillator 2 and the second oscillator 7 become opposite to each other (the B direction and the −B direction) for the supply of electrical power of the same polarity as shown in FIG. 1, and also because the resonant frequencies of the first and second oscillating bodies 29 and 30 are coincident with each other.

Furthermore, in the fourth embodiment, since the coils are connected in the above-described manner, the positional phase difference between the swivel motions of the first oscillator 2 and the second oscillator 7 is 180 degrees in the X-axis direction shown in FIG. 1 and 0 degrees in the Y-axis direction shown in FIG. 1.

The detecting circuit 113 used in the fourth embodiment of the present invention will be described below.

Referring to FIG. 16, the piezoelectric elements 4a, 4b, 4c, 4d and 9a, 9b, 9c, 9d for detecting the inclinations of the first and second oscillators 2 and 7 are respectively fixed to the leg portions 3a to 3d and 8a to 8d of the first and second oscillation bases 3 and 8 by adhesion, as described previously in connection with FIG. 1. If the leg portions, each having elasticity, of the first and second oscillation bases 3 and 8 are bent, the corresponding piezoelectric elements output predetermined voltages according to the amounts of bending of the respective leg portions.

The first signal combining circuit 119 produces an oscillating signal for the X-axis direction of the first oscillator 2 by combining the output signal of the sine-wave generating circuit 115 and the output signal of the cosine-wave generating circuit 117, and outputs the oscillating signal to both the first computational processing circuit 127 and the second inverting amplifier circuit 122. The second inverting amplifier circuit 122 inverts the sign of the output signal of the first signal combining circuit 119 and outputs the obtained signal to the second computational processing circuit 128 as an oscillating signal for the X-axis direction of the second oscillator 7.

The first inverting amplifier circuit 121 inverts the sign of the output signal of the sine-wave generating circuit 115 and applies the output signal to a first input terminal of the second signal combining circuit 120. A second input terminal of the second signal combining circuit 120 is connected to the output terminal of the cos-wave generating circuit 117, and the second signal combining circuit 120 produces an oscillating signal for the Y-axis direction of the first inverting amplifier circuit 121 by combining the output signal of the first inverting amplifier circuit 121 and the output signal of the cos-wave generating circuit 117, and outputs the obtained signal to both the third computational processing circuit 129 and the fourth computational processing circuit 130.

The first differential amplifying circuit 123 is a well-known differential amplifying circuit which has first and second input terminals and outputs the difference between signals applied to the first and second input terminals. The first and second input terminals are respectively connected to the first and second piezoelectric element 4a and 4b for detecting the inclination of the first oscillator 2 in the X-axis direction, and the first differential amplifying circuit 123 calculates the difference between the output signals of the respective first and second piezoelectric element 4a and 4b and outputs the obtained difference as a signal corresponding to the inclination of the first oscillator 2 in the X-axis direction.

The second differential amplifying circuit 124 is a well-known differential amplifying circuit which has first and second input terminals and outputs the difference between signals applied to the first and second input terminals. The first and second input terminals are respectively connected to the fifth and sixth piezoelectric element 9a and 9b for detecting the inclination of the second oscillator 7 in the X-axis direction, and the second differential amplifying circuit 124 calculates the difference between the output signals of the respective fifth and sixth piezoelectric element 9a and 9b and outputs the obtained difference as a signal corresponding to the inclination of the second oscillator 7 in the X-axis direction.

The third differential amplifying circuit 125 is a well-known differential amplifying circuit which has first and second input terminals and outputs the difference between signals applied to the first and second input terminals. The first and second input terminals are respectively connected to the first and second piezoelectric element 4a and 4b for detecting the inclination of the first oscillator 2 in the Y-axis direction, and the third differential amplifying circuit 125 calculates the difference between the output signals of the respective first and second piezoelectric element 4a and 4b and outputs the obtained difference as a signal corresponding to the inclination of the first oscillator 2 in the Y-axis direction.

The fourth differential amplifying circuit 126 is a well-known differential amplifying circuit which has first and second input terminals and outputs the difference between signals applied to the first and second input terminals. The first and second input terminals are respectively connected to the fifth and sixth piezoelectric element 9a and 9b for detecting the inclination of the second oscillator 7 in the Y-axis direction, and the fourth differential amplifying circuit 126 calculates the difference between the output signals of the respective fifth and sixth piezoelectric element 9a and 9b and outputs the obtained difference as a signal corresponding to the inclination of the second oscillator 7 in the Y-axis direction.

Each of the first to fourth computational processing circuits 127, 128, 129 and 130 is a well-known differential amplifying circuit which has first and second input terminals and one output terminal.

As described previously, a signal corresponding to the oscillating signal for the X-axis direction of the first oscillator 2 is inputted from the first signal combining circuit 119 to the second input terminal of the first computational processing circuit 127, while a signal corresponding to the inclination of the first oscillator 2 in the X-axis direction is inputted from the first differential amplifying circuit 123 to the second input terminal of the first computational processing circuit 127. The output terminal of the first computational processing circuit 127 is connected to both the first input terminal of the first signal processing circuit 131 and the second input terminal of the second signal processing circuit 132. Through this connection, the first computational processing circuit 127 outputs a signal which corresponds to the difference between the oscillating signal for the X-axis direction of the first oscillator 2 and the actual oscillation detection signal of the first oscillator 2 in the X-axis direction, to both the first signal processing circuit 131 and the second signal processing circuit 132.

As described previously, a signal corresponding to the oscillating signal for the X-axis direction of the second oscillator 7 is inputted from the second inverting amplifier circuit 122 to the first input terminal of the second computational processing circuit 128, while a signal corresponding to the inclination of the second oscillator 7 in the X-axis direction is inputted from the second differential amplifying circuit 124 to the second input terminal of the second computational processing circuit 128. The output terminal of the second computational processing circuit 128 is connected to both the second input terminal of the first signal processing circuit 131 and the first input terminal of the second signal processing circuit 132. Through this connection, the second computational processing circuit 128 outputs a signal which corresponds to the difference between the oscillating signal for the X-axis direction of the second oscillator 7 and the actual oscillation detection signal of the second oscillator 7 in the X-axis direction, to both the first signal processing circuit 131 and the second signal processing circuit 132.

As described previously, a signal corresponding to the oscillating signal for the Y-axis direction of the first oscillator 2 is inputted from the second signal combining circuit 120 to the first input terminal of the third computational processing circuit 129, while a signal corresponding to the inclination of the first oscillator 2 in the Y-axis direction is inputted from the third differential amplifying circuit 125 to the second input terminal of the third computational processing circuit 129. The output terminal of the third computational processing circuit 129 is connected to both the first input terminal of the third signal processing circuit 133 and the second input terminal of the fourth signal processing circuit 134. Through this connection, the third computational processing circuit 129 outputs a signal which corresponds to the difference between the oscillating signal for the Y-axis direction of the first oscillator 2 and the actual oscillation detection signal of the first oscillator 2 in the Y-axis direction, to both the third signal processing circuit 133 and the fourth signal processing circuit 134.

As described previously, a signal corresponding to the oscillating signal for the Y-axis direction of the second oscillator 7 is inputted from the second signal combining circuit 120 to the first input terminal of the fourth computational processing circuit 130, while a signal corresponding to the inclination of the second oscillator 7 in the Y-axis direction is inputted from the fourth differential amplifying circuit 126 to the second input terminal of the fourth computational processing circuit 130. The output terminal of the fourth computational processing circuit 130 is connected to both the second input terminal of the third signal processing circuit 133 and the first input terminal of the fourth signal processing circuit 134. Through this connection, the fourth computational processing circuit 130 outputs a signal which corresponds to the difference between the oscillating signal for the Y-axis direction of the second oscillator 7 and the actual oscillation detection signal of the second oscillator 7 in the Y-axis direction, to both the third signal processing circuit 133 and the fourth signal processing circuit 134.

The first signal processing circuit 131 is a well-known differential amplifying circuit which has first and second input terminals and one output terminal and amplifies with a predetermined amplification factor the difference between signals applied to the first and second input terminals and supplies the obtained signal to the output terminal. A signal corresponding to the difference between the oscillating signal for the X-axis direction of the first oscillator 2 and the actual oscillation detection signal of the first oscillator 2 in the X-axis direction is inputted from the first computational processing circuit 127 to the first input terminal of the first signal processing circuit 131, while a signal corresponding to the difference between the oscillating signal for the X-axis direction of the second oscillator 7 and the actual oscillation detection signal of the second oscillator 7 in the X-axis direction is inputted from the second computational processing circuit 128 to the second input terminal of the first signal processing circuit 131. The first signal processing circuit 131 performs differential amplification on those signals and applies an output signal to the input terminal of the first filter circuit 135.

The first filter circuit 135 is a well-known low-pass filter circuit which outputs to the first amplifying circuit 139 only the low-frequency component of the signal inputted from the first signal processing circuit 131. The first amplifying circuit 139 is a well-known amplifying circuit which amplifies the signal inputted from the first filter circuit 135 with a predetermined amplification factor and outputs the obtained signal.

Through this arrangement, an output signal corresponding to an angular velocity about the X axis which is applied to the sensor is obtained from the output terminal of the first amplifying circuit 139.

The second signal processing circuit 132 is a well-known adding circuit which has first and second input terminals and one output terminal and amplifies with a predetermined amplification factor the sum of signals applied to the first and second input terminals and supplies the obtained signal to the output terminal. A signal corresponding to the difference between the oscillating signal for the X-axis direction of the second oscillator 7 and the actual oscillation detection signal of the second oscillator 7 in the X-axis direction is inputted from the second computational processing circuit 128 to the first input terminal of the second signal processing circuit 132, while a signal corresponding to the difference between the oscillating signal for the X-axis direction of the first oscillator 2 and the actual oscillation detection signal of the first oscillator 2 in the X-axis direction is inputted from the first computational processing circuit 127 to the second input terminal of the second signal processing circuit 132. The second signal processing circuit 132 performs an addition on those signals and applies an output signal to the input terminal of the second filter circuit 136.

The second filter circuit 136 is a well-known low-pass filter circuit which outputs to the second amplifying circuit 140 only the low-frequency component of the signal inputted from the second signal processing circuit 132. The second amplifying circuit 140 is a well-known amplifying circuit which amplifies the signal inputted from the second filter circuit 136 with a predetermined amplification factor and outputs the obtained signal.

Through this arrangement, an output signal corresponding to an acceleration in the X-axis direction which is applied to the sensor is obtained from the output terminal of the second amplifying circuit 140.

The third signal processing circuit 133 is a well-known differential amplifying circuit which has first and second input terminals and one output terminal and amplifies with a predetermined amplification factor the difference between signals applied to the first and second input terminals and supplies the obtained signal to the output terminal. A signal corresponding to the difference between the oscillating signal for the Y-axis direction of the first oscillator 2 and the actual oscillation detection signal of the first oscillator 2 in the Y-axis direction is inputted from the third computational processing circuit 129 to the first input terminal of the third signal processing circuit 133, while a signal corresponding to the difference between the oscillating signal for the Y-axis direction of the second oscillator 7 and the actual oscillation detection signal of the second oscillator 7 in the Y-axis direction is inputted from the fourth computational processing circuit 130 to the second input terminal of the third signal processing circuit 133. The third signal processing circuit 133 performs differential amplification on those signals and applies an output signal to the input terminal of the third filter circuit 137.

The third filter circuit 137 is a well-known low-pass filter circuit which outputs to the third amplifying circuit 141 only the low-frequency component of the signal inputted from the third signal processing circuit 133. The third amplifying circuit 141 is a well-known amplifying circuit which amplifies the signal inputted from the third low-pass filter circuit 137 with a predetermined amplification factor and outputs the obtained signal.

Through this arrangement, an output signal corresponding to an angular velocity about the Y axis which is applied to the sensor is obtained from the output terminal of the third amplifying circuit 141.

The fourth signal processing circuit 134 is a well-known adding circuit which has first and second input terminals and one output terminal and amplifies with a predetermined amplification factor the sum of signals applied to the first and second input terminals and supplies the obtained signal to the output terminal. A signal corresponding to the difference between the oscillating signal for the Y-axis direction of the second oscillator 7 and the actual oscillation detection signal of the second oscillator 7 in the Y-axis direction is inputted from the fourth computational processing circuit 130 to the first input terminal of the fourth signal processing circuit 134, while a signal corresponding to the difference between the oscillating signal for the Y-axis direction of the first oscillator 2 and the actual oscillation detection signal of the first oscillator 2 in the Y-axis direction is inputted from the third computational processing circuit 129 to the second input terminal of the fourth signal processing circuit 134. The fourth signal processing circuit 134 performs an addition on those signals and applies an output signal to the input terminal of the fourth filter circuit 138.

The fourth filter circuit 138 is a well-known low-pass filter circuit which outputs to the fourth amplifying circuit 142 only the low-frequency component of the signal inputted from the fourth signal processing circuit 134. The fourth amplifying circuit 142 is a well-known amplifying circuit which amplifies the signal inputted from the fourth filter circuit 138 with a predetermined amplification factor and outputs the obtained signal.

Through this arrangement, an output signal corresponding to an acceleration in the Y-axis direction which is applied to the sensor is obtained from the output terminal of the fourth amplifying circuit 142.

The operation of the sensor according to the fourth embodiment of the present invention will be described below with reference to FIGS. 4(a) and 4(b) through 6 which has been used in the previous description of the first embodiment.

When the power source of the sensor is turned on and the oscillation circuit 114 in the driving circuit 112 outputs a pulse, the above-described coils attract and repulse the corresponding magnets and the first oscillator 2 starts a motion which contains an oscillation component in which its inclination in the X-axis direction leads its inclination in the Y-axis direction by 90 degrees in phase, as shown in FIG. 4(a). This motion is the swivel motion of the first oscillator 2. Specifically, the first oscillator 2 makes a counterclockwise swivel motion as viewed from above the first oscillator 2 in FIG. 1, owing to the above-described arrangement of the coils and the magnets as well as the above-described connection of the coils. Similarly, the second oscillator 7 starts a motion which contains an oscillation component in which its inclination in the X-axis direction lags behind its inclination in the Y-axis direction by 90 degrees in phase, as shown in FIG. 4(b). This motion is the swivel motion of the second oscillator 7. Specifically, the second oscillator 7 makes a clockwise swivel motion as viewed from above the second oscillator 7 in FIG. 1, owing to the above-described arrangement of the coils and the magnets as well as the above-described connection of the coils.

In addition, owing to the above-described arrangement of the coils and the magnets as well as the above-described connection of the coils, in the swivel motions of the first and second oscillators 2 and 7, their oscillation components in the Y-axis direction are in phase with each other, while their oscillation components in the X-axis direction are 180 degrees out of phase with each other.

The respective motions of the first oscillator 2 and the second oscillator 7 are expressed by the following equations:

$(x1, y1) = (r \cdot \cos \omega t, r \cdot \sin \omega t)$, $(x2, y2) = (-r \cdot \cos \omega t, r \cdot \sin \omega t)$, where (x1, y1) represents the coordinates of the free end portion of the first oscillator 2, (x2, y2) represents the coordinates of the free end portion of the second oscillator 7 and their respective origins lie at the swivel centers of the oscillators 2 and 7.

If each of the oscillators 2 and 7 which are making such swivel motions is rotated in the direction indicated by the arrow about its X axis in FIG. 1, a Coriolis force proportional to the Y-axis direction velocity component of the swivel motion of the oscillator acts in the Z-axis direction. The action of such Coriolis force on the first oscillator 2 will be described below by way of example, with reference to FIG. 5. As shown in FIG. 5 which is a cross-sectional view taken in the X-axis direction, of the first oscillating body 29 placed in the position which is most inclined in the −X-axis direction, the Coriolis force in the Z-axis direction is applied to the first oscillator 2 to the greatest extent when the first oscillator 2 is placed in the position most inclined in the −X-axis direction. When in the position opposite to that shown in FIG. 5, i.e., in the position which is most inclined in the +X-axis direction which is opposite in phase to the −X-axis direction, the Coriolis force in the −Z-axis direction is applied to the first oscillator 2 to the greatest extent. If there is no angular velocity about the Y axis, no Coriolis force occurs when the first oscillator 2 is placed in the position most inclined in the Y-axis direction.

Since inverse Coriolis forces act on the oscillator 2 at 180-degrees offset positions during one rotation while the first oscillator 2 is making a swivel motion in the above-described manner, the swivel locus of the first oscillator 2 is enlarged in amplitude on one side and reduced in amplitude on other side, as shown in FIG. 6. In FIG. 6, as described previously, symbol fc denotes the Coriolis force, symbol fs denotes the force of an oscillator-inclining component of the Coriolis force, symbol θo denotes the swivel range of the oscillator on which the Coriolis force is not acting, and symbol θo' denotes the swivel range of the oscillator on which the Coriolis force is acting. Since inverse Coriolis forces act on the oscillator 2 at 180-degrees offset positions, the directions of the oscillator-inclining components of the respective Coriolis forces become the same, whereby the swivel range of the oscillator is inclined from θo to θo'.

Similarly, the oscillation locus of the second oscillator 7 is also enlarged in amplitude on one side and reduced in amplitude on the other side by the Coriolis force, but since the swivel direction of the second oscillator 7 is opposite to that of the first oscillator 2, the directions in which the Coriolis forces act on both oscillators 2 and 7 become opposite to each other, so that the second oscillator 7 is enlarged in amplitude on one side and reduced in amplitude on the other side, in a manner opposite to that of the first oscillator 2.

In addition, if an acceleration acts on each of the first and second oscillators 2 and 7 in the X-axis direction at the same time, each of the first and second oscillators 2 and 7 is inclined in the −X-axis direction.

When the Coriolis forces act on the respective oscillators 2 and 7 in the above-described manner, the coordinates (x1, y1) of the free end portion of the first oscillator 2 and the coordinates (x2, y2) of the free end portion of the second oscillator 7 are expressed as:

$(x1, y1) = ((r + A \cdot \Phi \cdot \cos \omega t) \cos \omega t - B \cdot a, r \cdot \sin \omega t)$, $(x2, y2) = ((r - A \cdot \Phi \cdot \cos \omega t) \cos \omega t - B \cdot a, r \cdot \sin \omega t)$, where Φ is the angular velocity about the X axis, "a" is the acceleration in the X axis, and A and B are constants.

Such inclinations of the oscillators 2 and 7 can be detected by measuring a voltage which is generated by each of the first to eighth piezoelectric elements 4a to 4d and 9a to 9d when they are bent similarly to the first and second piezoelectric element 4a and 4b shown in FIG. 5.

From the voltages which are generated by the respective piezoelectric elements when they are bent, an output signal Vx1 of the first differential amplifying circuit 123 for outputting a signal corresponding to the inclination of the first oscillator 2 in the X-axis direction becomes:

$Vx1 = C \cdot (r + A \cdot \Phi \cdot \cos \omega t) \cos \omega t - B \cdot a$, and an output signal Vx2 of the second differential amplifying circuit 124 for outputting a signal corresponding to the inclination of the second oscillator 7 in the X-axis direction becomes:

$Vx2 = C \cdot (r + A \cdot \Phi \cdot \cos \omega t) \cos \omega t - B \cdot a$, and an output signal Vy1 of the third differential amplifying circuit 125 for outputting a signal corresponding to the inclination of the first oscillator 2 in the Y-axis direction becomes:

$Vy1 = C \cdot r \cdot \sin \omega t$, and an output signal Vy2 of the fourth differential amplifying circuit 126 for outputting a signal corresponding to the inclination of the second oscillator 7 in the Y-axis direction becomes:

$Vy2 = C \cdot r \cdot \sin \omega t$.

Letting k be a constant indicating of the amplification factor of each of the computational processing circuits, the X-axis direction component V1x of the oscillating signal for the first oscillator 2, which is outputted from the first signal combining circuit 119, and the Y-axis direction component V1y of the oscillating signal for the first oscillator 2, which is outputted from the second signal combining circuit 120, become:

$(V1x, V1y) = (k \cdot \cos \omega t, k \cdot \sin \omega t)$, and the X-axis direction component V2x of the oscillating signal for the second oscillator 7, which is outputted from the second inverting amplifier circuit 122, and the Y-axis direction component V2y of the oscillating signal for the first oscillator 2, which is outputted from the second signal combining circuit 120, become:

$(V2x, V2y) = (-k \cdot \cos \omega t, k \cdot \sin \omega t)$.

The first to fourth computational processing circuits 127, 128, 129 and 130 respectively subtract the corresponding oscillating signals from the output signals of the first to fourth differential amplifying circuit 123, 124, 125 and 126 and output the following output signals $V_{127}$, $V_{128}$, $V_{129}$ and $V_{130}$:

$V_{127} = C \cdot (r + A \cdot \Phi \cdot \cos \omega t) \cos \omega t - B \cdot a - k \cdot \cos \omega t$, $V_{128} = -C \cdot (r + A \cdot \Phi \cdot \cos \omega t) \cos \omega t - B \cdot a - (-k \cdot \cos \omega t)$, $V_{129} = C \cdot r \cdot \sin \omega t - k \cdot \sin \omega t$, and $V_{130} = C \cdot r \cdot \sin \omega t - k \cdot \sin \omega t$.

If k is set to an appropriate constant, i.e., $k = C \cdot r$, then $V_{127} = C \cdot A \cdot \Phi \cdot \cos^2 \omega t - B \cdot a$, $V_{128} = -C \cdot A \cdot \Phi \cdot \cos^2 \omega t - B \cdot a$, $V_{129} = 0$, and $V_{130} = 0$.

Furthermore, the first signal processing circuit 131 subtracts the output signal $V_{128}$ of the second computational processing circuit 128 from the output signal $V_{127}$ of the first computational processing circuit 127, and outputs the following output signal $V_{131}$:

$V_{131} = 2 \cdot A \cdot \Phi \cdot \cos^2 \omega t$.

This signal is passed through the first low-pass filter 135 and is then amplified with a predetermined amplification factor G by the first amplifying circuit 139, whereby an output signal $V_{139}$ of the first amplifying circuit 139 which is the output of the sensor becomes:

$V_{139} = G \cdot \Phi$.

This signal is an angular velocity signal indicative of the angular velocity about the X axis which is applied to the sensor.

Furthermore, the second signal processing circuit 132 calculates the sum of the output signal $V_{127}$ of the first computational processing circuit 127 and the output signal $V_{128}$ of the second computational processing circuit 128, and outputs the following output signal $V_{132}$:

$V_{132} = -2 \cdot B \cdot a$.

This signal is passed through the second low-pass filter 136 and is then amplified with a predetermined amplification factor F by the second amplifying circuit 140, whereby an output signal $V_{140}$ of the second amplifying circuit 140, which is the output of the sensor, becomes:

$V_{140} = F \cdot a$.

This signal is an acceleration signal indicative of the acceleration in the X-axis direction which is applied to the sensor.

The above description has referred to the case in which the angular velocity about the X axis and the acceleration in the X-axis direction are applied to the sensor, but even in a case where an angular velocity about the Y axis and an acceleration in the Y-axis direction are applied to the sensor, a detection process which is completely the same as the above-described one is carried out so that an angular velocity signal indicative of the angular velocity about the Y axis is obtained as an output signal $V_{141}$ of the third amplifying circuit 141, while an acceleration signal indicative of the acceleration in the Y axis is obtained as an output signal $V_{142}$ of the fourth amplifying circuit 142.

In the above-described fourth embodiment, in both the detection of an angular velocity and the detection of an acceleration, signals obtained by calculating the differences between oscillation detection signals and oscillating signals are subjected to subtractions or additions to obtain output signals. However, it is also possible to adopt an arrangement in which only in the detection of an angular velocity, a signal indicative of the difference between an oscillation detection signal and an oscillating signal are used, and in the detection of an acceleration, only an oscillation detection signal is used.

An example in which a signal indicative of the difference between an oscillation detection signal and an oscillating signal are used for detecting only an angular velocity, and only an oscillation detection signal is subjected to signal processing for detecting an acceleration will be described below with reference to FIG. 17 as a fifth embodiment of the present invention.

A sensor according to the fifth embodiment of the present invention is identical in construction to that according to the first embodiment of the present invention, and the detailed description is omitted.

Figure 17:
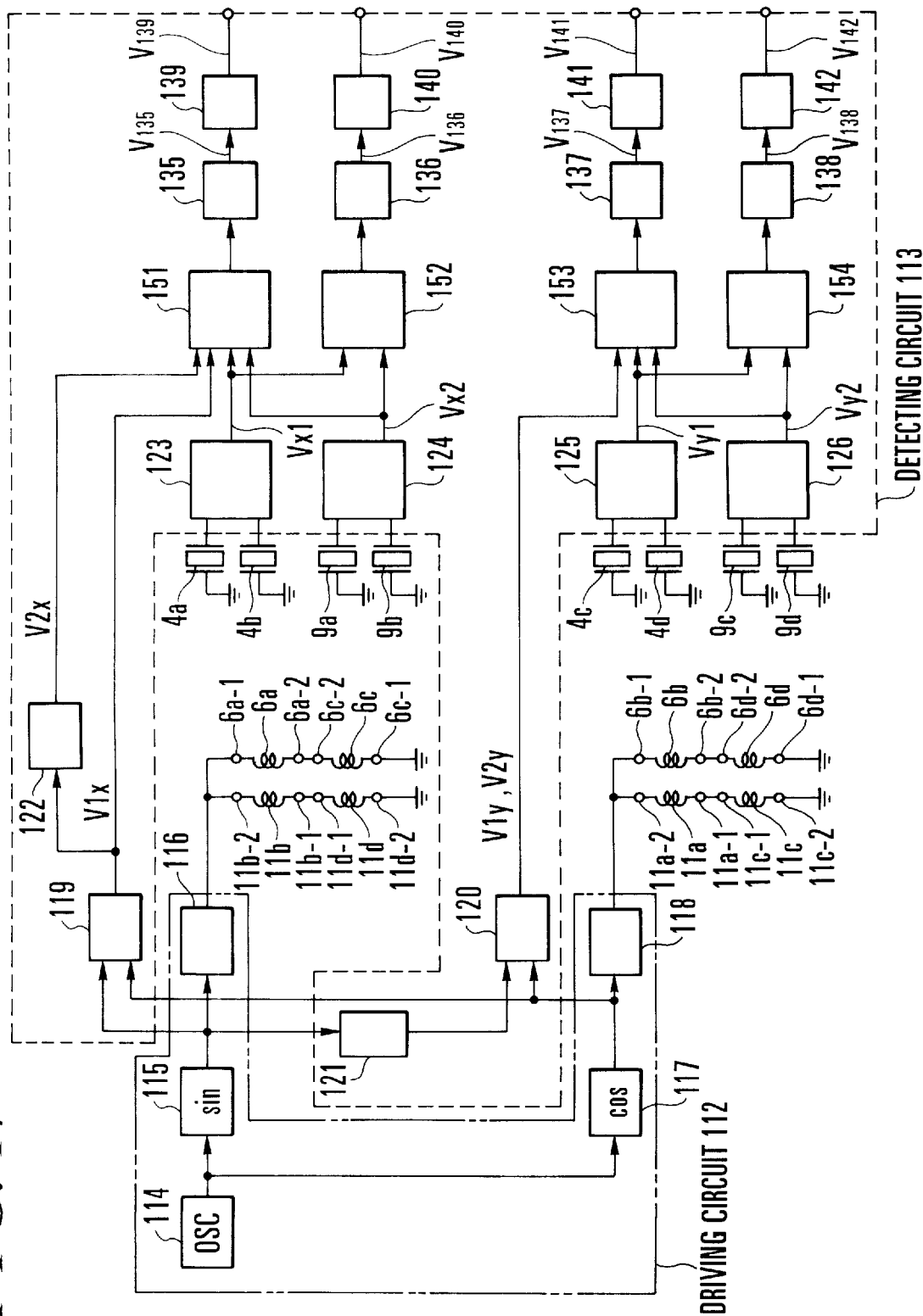
FIG. 17 is a block diagram showing a driving circuit and a detecting circuit of a sensor according to a fifth embodiment of the present invention.

FIG. 17 is a block diagram showing the constructions of the driving circuit 112 and the detecting circuit 113 which are used in the fifth embodiment of the present invention. Incidentally, identical reference numerals are used to denote constituent elements identical to the above-described ones incorporated in the fourth embodiment shown in FIG. 16, and the description thereof is omitted.

Referring to FIG. 17, a first computational processing circuit 151 has first, second, third and fourth input terminals. The X component (V1x) of an oscillating signal for the first oscillator 2 is applied to the first input terminal from the first signal combining circuit 119, the X component (V2x) of an oscillating signal for the second oscillator 7 is applied to the second input terminal from the second inverting amplifier circuit 122, the oscillation detection signal Vx1 of the first oscillator 2 in the X-axis direction is applied to the third input terminal from the first differential amplifying circuit 123, and the oscillation detection signal Vx2 of the second oscillator 7 in the X-axis direction is applied to the fourth input terminal from the second differential amplifying circuit 124.

The first computational processing circuit 151 subtracts the signal V1x of the X component of the oscillating signal for the first oscillator 2 which is applied to the first input terminal, from the detection signal Vx1 of the oscillation component of the first oscillator 2 in the X-axis direction, which is applied to the third input terminal, thereby obtaining a first difference signal. The first computational processing circuit 151 also subtracts the signal V2x of the X component of the oscillating signal for the second oscillator 7 which is applied to the second input terminal, from the detection signal Vx2 of the oscillation component of the second oscillator 7 in the X-axis direction, which is applied to the fourth input terminal, thereby obtaining a second difference signal. The first computational processing circuit 151 subtracts the second difference signal from the first difference signal and outputs the result ($V_{151}$) to the first low-pass filter 135 as an angular velocity signal about the X axis.

A second computational processing circuit 152 has first and second input terminals. The oscillation detection signal Vx1 of the first oscillator 2 in the X-axis direction is applied to the first input terminal from the first differential amplifying circuit 123, and the oscillation detection signal Vx2 of the second oscillator 7 in the X-axis direction is applied to the second input terminal from the second differential amplifying circuit 124. The second computational processing circuit 152 subtracts the oscillation detection signal V2x of the second oscillator 7 in the X-axis direction from the oscillation detection signal Vx1 of the first oscillator 2 in the X-axis direction, and outputs the obtained signal to the second low-pass filter 136 as a signal indicative of an acceleration in the X-axis direction.

Similarly, a third computational processing circuit 153 has first, second, third and fourth input terminals. The Y component (V1y) of the oscillating signal for the first oscillator 2 is applied to the first input terminal from the second signal combining circuit 120, the Y component (V2y) of the oscillating signal for the second oscillator 7 is applied to the second input terminal from the second inverting amplifier circuit 120, the oscillation detection signal Vy1 of the first oscillator 2 in the X-axis direction is applied to the third input terminal from the third differential amplifying circuit 125, and the oscillation detection signal Vy2 of the second oscillator 7 in the Y-axis direction is applied to the fourth input terminal from the fourth differential amplifying circuit 126.

The third computational processing circuit 153 subtracts the signal V1y of the Y component of the oscillating signal for the first oscillator 2 which is applied to the first input terminal, from the detection signal Vy1 of the oscillation component of the first oscillator 2 in the Y-axis direction, which is applied to the third input terminal, thereby obtaining a first difference signal. The third computational processing circuit 153 also subtracts the signal V2y of the Y component of the oscillating signal for the second oscillator 7 which is applied to the second input terminal, from the detection signal Vy2 of the oscillation component of the second oscillator 7 in the Y-axis direction, which is applied to the fourth input terminal, thereby obtaining a second difference signal. The third computational processing circuit 153 subtracts the second difference signal from the first difference signal and outputs the result ($V_{153}$) to the third low-pass filter 137 as an angular velocity signal about the Y axis.

A fourth computational processing circuit 154 has first and second input terminals. The oscillation detection signal Vy1 of the first oscillator 2 in the Y-axis direction is applied to the first input terminal from the third differential amplifying circuit 125, and the oscillation detection signal Vy2 of the second oscillator 7 in the Y-axis direction is applied to the second input terminal from the fourth differential amplifying circuit 126. The fourth computational processing circuit 154 supplies its output signal to the fourth low-pass filter 138 as a signal ($V_{154}$) indicative of the acceleration of the first oscillator 2 in the Y-axis direction.

Owing to the above-described arrangement and construction, in the fifth embodiment of the present invention, the number of signal processing circuits for acceleration detection can be made smaller by one stage than in the first embodiment of the present invention, whereby the sensor becomes insusceptible to noise and, therefore, becomes able to effect high-precision acceleration detection.

Although, in each of the fourth and fifth embodiments of the present invention, a variation in the oscillation state of each of the oscillators is subjected to signal processing to obtain a detection signal, it is also possible to adopt a so-called servo type of sensor arrangement which controls each oscillator to cause it to make a constant oscillation, by using a control signal, and processes the control signal to obtain an angular velocity signal and an acceleration signal.

In each of the fourth and fifth embodiments of the present invention, in order to cancel the difference between a direction in which each oscillator is oscillated and a direction in which the movement of the oscillator is detected, oscillating signals for the respective oscillators are combined to obtain components of the oscillating signals for their respective detection directions. However, it is also possible to cancel the difference in direction between an oscillating signal and a detection signal by combining such detection signals.

Furthermore, although the fourth and fifth embodiments of the present invention are assumed to be manufactured by normal machining, it is also possible to manufacture the sensor according to the present invention by using a so-called micromachining technique to which a semiconductor manufacturing technique is applied. An example of a sensor manufactured by such micromachining technique will be described below with reference to FIG. 18 as a sixth embodiment of the present invention.

Figure 18:
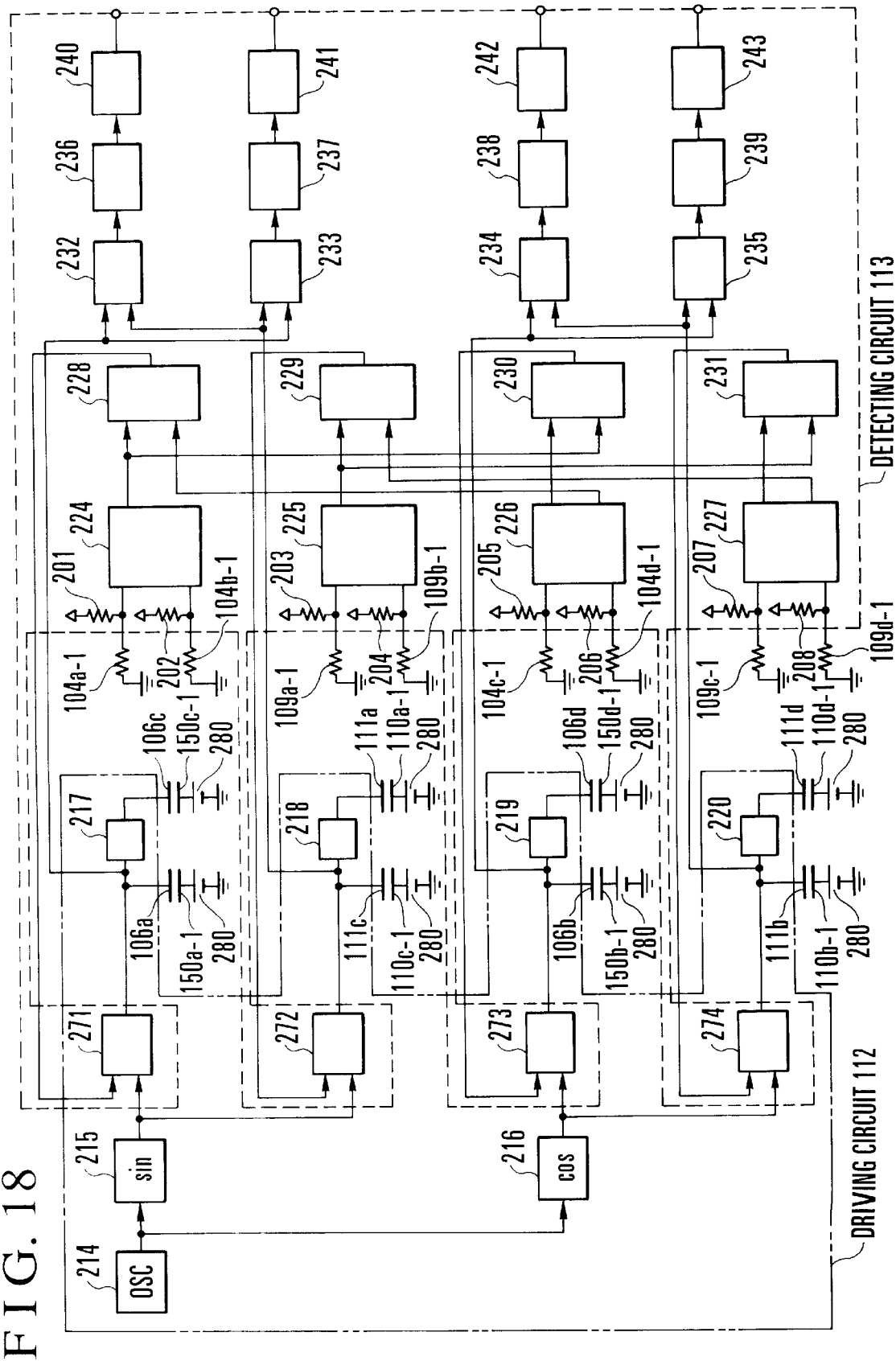
FIG. 18 is a block diagram showing a driving circuit and a detecting circuit of a sensor according to a sixth embodiment of the present invention.

Incidentally, since the structure of the sensor manufactured by the micromachining technique is similar to that shown in FIG. 15 in connection with the third embodiment, the detailed description thereof is omitted, and in FIG. 18, identical reference numerals are used to denote constituent elements identical to those shown in FIG. 15.

Referring to FIG. 18, the driving circuit 112 includes an oscillation circuit 214, a sine-wave generating circuit 215, a cosine-wave generating circuit 217, servo circuits 271, 272, 273 and 274 and inverting amplifier circuits 217, 218, 219 and 220.

The detecting circuit 113 includes bias resistors 201, 202, 203, 204, 205, 206, 207 and 208, differential amplifying circuits 224, 225, 226 and 227, computational processing circuits 228, 229, 230 and 232, signal processing circuits 232, 233, 234 and 235 similar to the signal processing circuits described previously in connection with the fourth embodiment, low-pass filters 236, 237, 238 and 239 similar to the low-pass filters described previously in connection with the fourth embodiment, and amplifying circuits 240, 241, 242 and 243 similar to the amplifying circuits described previously in connection with the fourth embodiment, as well as the aforesaid servo circuits 271, 272, 273 and 274. In FIG. 18, reference numeral 280 denotes a bias power source.

The first, second, third and fourth servo circuits 271, 272, 273 and 274 are well-known servo circuits each of which has first and second input terminals and one output terminal and outputs the difference between signals applied to the first and second input terminals.

The first, second, third and fourth differential amplifying circuits 224, 225, 226 and 227 are well-known differential amplifying circuits each of which has first and second input terminals and one output terminal. Connected to each of the first and second input terminals are a corresponding piezoresistive element and bias resistor which are associated with the inclination of the first or second oscillator 102 or 107 in the A or B direction, and each of the first, second, third and fourth differential amplifying circuits 224, 225, 226 and 227 outputs a signal corresponding to the inclination of the first or second oscillator 102 or 107 in the A or B direction.

The first and second computational processing circuits 228 and 229 are well-known adding circuits each of which has first and second input terminals and one output terminal and add together signals applied to the first and second input terminals and outputs the addition signal through the output terminal. The third and fourth computational processing circuits 230 and 231 are well-known subtracting circuits each of which has first and second input terminals and one output terminal and subtracts a signal applied to the second (first) input terminal from a signal applied to the first (second) input terminal and outputs the obtained signal through the output terminal.

The operation of the sixth embodiment of the present invention will be described below.

When the oscillation circuit 214 starts its oscillation, the sine-wave generating circuit 215 outputs a sine wave to the first and second servo circuits 271 and 272. At this time, since neither of the oscillators 102 and 107 has yet oscillated and the respective signals inputted to the first and second servo circuits 271 and 272 from the first and second computational processing circuits 228 and 229 are zeros, the first and second servo circuits 271 and 272 start to supply electrical power to the corresponding fixed electrodes 106a, 106c and 111c, 111a (not shown in FIG. 15) which are respectively provided for oscillating the first and second oscillators 102 and 107. Voltages are applied to the respective fixed electrodes 106a, 106c, 111c and 111a and a Coulomb force acts between the fixed electrodes 106a, 106c, 111c and 111a and the movable electrodes 150a-1, 150c-1, 110c-1 and 110a-1, thereby oscillating each of the first and second oscillators 102 and 107 in the X-axis direction shown in FIG. 15 in a sine-wave fashion.

Similarly, the cosine-wave generating circuit 216 outputs a cosine wave to the third and fourth servo circuits 273 and 274. At this time, since neither of the oscillators 102 and 107 has yet oscillated and the respective signals inputted to the third and fourth servo circuits 273 and 274 from the third and fourth computational processing circuits 130 and 131 are zeros, the third and fourth servo circuits 273 and 274 start to supply electrical power to the corresponding fixed electrodes 106b, 106d and 111b, 111d (not shown in FIG. 15) which are respectively provided for oscillating the first and second oscillators 102 and 107. Voltages are applied to the respective fixed electrodes 106b, 106d, 111b and 111d and a Coulomb force acts between the fixed electrodes 106b, 106d, 111b and 111d and the movable electrodes 150b-1, 150d-1, 110b-1 and 110d-1, thereby oscillating each of the first and second oscillators 102 and 107 in the Y-axis direction shown in FIG. 15 on a cos-wave fashion. The first oscillator 102 and the second oscillator 107 swivel in directions opposite to each other because the electrodes of each of the oscillators 102 and 107 which are opposed to each other in the X-axis direction are connected in the same polarity, for example, the fixed electrode 106a opposed to the movable electrode 150a-1 and the fixed electrode 111c opposed to the movable electrode 110c-1 are connected to each other.

When the first and second oscillators 102 and 107 start to swivel, the spring portions which elastically support the oscillation bases 103 and 108 of the respective first and second oscillators 102 and 107 are distorted and the respective resistance values of the previously-described piezoresistive elements provided on the spring portions vary. Thus, the first differential amplifying circuit 224 outputs a signal corresponding to the inclination of the first oscillator 102 in the A direction, the second differential amplifying circuit 225 outputs a signal corresponding to the inclination of the second oscillator 107 in the A direction, the third differential amplifying circuit 226 outputs a signal corresponding to the inclination of the first oscillator 102 in the B direction, and the fourth differential amplifying circuit 227 outputs a signal corresponding to the inclination of the second oscillator 107 in the B direction.

The first computational processing circuit 228 adds together the signal corresponding to the inclination of the first oscillator 102 in the A direction, which signal has been inputted from the first differential amplifying circuit 224, and the signal corresponding to the inclination of the first oscillator 102 in B direction, which signal has been inputted from the third computational processing circuit 226, and outputs a signal corresponding to the inclination of the first oscillator 102 in the X-axis direction, to the input terminal of the first servo circuit 271. The first servo circuit 271 controls its output signal to be applied to the corresponding electrode, so that the oscillation of the first oscillator 102 in the X-axis direction becomes an oscillation corresponding to the input signal from the sine-wave generating circuit 215.

Similarly, the second computational processing circuit 229 outputs a signal corresponding to the inclination of the second oscillator 107 in the X-axis direction, the third computational processing circuit 230 outputs a signal corresponding to the inclination of the first oscillator 102 in the Y-axis direction, and the fourth computational processing circuit 231 outputs a signal corresponding to the inclination of the second oscillator 107 in the Y-axis direction. Then, each of the second, third and fourth servo circuits 272, 273 and 274 controls the oscillation of the corresponding one of the first and second oscillators 102 and 107 so that its input sine or cosine waves and an actual oscillation correspond to each other.

At this time, the output signal of each of the first, second, third and fourth servo circuits 271, 272, 273 and 274 is a signal indicative of the difference between the locus of an oscillation based on the oscillating signal and the locus of an actual oscillation of the oscillator 102 or 107. In a manner similar to that described previously in connection with the fourth embodiment, these signals are respectively passed through the signal processing circuits 232, 233, 234 and 235, the low-pass filters 236, 237, 238 and 239, and the amplifying circuits 240, 241, 242 and 243, whereby angular velocities about the X axis and the Y axis and accelerations in the X-axis direction and the Y-axis direction are obtained.

As is apparent from the above description, the fourth embodiment of the present invention to which micromachining is applied has the unique effects that not only is it possible to miniaturize the sensor, but also it is unnecessary to limit the number of oscillators to two as described previously and it is also possible to easily manufacture a large number of high-precision oscillators, and also that since it is also possible to average the signals detected from the respective oscillators, precision can be easily enhanced.

In addition, in the sixth embodiment, since the piezoresistive elements, which are used for detecting the inclinations of the oscillators, can be constructed integrally with the spring portions, it is possible to reduce the dispersion of natural frequencies due to the adhesion of piezoelectric elements or the like, thereby realizing a higher-precision sensor. In addition, since the piezoresistive elements can be lowered in impedance, it is also possible to obtain a signal having less noise.

Furthermore, according to the sixth embodiment using a servo type of sensor, it is possible to obtain a sensor of far higher sensitivity.

In addition, since a sensor produced by micromachining is constructed as a servo type of sensor, it is possible to reduce the gaps between electrodes used for driving and also to obtain a strong Coulomb force even with a low voltage, so that higher detection sensitivity can be obtained with less electrical power.

Because the oscillators make swivel motions, when they are housed in a case, a standing wave does not easily occur and, therefore, stable performance can be obtained.

In any of the sensors according to the fourth to sixth embodiments, a plurality of oscillators are made to swivel with a predetermined phase difference in directions opposite to each other to detect Coriolis forces and accelerations applied to the respective oscillators, it is possible to provide the effect of detecting angular velocities and accelerations relative to two axes with a high sensitivity and at a high S/N ratio.

A seventh embodiment of the present invention will be described below.

The mechanical construction of the seventh embodiment is identical to that shown in FIG. 1.

Figure 19:
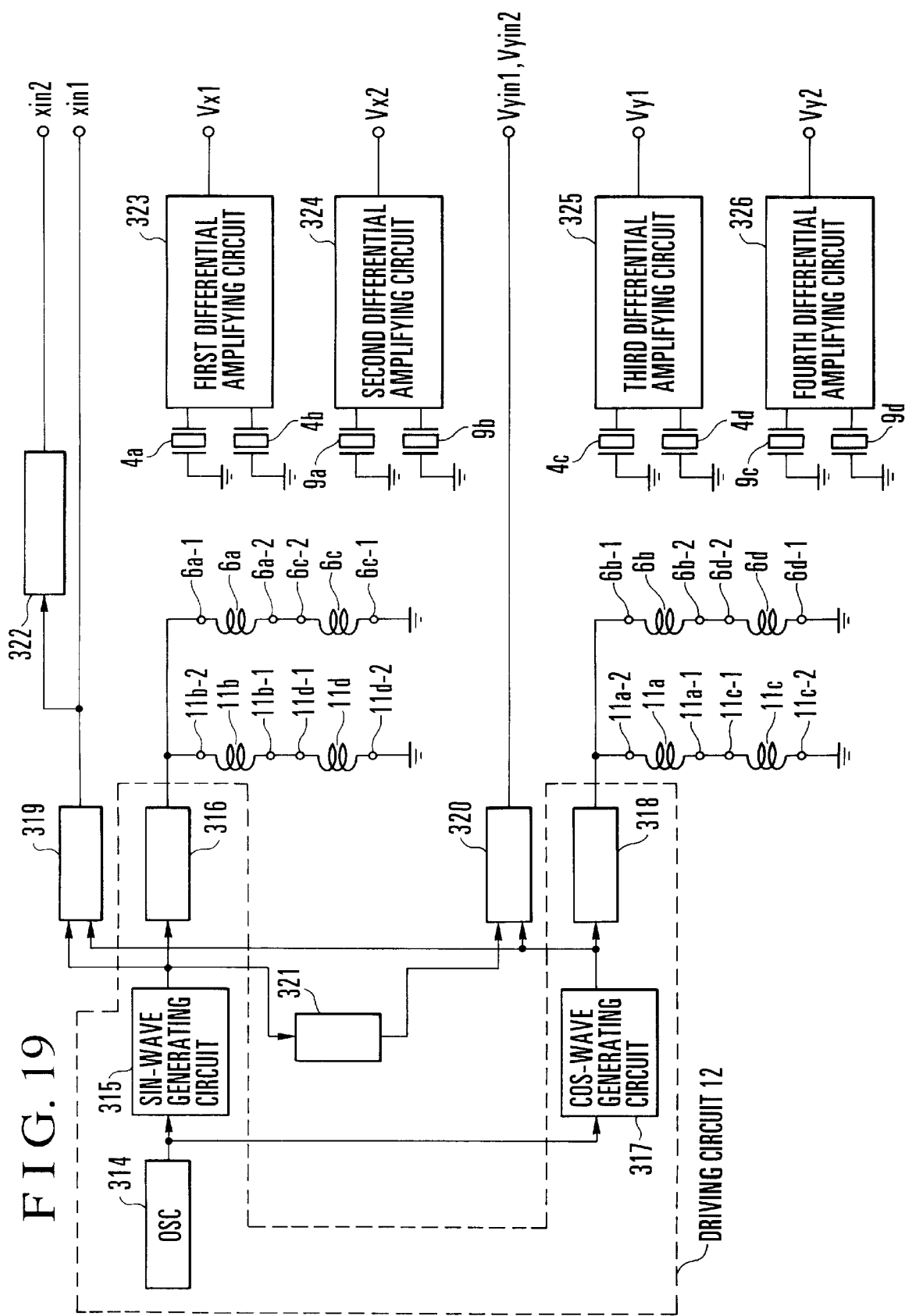
FIG. 19 is a block diagram showing the constructions of a driving circuit and a signal detecting circuit of a sensor according to a seventh embodiment of the present invention.
Figure 20:
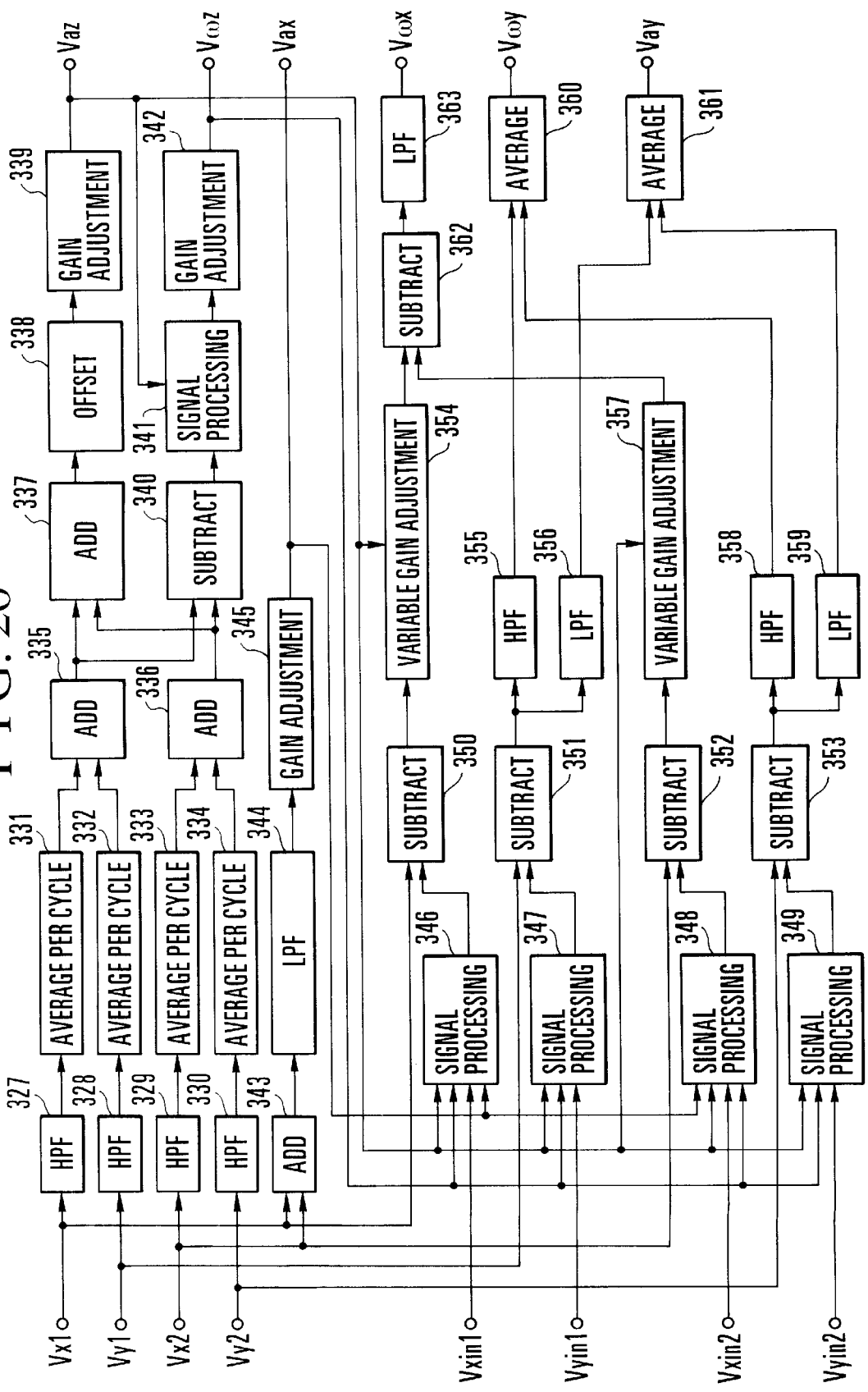
FIG. 20 is a block diagram showing the construction of a detecting circuit of the sensor according to the seventh embodiment of the present invention.

The circuit arrangement of the seventh embodiment will be described below with reference to FIGS. 19 and 20. FIG. 19 is a block diagram showing the driving circuit 12 and a signal detecting part (which includes part of a detecting circuit portion), and FIG. 20 is a block diagram showing the detecting circuit 13.

The driving circuit 12 is provided for causing a current to flow in each of the coils 6a to 11d with a predetermined frequency and phase. The driving circuit 12 includes an oscillation circuit 314, a sine-wave generating circuit 315, a first driving circuit 316, a cosine-wave generating circuit 317 and a second driving circuit 318, and is provided on the substrate 1.

The oscillation circuit 314 is a well-known oscillation circuit whose output terminal is connected to the input terminal of each of the sine-wave generating circuit 315 and the cosine-wave generating circuit 317.

The sine-wave generating circuit 315 is a circuit such as a frequency dividing circuit using, for example, a flip-flop circuit, for generating a sine wave on the basis of a signal applied to the input terminal. The output terminal of the sine-wave generating circuit 315 is connected to the input terminal of the first driving circuit 316.

The first driving circuit 316 is a circuit for amplifying a signal applied to the input terminal, with a predetermined gain, and supplying electrical power for driving the oscillating bodies 29 and 30 to the aforesaid coils.

The cosine-wave generating circuit 317 is a circuit such as a frequency dividing circuit using, for example, a flip-flop circuit, for generating a cosine wave which differs 90° in phase from the sine wave of the sin-wave generating circuit 315, on the basis of a pulse signal applied to the input terminal. The output terminal of the cosine-wave generating circuit 317 is connected to the input terminal of the second driving circuit 318.

The second driving circuit 318 is a circuit for amplifying with a predetermined gain a signal applied to the input terminal and supplying electrical power for driving the first and second oscillating bodies 29 and 30 to the aforesaid coils.

The output terminal of the first driving circuit 316 is connected to the first terminal 6a-1 of the first coil 6a and to the terminal 11b-1 of the sixth coil 11b so that electrical power is supplied to these coils. The output terminal of the second driving circuit 318 is connected to the first terminal 6b-1 of the second coil 6b and the first terminal 11a-1 of the fifth coil 11a so that electrical power is supplied to these coils.

In the driving circuit 12 used in the embodiment of the present invention shown in FIG. 19, the oscillation circuit 314 is a well-known oscillation circuit whose resonant frequency is set to a frequency at which the sine-wave generating circuit 315 and the cosine-wave generating circuit 317 generate, in the respective coils described previously, signals having frequencies at which the first and second oscillating bodies 29 and 30 are made to resonate in directions in which to incline the respective oscillators 2 and 7. The output terminal of the oscillation circuit 314 is connected to the input terminal of each of the sine-wave generating circuit 315 and the cosine-wave generating circuit 317.

In FIG. 19, the signal detecting part shown in a portion not surrounded by dashed lines includes first and second signal combining circuits 319 and 320 and first and second inverting circuits 321 and 322. Incidentally, differential amplifying circuits 323 to 326 are contained in the above-described detecting circuit 13.

The first and second signal combining circuits 319 and 320 are well-known adding circuits, while the first and second inverting circuits 321 and 322 are well-known inverting amplifying circuits.

The input terminal of the first signal combining circuit 319 is connected to the output terminal of the sine-wave generating circuit 315 and the output terminal of the cosine-wave generating circuit 317, and the first signal combining circuit 319 processes signals inputted from these output terminals and outputs through an output terminal Vxin1 a signal xin1 corresponding to the X component of an oscillating signal for the first oscillating body 29.

The second oscillating body 30 is oscillated in such a manner that its motion is spatially out of phase with that of the first oscillating body 29 by 180 degrees in the X-axis direction. The second inverting circuit 322 inverts the sign of the output signal of the first signal combining circuit 319 and outputs through an output terminal Vxin2 a signal xin2 corresponding to the X component of an oscillating signal for the second oscillator 410.

The input terminal of the second signal combining circuit 320 is connected to the output terminal of the cos-wave generating circuit 317 and the output terminal of the first inverting circuit 321, and the input terminal of the first inverting circuit 321 which outputs a signal of inverted sine wave is connected to the sine-wave generating circuit 315. The second signal combining circuit 320 processes signals inputted from the cosine-wave generating circuit 317 and the first inverting circuit 321, and output signals yin1 and yin2 which correspond to the respective Y components of the oscillating signals for the first and second oscillating bodies 29 and 30, through output terminals Vyin1 and Vyin2.

The signal detecting part mutually processes the output signal of the sine-wave generating circuit 315 of the driving circuit 12 and the output signal of the cosine-wave generating circuit 317 to produce oscillating signals for the X- and Y-axis directions of the respective first and second oscillators 2 and 7, and these oscillating signals for the X- and Y-axis directions are transmitted to the detecting circuit 13 to be described later, through the terminals Vxin1, Vyin1, Vxin2 and Vyin2.

The operation of the driving circuit 12 and the oscillating operations for the first and second oscillators 2 and 7 according to the seventh embodiment will be described below.

The output terminal of the first driving circuit 316 in the driving circuit 12 is connected to the first terminal 6a-1 of the first coil 6a, the second terminal 6a-2 of the first coil 6a is connected to the second terminal 6c-2 of the third coil 6c, and the first terminal 6c-1 of the third coil 6c is connected to a ground level.

Through this connection, magnetic fields of opposite polarity are produced on the surfaces of the first and third coils 6a and 6c which face the respective magnets 5a and 5c. For example, assuming that the output terminal of the first driving circuit 316 is at its + output level, if the first coil 6a attracts the first magnet 5a, the third coil 6c repulses the third magnet 5c so that the second oscillator 7 is inclined in the A direction as viewed in FIG. 1, because the first, third, fifth and seventh magnets 5a, 5c, 10a and 10c are opposite in polarity to the second, fourth, sixth and eighth magnets 5b, 5d, 10b and 10d, as described previously.

Furthermore, the output terminal of the first driving circuit 316 in the driving circuit 12 is connected to the second terminal 11b-2 of the sixth coil 11b, the first terminal 11b-1 of the sixth coil 11b is connected to the first terminal 11d-1 of the eighth coil 11d, and the second terminal 11d-2 of the eighth coil 11d is connected to the ground level.

Through this connection, magnetic fields of opposite polarity are produced on the surfaces of the sixth and eighth coils 11b and 11d which face the respective magnets 10b and 10d. For example, assuming that the output terminal of the first driving circuit 316 is at the + output level, the sixth coil 11b attracts the sixth magnet 10b and the eighth coil 11d repulses the eighth magnet 10d so that the second oscillator 7 is inclined in the −B direction (the direction opposite to the B direction) as viewed in FIG. 1, because the first, third, fifth and seventh magnets 5a, 5c, 10a and 10c are opposite in polarity to the second, fourth, sixth and eighth magnets 5b, 5d, 10b and 10d, as described previously.

In addition, the output terminal of the second driving circuit 318 in the driving circuit 12 is connected to the first terminal 6b-1 of the second coil 6b, the second terminal 6b-2 of the second coil 6b is connected to the second terminal 6d-2 of the fourth coil 6d, and the first terminal 6d-1 of the fourth coil 6d is connected to the ground level.

Through this connection, magnetic fields of opposite polarity are produced on the surfaces of the second and fourth coils 6b and 6d which face the respective magnets 5b and 5d. For example, assuming that the output terminal of the second driving circuit 318 is at its + output level, the second coil 6b repulses the second magnet 5b and the fourth coil 6d attracts the fourth magnet 5d so that the second oscillator 7 is inclined in the B direction as viewed in FIG. 1, because the first, third, fifth and seventh magnets 5a, 5c, 10a and 10c are opposite in polarity to the second, fourth, sixth and eighth magnets 5b, 5d, 10b and 10d, as described previously.

Furthermore, the output terminal of the second driving circuit 318 in the driving circuit 12 is connected to the second terminal 11a-2 of the fifth coil 11a, the first terminal 11a-1 of the fifth coil 11a is connected to the first terminal 11c-1 of the seventh coil 11c, and the second terminal 11c-2 of the seventh coil 11c is connected to the ground level.

Through this connection, magnetic fields of opposite polarity are produced on the surfaces of the fifth and seventh coils 11a and 11c which face the respective magnets 10a and 10c. For example, assuming that the output terminal of the second driving circuit 318 is at the + output level, the fifth coil 11a repulses the fifth magnet 10a and the seventh coil 11c attracts the seventh magnet 10c so that the second oscillator 7 is inclined in the −A direction (the direction opposite to the A direction) as viewed in FIG. 1.

When the power source (not shown) of the sensor is turned on and the oscillation circuit 314 outputs a pulse of predetermined frequency, the sine-wave generating circuit 315 and the cosine-wave generating circuit 317 generate a sine wave and a cosine-wave, respectively, and the first and second driving circuits 316 and 318 start to supply electrical power to the corresponding coils.

When the sine wave and the cosine wave are applied to the corresponding coils by the first driving circuit 316 and the second driving circuit 318, respectively, the first oscillating body 29 and the second oscillating body 30 resonate with their input signals and the first and second oscillators 2 and 7 swivel in directions opposite to each other. This is because, as described previously, the respective relationships between the coils and the magnets of the first oscillating body 29 and the second oscillating body 30 are determined so that the respective inclination directions of the first oscillator 2 and the second oscillator 7 become opposite to each other in the B direction for the supply of electrical power of the same polarity, as shown in FIG. 1, and also because the resonant frequencies of the first and second oscillating bodies 29 and 30 are coincident with each other.

Furthermore, in the seventh embodiment, since the coils are connected in the above-described manner, the positional phase difference between the swivel motions of the first oscillator 2 and the second oscillator 7 is 180 degrees in the X-axis direction shown in FIG. 1 and 0 in the Y-axis direction shown in FIG. 1.

The detecting circuit 13 used in the seventh embodiment will be described below in detail with reference to FIGS. 19 and 20.

Referring to FIG. 19, the piezoelectric elements 4a, 4b, 4c and 4d and the piezoelectric elements 9a, 9b, 9c and 9d are fixed by adhesion to the corresponding leg portions of the first and second oscillation bases 3 and 8, for detecting the respective inclinations of the first and second oscillators 2 and 7, as described previously. If the leg portions, each having elasticity, of the first and second oscillation bases 3 and 8 are bent, the corresponding piezoelectric elements output predetermined voltages according to the amounts of bending of the respective leg portions.

A first differential amplifying circuit 323 is a well-known differential amplifying circuit which has first and second input terminals and outputs the difference between signals applied to the first and second input terminals. The first and second input terminals are respectively connected to the first and second piezoelectric element 4a and 4b for detecting the inclination of the first oscillator 2 in the X-axis direction, and the first differential amplifying circuit 323 calculates the difference between the output signals of the respective first and second piezoelectric element 4a and 4b and outputs the obtained difference through an output terminal Vx1 as a signal x1 corresponding to the inclination of the first oscillator 2 in the X-axis direction.

A second differential amplifying circuit 324 is a well-known differential amplifying circuit which has first and second input terminals and outputs the difference between signals applied to the first and second input terminals. The first and second input terminals are respectively connected to the fifth and sixth piezoelectric element 9a and 9b for detecting the inclination of the second oscillator 7 in the X-axis direction, and the second differential amplifying circuit 324 calculates the difference between the output signals of the respective fifth and sixth piezoelectric element 9a and 9b and outputs the obtained difference through an output terminal Vx2 as a signal x2 corresponding to the inclination of the second oscillator 7 in the X-axis direction.

A third differential amplifying circuit 325 is a well-known differential amplifying circuit which has first and second input terminals and outputs the difference between signals applied to the first and second input terminals. The first and second input terminals are respectively connected to the first and second piezoelectric element 4a and 4b for detecting the inclination of the first oscillator 2 in the Y-axis direction, and the third differential amplifying circuit 325 calculates the difference between the output signals of the respective first and second piezoelectric element 4a and 4b and outputs the obtained difference through an output terminal Vy1 as a signal y1 corresponding to the inclination of the first oscillator 2 in the Y-axis direction.

A fourth differential amplifying circuit 326 is a well-known differential amplifying circuit which has first and second input terminals and outputs the difference between signals applied to the first and second input terminals. The first and second input terminals are respectively connected to the fifth and sixth piezoelectric element 9a and 9b for detecting the inclination of the second oscillator 7 in the Y-axis direction, and the fourth differential amplifying circuit 326 calculates the difference between the output signals of the respective fifth and sixth piezoelectric element 9a and 9b and outputs the obtained difference through an output terminal Vy2 as a signal y2 corresponding to the inclination of the second oscillator 7 in the Y-axis direction.

FIG. 20 is a block diagram showing the detecting circuit 13 excluding the differential amplifying circuits 323 to 326 shown in FIG. 19. Referring to FIG. 20, first, second, third and fourth high-pass filters 327, 328, 329 and 330 are well-known high-pass filters each of which passes only the high-frequency component of its input signal. First, second, third and fourth average-per-cycle circuits 331, 332, 333 and 334 receive input signals from the respective filters 327, 328, 329 and 330, and output signals which correspond to the averages value per cycle of swivel motions of the aforesaid oscillating bodies 2 and 7.

Each of first and second adding circuits 335 and 336 adds together its input signals and outputs the obtained signal. A third adding circuit 337 adds together its input signals and outputs the obtained signal. A first direct-current offset circuit 338 offsets its input signal by a predetermined voltage value and outputs the obtained signal. A first gain adjusting circuit 339 amplifies its input signal with a predetermined amplification factor and outputs the obtained signal. A first subtracting circuit 340 subtracts an input signal applied to a second input terminal from an input signal applied to a first input terminal, and outputs the obtained signal. A first signal processing circuit 341 performs signal processing on a first input signal on the basis of a signal applied to a second input terminal, and outputs the obtained signal. A second gain adjusting circuit 342 amplified its input signal with a predetermined amplification factor, and outputs the obtained signal. A fourth adding circuit 343 adds together its input signals and outputs the obtained signal. Reference numeral 344 denotes a first low-pass filter.

A third gain adjusting circuit 345 amplifies its input signal with a predetermined amplification factor and outputs the obtained signal. Each of second, third, fourth and fifth signal processing circuits 346, 347, 348 and 349 performs predetermined processing on its input signals and output the obtained signal. Reference numerals 350, 351, 352 and 353 denote second, third, fourth and fifth subtracting circuits. A first variable gain adjusting circuit 354 amplifies an input signal applied to its input terminal, with a predetermined magnification factor determined by an input signal applied to its control terminal, and outputs the obtained signal. Reference numerals 355 denotes a fifth high-pass filter, and reference numeral 356 denotes a second low-pass filter. A second variable gain adjusting circuit 357 amplifies an input signal applied to its input terminal, with a predetermined magnification factor determined by an input signal applied to its control terminal, and outputs the obtained signal. Reference numerals 358 denotes a sixth high-pass filter, reference numeral 359 denotes a third low-pass filter, reference numerals 360 and 361 denote first and second averaging circuits, reference numeral 362 denotes a sixth subtracting circuit, and reference numeral 363 denotes a fourth low-pass filter.

The operation of the sensor according to the seventh embodiment will be described below with reference to FIGS. 1, 19 and 20.

When the power source of the sensor is turned on and the oscillation circuit 314 in the driving circuit 12 outputs a pulse, the above-described coils attract and repulse the corresponding magnets and the first oscillator 2 starts a motion which contains an oscillation component in which its inclination in the X-axis direction leads its inclination in the Y-axis direction by 90 degrees in phase. This motion is the swivel motion of the first oscillator 2. In the seventh embodiment, the first oscillator 2 makes a counterclockwise swivel motion as viewed from above the first oscillator 2 in FIG. 1, owing to the above-described arrangement of the coils and the magnets as well as the above-described connection of the coils. Similarly, the second oscillator 7 starts a motion which contains an oscillation component in which its inclination in the X-axis direction lags behind its inclination in the Y-axis direction by 90 degrees in phase. This motion is the swivel motion of the second oscillator 7. Specifically, the second oscillator 7 makes a clockwise swivel motion as viewed from above the second oscillator 7 in FIG. 1, owing to the above-described arrangement of the coils and the magnets as well as the above-described connection of the coils.

In addition, owing to the above-described arrangement of the coils and the magnets as well as the above-described connection of the coils, in the swivel motions of the first and second oscillators 2 and 7, their oscillation components in the Y-axis direction are in phase with each other, while their oscillation components in the X-axis direction are 180 degrees out of phase with each other.

The respective motions of the first oscillator 2 and the second oscillator 7 are expressed by the following equations:

$$(x1, y1)=(r \cdot \cos \omega t, r \cdot \sin \omega t),$$

$$(x2, y2)=(-r \cdot \cos \omega t, r \cdot \sin \omega t),$$

where (x1, y1) represents the coordinates of the free end portion of the first oscillator 2; (x2, y2) represents the coordinates of the free end portion of the second oscillator 7; their respective origins lie at the swivel centers of the oscillators 2 and 7; and r is a constant indicative of a swivel radius.

In the above-described circuit arrangement shown in FIGS. 19 and 20 according to the seventh embodiment, signals which respectively correspond to the coordinates (x1, y1) of the free end portion of the first oscillator 2 and the coordinates (x2, y2) of the free end portion of the second oscillator 7 are produced at the respective output terminals Vx1, Vy1, Vx2 and Vy2.

If an acceleration ax in the X-axis direction, an acceleration ay in the Y-axis direction, an acceleration az in the Z-axis direction, an angular velocity ωx about the X-axis direction, an angular velocity ωy about the Y-axis direction, and an angular velocity ωz about the Z-axis direction act on the first oscillator 2 and the second oscillator 7, the coordinates (x1, y1) and the coordinates (x2, y2) are expressed as:

$$x1=(r+B \cdot C \cdot az) \times (1+A \cdot \omega z+A \cdot C \cdot \omega x \cdot \cos \omega t) \times \cos \omega t - B \cdot az \quad (1),$$

$$y1=(r+B \cdot C \cdot az) \times (1+A \cdot \omega z+A \cdot C \cdot \omega y \cdot \sin \omega t) \times \sin \omega t - B \cdot ay \quad (2),$$

$$x2=(r+B \cdot C \cdot az) \times (1-A \cdot \omega z-A \cdot C \cdot \omega x \cdot \cos \omega t) \times \cos \omega t - B \cdot ax \quad (3),$$

$$y2=(r+B \cdot C \cdot az) \times (1-A \cdot \omega z-A \cdot C \cdot \omega y \cdot \sin \omega t) \times \sin(-\omega t - B \cdot ay) \quad (4),$$

where A, B and C are constants.

As described above, the signals which correspond to these respective coordinates are produced at the respective output terminals Vx1, Vy1, Vx2 and Vy2 shown in FIG. 19.

The first high-pass filter 327 cuts a direct-current component from the signal x1 produced at the output terminal Vx1, and the output signal of the first high-pass filter 327 is averaged by the first average-per-cycle circuit 331. The output signal of the first average-per-cycle circuit 331 becomes:

$$(1+B \cdot C \cdot az) \times (1A \cdot \omega z).$$

Similarly, the second high-pass filter 328 cuts a direct-current component from the signal y1 produced at the output terminal Vy1, and the output signal of the second high-pass filter 328 is averaged by the second average-per-cycle circuit 332. The output signal of the second average-per-cycle circuit 332 becomes:

$$(1+B \cdot C \cdot az) \times (1+A \cdot \omega z).$$

The third high-pass filter 329 cuts a direct-current component from the signal x2 produced at the output terminal Vx2, and the output signal of the third high-pass filter 329 is averaged by the third average-per-cycle circuit 333. The output signal of the third average-per-cycle circuit 333 becomes:

$$(1+B \cdot C \cdot az) \times (1-A \cdot \omega z).$$

Similarly, the fourth high-pass filter 330 cuts a direct-current component from the signal y2 produced at the output terminal Vy2, and the output signal of the fourth high-pass filter 330 is averaged by the fourth average-per-cycle circuit 334. The output signal of the fourth average-per-cycle circuit 334 becomes:

$$(1+B \cdot C \cdot az) \times (1-A \cdot \omega z).$$

The first adding circuit 33 adds together the output signals of the first and second average-per-cycle circuits 331 and 332, and provides an output expressed as:

$$2 \times (1+B \cdot C \cdot az) \times (1+A \cdot \omega z).$$

The second adding circuit 336 adds together the output signals of the third and fourth average-per-cycle circuits 333 and 334, and provides an output expressed as:

$$2 \times (1+B \cdot C \cdot az) \times (1-A \cdot \omega z).$$

The third adding circuit 337 adds together the output signals of the first and second average-per-cycle circuits 335 and 336, and provides an output expressed as:

$$4 \times (1+B \cdot C \cdot az).$$

This signal is offset by the first direct current circuit 338 and the outputs of the first direct current circuit 338 is amplified with a predetermined amplification factor by the first gain adjusting circuit 339, whereby a signal corresponding to the acceleration az in the Z-axis direction which is applied to the sensor can be obtained at a terminal Vaz.

In the meantime, the first subtracting circuit 340 subtracts the output signal of the second adding circuit 336 from the output signal of the first adding circuit 335, and provides an output expressed as:

$$4 \times (1+B \cdot C \cdot az) \times A \cdot \omega z.$$

This signal is divided by $(4 \times (1+B \cdot C \cdot az))$ in the first signal processing circuit 341 on the basis of az which is the output signal of the first gain adjusting circuit 339, and the output signal of the first signal processing circuit 341 is amplified with a predetermined amplification factor by the second gain adjusting circuit 342, whereby a signal corresponding to the angular velocity ωz about the Z axis, which is applied to the sensor, can be obtained at a terminal Vωz.

The fourth adding circuit 343 calculates the sum of x1 and x2, and the output signal of the fourth adding circuit 343 becomes:

$$(r+B \cdot C \cdot az) \times \cos \omega t - 2 \cdot B \cdot ax.$$

The first low-pass filter 344 cuts a direct-current component from this signal, and the sign and gain of the output signal of the first low-pass filter 344 are adjusted by the third gain adjusting circuit 345, whereby a signal corresponding to the acceleration ax in the X-axis direction, which is applied to the sensor, can be obtained at a terminal Vax.

On the basis of the oscillating signal xinl for the X-axis direction of the first oscillating body 29, the acceleration az in the Z-axis direction, which is outputted from the above-described first gain adjusting circuit 339, the angular velocity ωz about the Z axis, which is outputted from the second gain adjusting circuit 342, and the acceleration ax in the X-axis direction, which is outputted from the third gain adjusting circuit 345, the second signal processing circuit 346 generates a signal corresponding to:

$$(r+B \cdot C \cdot az) \times (1+A \cdot \omega z) \times \cos \omega t - B \cdot ax.$$

The second subtracting circuit 350 subtracts the output signal of the second signal processing circuit 346 from the signal x1 which corresponds to the inclination of the first oscillating body 29 in the X-axis direction (and also corresponds to the coordinates of the free end of the first oscillator 2).

The first variable gain adjusting circuit 354 divides the output of the second subtracting circuit 350 by $((r+B \cdot C \cdot az) \times$ A·C) on the basis of the signal az which is inputted from the first gain adjusting circuit 339, and the output signal of the first variable gain adjusting circuit 354 becomes:

$$(x1-(r+B\cdot C\cdot az)\times(1+A\cdot\omega z)\times\cos\omega t - B\cdot ax)/(r+B\cdot C\cdot az)\cdot A\cdot C)$$

From Equation (1), this corresponds to:

$$\omega x\cdot\cos^2\omega t.$$

On the basis of the oscillating signal xin2 for the X-axis direction of the second oscillating body 30, the acceleration az in the Z-axis direction, which is outputted from the above-described first gain adjusting circuit 339, the angular velocity coz about the Z axis, which is outputted from the second gain adjusting circuit 342, and the acceleration ax in the X-axis direction, which is outputted from the third gain adjusting circuit 345, the fourth signal processing circuit 348 generates a signal corresponding to:

$$(r+B\cdot C\cdot az)\times(1-A\cdot\omega z)\times\cos\omega t - B\cdot ax.$$

The fourth subtracting circuit 352 subtracts the output signal of the fourth signal processing circuit 348 from the signal x2 which corresponds to the inclination of the second oscillating body 30 in the X-axis direction (and also corresponds to the coordinates of the free end of the second oscillator 7).

The second variable gain adjusting circuit 357 divides the output of the fourth subtracting circuit 352 by ((r+B·C·az)× A·C) on the basis of the signal az which is inputted from the first gain adjusting circuit 339, and the output signal of the second variable gain adjusting circuit 357 becomes:

$$(x2-((r+B\cdot C\cdot az)\times(1-A\cdot\omega z)\times\cos\omega t - B\cdot ax))/(r+B\cdot C\cdot az)\cdot A\cdot C).$$

From Equation (3), this corresponds to:

$$-\omega x\cdot\cos^2\omega t.$$

The sixth subtracting circuit 362 calculates the difference between the output signal of the first variable gain adjusting circuit 354 and the output signal of the second variable gain adjusting circuit 357 and the output signal of the sixth subtracting circuit 362 is passed through the fourth low-pass filter 363, whereby a signal corresponding to the angular velocity ωx, which is applied to the sensor, can be obtained at the terminal Vωx.

On the basis of the oscillating signal yin1 for the Y-axis direction of the first oscillating body 29, the acceleration az in the Z-axis direction, which is outputted from the above-described first gain adjusting circuit 339, and the angular velocity ωz about the Z axis, which is outputted from the second gain adjusting circuit 342, the third gain adjusting circuit 347 generates a signal corresponding to:

$$(r+B\cdot C\cdot az)\times(1+A\cdot\omega z)\times\sin\omega t.$$

The third subtracting circuit 351 subtracts the output signal of the third signal processing circuit 347 from the signal y1 which corresponds to the inclination of the first oscillating body 29 in the Y-axis direction (and also corresponds to the coordinates of the free end of the first oscillator 2). The output signal of the third subtracting circuit 351 becomes:

$$(r+B\cdot C\cdot az)\times A\cdot C\cdot\omega y\cdot\sin^2\omega - B\cdot ay.$$

The fifth high-pass filter 355 eliminates the direct-current component of the output signal of the third subtracting circuit 351, and the output signal of the fifth high-pass filter 355 is applied to the input terminal of the first averaging circuit 360.

The second low-pass filter 356 eliminates the alternating-current component of the output signal of the third subtracting circuit 351, and the output signal of the second low-pass filter 356 is applied to the input terminal of the second averaging circuit 361.

On the basis of the oscillating signal yin2 for the Y-axis direction of the second oscillating body 30, the acceleration az in the Z-axis direction, which is outputted from the above-described first gain adjusting circuit 339, and the angular velocity ωz about the Z axis, which is outputted from the second gain adjusting circuit 342, the fifth signal processing circuit 349 generates a signal corresponding to:

$$-(r+B\cdot C\cdot az)\times(1-A\cdot\omega z)\times\sin\omega t.$$

The fifth subtracting circuit 353 subtracts the output signal of the fifth signal processing circuit 349 from the signal y2 which corresponds to the inclination of the second oscillating body 30 in the Y-axis direction (and also corresponds to the coordinates of the free end of the second oscillator 7). From Equation (4), the output signal of the fifth subtracting circuit 353 becomes:

$$(r+B\cdot C\cdot az)\times A\cdot C\cdot y\cdot\sin^2\omega - B\cdot ay.$$

The sixth high-pass filter 358 eliminates the direct-current component of the output signal of the fifth subtracting circuit 353, and the output signal of the sixth high-pass filter 358 is applied to the input terminal of the first averaging circuit 360.

The third low-pass filter 359 eliminates the alternating-current component of the output signal of the fifth subtracting circuit 353, and the output signal of the third low-pass filter 359 is applied to the input terminal of the second averaging circuit 361.

The first averaging circuit 360 averages the input signals to eliminate their high-frequency components, performs amplification with a predetermined amplification factor, and provides the result to the output terminal.

From Equation (2), the signal inputted to the first averaging circuit 360 from the fifth high-pass filter 355 becomes a signal corresponding to:

$$(r+B\cdot C\cdot az)\times A\cdot C\cdot\omega y\cdot\sin^2\omega.$$

similarly, from Equation (4), the signal inputted to the second averaging circuit 361 from the third low-pass filter 359 becomes a signal corresponding to:

$$(r+B\cdot C\cdot az)\times A\cdot C\cdot\omega y\cdot\sin^2\omega.$$

Therefore, a signal corresponding to the angular velocity ωy about the Y axis, which is applied to the sensor, can be obtained at the terminal Vωy through the first averaging circuit 360.

The second averaging circuit 361 averages the input signals, performs amplification with a predetermined amplification factor, and provides the result to the output terminal.

From Equation (2), the signal inputted to the second averaging circuit 361 from the second low-pass filter 356 is:

$$-B\cdot ay.$$

Similarly, from Equation (4), the signal inputted to the second averaging circuit 361 from the third low-pass filter 359 is:

$$-B\cdot ay.$$

Therefore, a signal corresponding to the acceleration ay in the Y-axis direction, which is applied to the sensor, can be obtained at the terminal Vay through the second averaging circuit 361.

In the above-described seventh embodiment of the present invention, the signal x1 corresponding to the inclination of the first oscillating body 29 in the X-axis direction, the signal y1 corresponding to the inclination of the first oscillating body 29 in the Y-axis direction, the signal x2 corresponding to the inclination of the second oscillating body 30 in the X-axis direction and the signal y2 corresponding to the inclination of the second oscillating body 30 in the Y-axis direction are respectively passed through the corresponding high-pass filters and then through the corresponding average-per-cycle circuits. After that, the sum of the X-axis direction signal and the Y-axis direction signal of each of the first and second oscillating bodies 29 and 30 is calculated, whereby an acceleration in the Z-axis direction and an angular velocity about the Z axis can be detected on the basis of the sum signals of the respective first and second oscillating bodies 29 and 30. However, another circuit construction may also be adopted. For example, the signal x1 corresponding to the inclination of the first oscillating body 29 in the X-axis direction, the signal y1 corresponding to the inclination of the first oscillating body 29 in the Y-axis direction, the signal x2 corresponding to the inclination of the second oscillating body 30 in the X-axis direction and the signal y2 corresponding to the inclination of the second oscillating body 30 in the Y-axis direction are respectively passed through the corresponding high-pass filters, and thereafter, the sum of the X-axis direction signal and the Y-axis direction signal of each of the first and second oscillating bodies 29 and 30 is calculated and the obtained sum signals are respectively passed through average-per-cycle circuits, whereby an acceleration in the Z-axis direction and an angular velocity about the Z axis can be de-tected on the basis of the sum signals of the respective first and second oscillating bodies 29 and 30.

Figure 21:
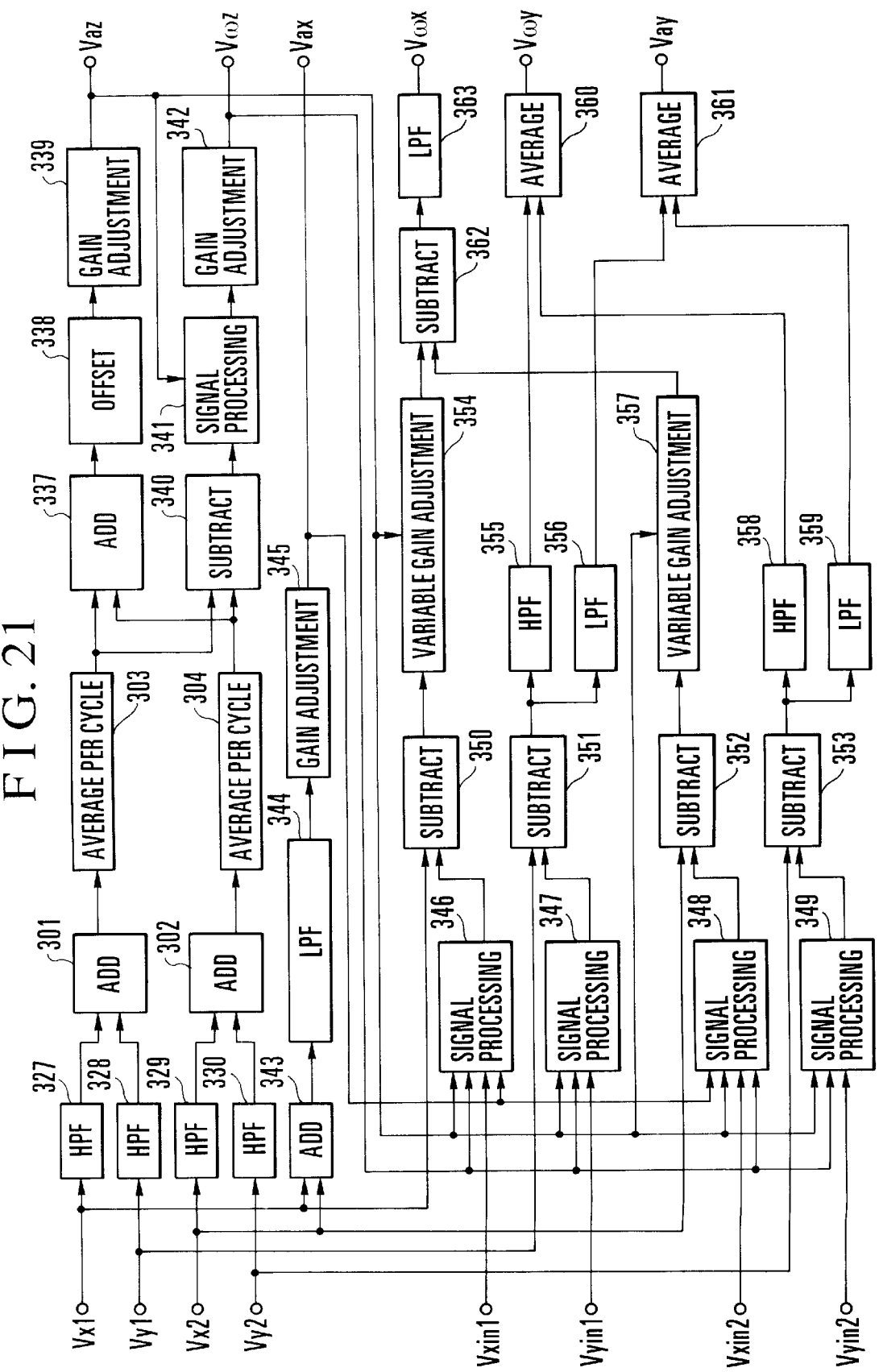
FIG. 21 is a block diagram showing the construction of a detecting circuit of a sensor according to the eighth embodiment of the present invention.

FIG. 21 is a block diagram showing an eighth embodiment of the present invention which includes a detecting circuit having the above-described circuit arrangement.

In FIG. 21, identical reference numerals are used to denote constituent elements identical to the above-described ones incorporated in the seventh embodiment, and the description thereof is omitted. In the eighth embodiment, the oscillating bodies are identical to those used in the first embodiment of the present invention shown in FIG. 1.

In FIG. 21, reference numeral 301 denotes a first adding circuit, and reference numeral 302 denotes a second adding circuit. Each of the first and second adding circuits 301 and 302 has first and second input terminals and one output terminal, and adds together signals applied to its first and second input terminals and provides the obtained signal to the output terminal. Each of first and second average-per-cycle circuits 303 and 304 outputs a signal approximately corresponding to an average value per cycle of the swivel motion of the corresponding one of the first and second oscillating bodies 29 and 30.

As described previously in connection with the seventh embodiment, if the acceleration ax in the X-axis direction, the acceleration ay in the Y-axis direction, the acceleration az in the Z-axis direction, the angular velocity ωx about the X-axis direction, the angular velocity ωy in the Y-axis direction, and the angular velocity ωz in the Z-axis direction act on the first oscillator 2 and the second oscillator 7, the coordinates (x1, y1) and the coordinates (x2, y2) are expressed as:

$$x1 = (r + B \cdot C \cdot az) \times (1 + A \cdot \omega z + A \cdot C \cdot \omega x \cdot \cos\omega t) \times \cos\omega t - B \cdot ax \qquad (5)$$

$$y1 = (r + B \cdot C \cdot az) \times (1 + A \cdot \omega z + A \cdot C \cdot \omega y \cdot \sin\omega t) \times \sin\omega t - B \cdot ay \qquad (6)$$

$$x2 = (r + B \cdot C \cdot az) \times (1 - A \cdot \omega z - A \cdot C \cdot \omega x \cdot \cos\omega t) \times \cos\omega t - B \cdot ax \qquad (7)$$

$$y2 = (r + B \cdot C \cdot az) \times (1 - A \cdot \omega z - A \cdot C \cdot \omega y \cdot \sin\omega t) \times \sin(-\omega t) - B \cdot ay \qquad (8)$$

where A, B and C are constants.

As described above, the signals which correspond to these respective coordinates are produced at the respective output terminals Vx1, Vy1, Vx2 and Vy2.

These signals are respectively inputted to the first, second, third and fourth high-pass filter 327, 328, 329 and 330, which respectively provide output signals $V_{327}$, $V_{328}$, $V_{329}$ and $V_{330}$ expressed as:

$$V_{327} = (r + B \cdot C \cdot az) \times (1 + A \cdot \omega z + A \cdot C \cdot \omega x \times \cos\omega t) \times \cos\omega t,$$

$$V_{328} = (r + B \cdot C \cdot az) \times (1 + A \cdot \omega z + A \cdot C \cdot \omega y \cdot \sin\omega t) \times \sin\omega t,$$

$$V_{329} = (r + B \cdot C \cdot az) \times (1 - A \cdot \omega z - A \cdot C \cdot \omega x \cdot \cos\omega t) \times \cos\omega t,$$

$$V_{330} = (r + B \cdot C \cdot az) \times (1 - A \cdot \omega z - A \cdot C \cdot \omega y \cdot \sin\omega t) \times \sin(-\omega t).$$

The first adding circuit 301 adds together the signals inputted from the first and second high-pass filters 327 and 328, and provides an output signal $V_{301}$ expressed as:

$$V_{301} = (r+B \cdot C \cdot az) \times (1+A \cdot \omega z) \times (\cos \omega t + \sin \omega t) + A \cdot C \times (\omega x \cdot \cos^2 \omega t + \omega y \cdot \sin^2 \omega t),$$

and the second adding circuit 302 adds together the signals inputted from the third and fourth high-pass filters 329 and 330, and provides an output signal $V_{302}$ expressed as:

$$V_{302} = (r + B \cdot C \cdot az) \times (1 - A \cdot \omega z) \times (\cos\omega t + \sin\omega t) - A \cdot C \times (\omega x \cdot \cos^2\omega t + \omega y \cdot \sin^2\omega t).$$

The first and second average-per-cycle circuits 303 and 304 respectively average these signals $V_{301}$ and $V_{302}$ and provides output signals $V_{303}$ and $V_{304}$ expressed as:

$$V_{303} = (r+B \cdot C \cdot az) \times (1+A \cdot \omega z),$$

$$V_{304} = (r+B \cdot C \cdot az) \times (1+A \cdot \omega z),$$

These signals $V_{303}$ and $V_{304}$ are added together by the third adding circuit 337 similar to that used in the seventh embodiment, the output signal of the third adding circuit 337 is offset by the first direct current circuit 338, the output signal of the first direct current circuit 338 is amplified with a predetermined amplification factor by the first gain adjusting circuit 339, whereby a signal corresponding to the acceleration az in the Z-axis direction, which is applied to the sensor, can be obtained at the terminal az.

The output signals $V_{303}$ and $V_{304}$ of the first and second average-per-cycle circuits 303 and 304 are subjected to subtraction in the first subtracting circuit 340 in a manner similar to that of the seventh embodiment, and the first signal processing circuit 341 divides the output signal of the first subtracting circuit 340 by (4×(1+B·C·az)) on the basis of az which is the output signal of the first gain adjusting circuit 339, and the output signal of the first signal processing circuit 341 is amplified with a predetermined amplification factor by the second gain adjusting circuit 342, whereby a signal corresponding to the angular velocity ωz about the Z axis, which is applied to the sensor, can be obtained at the terminal Vωz.

In the above-described eighth embodiment of the present invention, since the number of average-per-cycle circuits to be used can be reduced, it is possible to realize detection insusceptible to the influence of the dispersion of the characteristics of the circuits.

A ninth embodiment of the present invention will be described below.

Although in each of the above-described seventh and eighth embodiments of the present invention, a variation in the oscillation state of each of the oscillators is subjected to signal processing to obtain a detection signal, it is also possible to adopt a so-called servo type of sensor arrangement which controls each oscillator to cause it to make a constant oscillation, by using a control signal, and processes the control signal to obtain an angular velocity signal and an acceleration signal.

Furthermore, although the seventh and eighth embodiments of the present invention are assumed to be manufactured by normal machining, it is also possible to manufacture the sensor according to the present invention by using a so-called micromachining technique to which a semiconductor manufacturing technique is applied.

Incidentally, the mechanical construction of the ninth embodiment is identical to that shown in FIG. 15.

The circuit arrangement of the ninth embodiment will be described below with reference to FIG. 22. Incidentally, identical reference numerals are used to denote constituent elements identical to those shown in FIG. 15.

The circuit arrangement shown in FIG. 22 includes an oscillation circuit 414, a sine-wave generating circuit 415, a cosine-wave generating circuit 417, servo circuits 471, 472, 473 and 474, inverting amplifier circuits 417, 418, 419 and 420, bias resistors 501, 502, 503, 504, 505, 506, 507 and 508, differential amplification circuits 424, 425, 426 and 427, computational processing circuits 428, 429, 430 and 431, and an inverting amplifier circuit 432.

The first, second, third and fourth servo circuits 471, 472, 473 and 474 are well-known servo circuits each of which has first and second input terminals and one output terminal and outputs the difference between signals applied to the first and second input terminals.

The first, second, third and fourth differential amplifying circuits 424, 425, 426 and 427 are well-known differential amplifying circuits each of which has first and second input terminals and one output terminal. Connected to each of the first and second input terminals are a corresponding piezoresistive element and bias resistor which are associated with the inclination of the first or second oscillator 102 or 107 in the A or B direction, and each of the differential amplifying circuits 424, 425, 426 and 427 output a signal corresponding to the inclination of the first or second oscillator 102 or 107 in the A or B direction.

The first, second, third and fourth computational processing circuits 428, 429, 430 and 431 are well-known adding circuits for converting signals, which are obtained as the output signals of the servo circuits 471 to 474 and correspond to the oscillation loci of the first and second oscillating bodies 401 and 411, into the direction signals of the piezoresistive elements through coordinate conversion. The inverting amplifier circuit 432 is a well-known amplifying circuit which outputs a signal of -sin as the oscillating signal for the second oscillator 107.

The operation of the ninth embodiment of the present invention will be described below.

When the oscillation circuit 414 starts its oscillation, the sine-wave generating circuit 415 outputs a sine wave to the first and second servo circuits 471 and 472. At this time, since neither of the oscillators 102 and 107 has yet oscillated and the respective signals inputted to the first and second servo circuits 471 and 472 from the first and second computational processing circuits 428 and 429 are zeros, the first and second servo circuits 471 and 472 start to supply electrical power to the corresponding fixed electrodes 106a, 106c and 111c, 111a (not shown in FIG. 15) which are respectively provided for oscillating the first and second oscillators 102 and 107. Voltages are applied to the respective fixed electrodes 106a, 106c, 111c and 111a and a Coulomb force acts between the fixed electrodes 106a, 106c, 111c and 111a and the movable electrodes 150a-1, 150c-1, 110c-1 and 110a-1, thereby oscillating each of the first and second oscillators 102 and 107 in the X-axis direction shown in FIG. 15 in a sin-wave manner.

Similarly, the cosine-wave generating circuit 416 outputs a cosine wave to the third and fourth servo circuits 473 and 474. At this time, since neither of the oscillators 102 and 107 has yet oscillated and the respective signals inputted to the third and fourth servo circuits 473 and 474 from the third and fourth computational processing circuits 430 and 431 are zeros, the third and fourth servo circuits 473 and 474 start to supply electrical power to the corresponding fixed electrodes 106b, 106d and 111b, 111d (not shown in FIG. 15) which are respectively provided for oscillating the first and second oscillators 102 and 107. Voltages are applied to the respective fixed electrodes 106b, 106d, 111b and 111d and a Coulomb force acts between the fixed electrodes 106b, 106d, 111b and 111d and the movable electrodes 150b-1, 150d-1, 110b-1 and 110d-1, thereby oscillating each or the first and second oscillators 102 and 107 in the Y-axis direction shown in FIG. 15 in a cos-wave manner. The first oscillator 102 and the second oscillator 107 swivel in directions opposite to each other because the electrodes of each of the oscillators 102 and 107 which are opposed to each other in the X-axis direction are connected in the same polarity, for example, the fixed electrode 106a opposed to the movable electrode 150a-1 and the fixed electrode 111c opposed to the movable electrode 110c-1 are connected to each other.

When the first and second oscillators 102 and 107 start to swivel, the spring portions which elastically support the oscillation bases 103 and 108 of the respective first and second oscillators 102 and 107 are distorted and the respective resistance values of the previously-described piezoresistive elements provided on the spring portions vary. Thus, the first differential amplifying circuit 424 outputs a signal corresponding to the inclination of the first oscillator 102 in the A direction, the second differential amplifying circuit 425 outputs a signal corresponding to the inclination of the second oscillator 107 in the A direction, the third differential amplifying circuit 426 outputs a signal corresponding to the inclination of the first oscillator 102 in the B direction, and the fourth differential amplifying circuit 427 outputs a signal corresponding to the inclination of the second oscillator 107 in the B direction.

The first computational processing circuit 428 adds together the signal corresponding to the inclination of the first oscillator 102 in the A direction, which signal has been inputted from the first differential amplifying circuit 424, and the signal corresponding to the inclination of the first oscillator 102 in B direction, which signal has been inputted from the third computational processing circuit 426, and outputs a signal corresponding to the inclination of the first oscillator 102 in the X-axis direction, to the input terminal of the first servo circuit 471. The first servo circuit 471 controls its output signal to be applied to the corresponding electrode, so that the oscillation of the first oscillator 102 in the X-axis direction becomes an oscillation corresponding to the input signal from the sin-wave generating circuit 415.

Similarly, the second computational processing circuit 429 outputs a signal corresponding to the inclination of the second oscillator 107 in the X-axis direction, the third computational processing circuit 430 outputs a signal corresponding to the inclination of the first oscillator 102 in the Y-axis direction, and the fourth computational processing circuit 431 outputs a signal corresponding to the inclination of the second oscillator 107 in the Y-axis direction. Then, each of the second, third and fourth servo circuits 472, 473 and 474 controls the oscillation of the corresponding one of the first and second oscillators 102 and 107 so that its input sine or cosine waves and an actual oscillation correspond to each other.

At this time, the output signal of each of the first, second, third and fourth servo circuits 471, 472, 473 and 474 is a signal indicative of the difference between the locus of an oscillation based on the oscillating signal and the locus of an actual oscillation of the oscillator 102 or 107. These signals are respectively processed in the detecting circuit 13 shown in the seventh or eighth embodiment, whereby angular velocities about the X axis, the Y axis and the Z axis and accelerations in the X-axis direction, the Y-axis direction and the Z-axis direction are obtained.

As is apparent from the above description, the ninth embodiment of the present invention to which micromachining is applied has the unique effects that not only is it possible to miniaturize the sensor, but also it is unnecessary to limit the number of oscillators to two as described previously and it is also possible to easily manufacture a large number of high-precision oscillators, and also that since it is also possible to average the signals detected from the respective oscillators, precision can be easily enhanced.

In addition, since the piezoresistive elements, which are used for detecting the inclinations of the oscillators, can be constructed integrally with the spring portions, it is possible to reduce the dispersion of natural frequencies due to the adhesion of piezoelectric elements or the like, thereby realizing a higher-precision sensor. In addition, since the piezoresistive elements can be lowered in impedance, it is also possible to obtain a signal having less noise.

In any of the sensors according to the seventh to ninth embodiments, a plurality of oscillators are made to swivel with a predetermined phase difference in directions opposite to each other to detect Coriolis forces and accelerations applied to the respective oscillators, it is possible to provide the effect of detecting angular velocities and accelerations relative to three axes (angular velocities about the X and Y axes and accelerations in the X- and Y-axis directions as well as an angular velocity about the Z axis and an acceleration in the Z-axis direction) with a high sensitivity and at a high S/N ratio.

In any of the above-described seventh to ninth embodiments, the sensor is arranged to obtain angular velocities about three X, Y and Z axes, and since the sensor has a signal processing circuit system which includes, for example, the constituent elements from the high-pass filter 327 to the second gain adjusting circuit 342 as shown in FIG. 20, the sensor can be constructed as a sensor capable of obtaining an angular velocity signal relative to the Z axis (a detection axis extending in the same direction as the longitudinal direction of each oscillator) with high detection accuracy. Incidentally, the structure of the oscillator is not limited to that shown in FIG. 1 or 15, and it is possible to use a conventional oscillator which is supported at its opposite ends (which may have a shape other than a pillar-like shape).

A sensor capable of detecting angular velocities about three axes is disclosed in Japanese Laid-Open Application No. Hei 6-147903. If such sensor is given the construction of any of the above-described embodiments, the sensor becomes able to obtain a highly accurate angular velocity signal free from the influence of acceleration. similarly, the sensor also becomes able to obtain highly accurate signals indicative of accelerations in three-axis directions free from the influence of angular velocity. If the sensor disclosed in Japanese Laid-Open Patent Application No. Hei 6-147903 is produced by micromachining, oscillators each having a longitudinal direction extending in the thickness direction of a sensor chip need to be produced and the sensor ship will become thick, so that the sensor will become difficult to manufacture. However, any of the above-described embodiments can realize a sensor in which such problem can be solved.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, although any of the above-described embodiments is provided with two oscillators (oscillating bodies), the present invention is not limited to any of the above-described embodiments, and is also applicable to a sensor having two or more oscillators. For example, in the case of a sensor having first to fourth oscillators, it is possible to obtain highly accurate angular velocity signals (acceleration signals) compared to a sensor having two oscillators, by outputting, to the signal processing system shown in FIGS. 3, 16 and the like, a signal obtained by adding and averaging signals indicative of the inclinations of the first and third oscillators about their detection axes (or in their detection-axis directions) and a signal obtained by adding and averaging signals indicative of the inclinations of the second and fourth oscillators about their detection axes (or in their detection-axis directions) (because it is possible to reduce the structural difference between individual oscillators to be paired or the dispersion of the characteristics of elements or resistors and the like, by averaging the output signals.)

In each of the above-described embodiments, the sensor is arranged to detect angular velocities about two axes and accelerations in two-axis directions, but the sensor according to the present invention may have a structure such as a structure for detecting an angular velocity about one axis and an acceleration in a one-axis direction or a structure for detecting an angular velocity about one axis and accelerations in two-axis directions. Specifically, for example, the oscillators shown in FIG. 1 may be oscillated in directions opposite to each other in only the X-axis direction to obtain angular velocity signals about the X axis and acceleration signals in the X-axis direction.

The signal processing systems used in the fourth to sixth embodiments are not necessarily effective only when used with oscillators each supported at one end as shown in FIG. 1 or 15. Even in the case of a sensor having oscillators each supported at opposite ends (the shape of each of the oscillators may be limited to not only a pillar-like shape but may also be a spherical shape supported in a planar manner) or a sensor having oscillators each supported at one end in a reverse direction, it is possible to achieve effects and advantages similar to those of the fourth to sixth embodiments described previously.

The present invention can also be carried out by combining the above-described embodiments or technical elements thereof, as required.

The present invention may also be applicable to one apparatus constituted by the whole or part of the appended claims or the whole or part of the arrangement and construction of any of the embodiments, an apparatus connectable to other equipment, or an element which constitutes part of an apparatus.

Incidentally, the term "predetermined swivel locus" used in the following claims means the plane of a swivel locus which is drawn by an oscillator when neither an angular velocity nor an acceleration is being applied.

What is claimed is:

1. A sensor comprising:

(A) a sensor substrate, (B) a plurality of columnar weight portions;

(C) support parts, provided on said sensor substrate, each of which supports at one end a respective one of said plurality of said columnar weight portions on one surface of said sensor substrate, and (D) a driving part which supplies driving power to said support parts to swivel said plurality of columnar weight portions, said driving part swiveling at least one weight portion of said plurality of weight portions in a clockwise direction and swiveling at least another one weight portion in a counterclockwise direction so that the angular velocity about a predetermined detection axis parallel to a predetermined swivel locus of said columnar weight portion, excluding an acceleration component in the predetermined detection axis direction in a plane parallel to the predetermined swivel locus at the columnar weight portion, can be detected from the difference between a deviation of a swivel locus of said columnar weight portion from the predetermined swivel locus and a deviation of a swivel locus of said remaining columnar weight portion from a predetermined swivel locus thereof.

2. A sensor comprising:

(A) a sensor substrate, (B) a plurality of columnar weight portions, (C) support parts, provided on said sensor substrate, each of which supports at one end a respective one of said plurality of columnar weight portions on one surface of said sensor substrate, and (D) a driving part which supplies driving power to said support parts to swivel said plurality of columnar weight portions, said driving part swiveling at least one weight portion of said plurality of weight portions in a clockwise direction and swiveling at least another weight portion in a counterclockwise direction so that an angular velocity about two predetermined detection axes parallel to a predetermined swivel locus of said columnar weight portion, excluding an acceleration component in the two predetermined detection axes directions in a plane parallel to the predetermined swivel locus of the columnar weight portion, can be detected from the difference between a deviation of a swivel locus of said columnar weight portion from the predetermined swivel locus and a deviation of a swivel locus of said remaining columnar weight portion from a predetermined swivel locus thereof.

3. A sensor comprising:

(A) a sensor substrate, (B) a plurality of columnar weight portions, (C) support parts, provided on said sensor substrate, each of which supports at one end a respective one of said plurality of columnar weight portions on one surface of said sensor, and (D) a driving part which supplies driving power to said support parts to swivel said plurality of columnar weight portions, said driving part swiveling at least one weight portion of said plurality of weight portions in a clockwise direction and swiveling at least another one weight portion in a counterclockwise direction plurality of columnar weight portions relative to said sensor substrate, and a remaining columnar weight portion, which serves as a second weight portion in a second direction opposite to said so that an acceleration in the direction of a predetermined detection axis parallel to a predetermined swivel locus of said columnar weight portion, excluding an acceleration component about the direction of said predetermined detection axis in a plane parallel to said predetermined swivel locus of said columnar weight portion, can be detected from the sum of a deviation of a swivel locus of said at least one columnar weight portion from the predetermined swivel locus and a deviation of a swivel locus of said remaining columnar weight portion from a predetermined swivel locus thereof.

4. A sensor comprising:

(A) a sensor substrate, (B) a plurality of columnar weight portions, (C) support parts, provided on said sensor substrate, each of which supports at one end and a respective one of said plurality of columnar weight portions on one surface of said sensor substrate, and (D) a driving part which supplies driving power to said support parts to swivel said plurality of columnar weight portions, said driving part swiveling at least one weight portion of said plurality of weight portions in a clockwise direction and swiveling at least another one weight portion in a counterclockwise direction so that accelerations in the directions of two predetermined detection axes parallel to a predetermined swivel locus of said columnar weight portion, excluding an angular velocity component about said two predetermined detection axes in a plane parallel to the predetermined swivel locus of said columnar weight portions can be detected from the sum of a deviation of a swivel locus of said at least one columnar weight portion from the predetermined swivel locus and a deviation of a swivel locus of said remaining columnar weight portion from a predetermined swivel locus thereof.

5. A sensor according to claim 1, further comprising:

a detector which detects a force which acts on said columnar weight portion swiveling in the clockwise direction and a force which acts on said columnar weight portion swiveling in the counterclockwise direction, and outputs a signal required for obtaining the angular velocity about the predetermined detection axis, said detector being provided in said support parts.

6. A sensor according to claim 1, further comprising:
a detector which detects a Coriolis force that acts on each of said columnar weight portions in a direction perpendicular to a swiveling direction of each of said columnar weight portions, and outputs a signal required for obtaining the angular velocity about the predetermined detection axis, said detector being provided in said support parts.

7. A sensor according to claim 1, further comprising:
a detector which detects whether the swivel locus of each of said columnar weight portions is distorted in a longitudinal direction thereof, and outputs a signal required for obtaining the angular velocity about the predetermined detection axis, said detector being provided in said support parts.

8. A sensor according to claim 2, further comprising:
a detector which detects a force which acts on said columnar weight portion swiveling in the clockwise direction and a force which acts on said columnar weight portion swiveling in the counterclockwise direction, and outputs a signal required for obtaining the angular velocities about the two predetermined detection axes, said detector being provided in said support parts.

9. A sensor according to claim 2, further comprising:
a detector which detects a Coriolis force which acts on each of said columnar weight portions in a direction perpendicular to a swiveling direction of each of said columnar weight portions, and outputs a signal required for obtaining the angular velocities about the two predetermined detection axes, said detector being provided in said support parts.

10. A sensor according to claim 2, further comprising:
a detector which detects whether the swivel locus of each of said weight portions is distorted in a longitudinal direction thereof, and outputs a signal required for obtaining the angular velocities about the two axes, said detector being provided in said support parts.

11. A sensor according to claim 2, wherein the two predetermined detection axes are first and second detection axes which are perpendicular to each other, in a plane parallel to the predetermined swivel loci of said columnar weight portions which respectively swivel in the clockwise and counterclockwise directions.

12. A sensor according to claim 11, wherein said driving part drives said support parts at a resonant frequency at which to oscillate and bend said support parts in the direction of each of the first and second detection axes which are perpendicular to each other.

13. A sensor according to claim 11, wherein said driving part drives said first and second weight portions so that said weight portions are 0 degrees in phase difference in the direction of the first detection axis and 180 degrees in phase difference in the direction of the second detection axis.

14. A sensor according to claim 13, wherein said detector includes a first detecting element which detects an inclination of said first weight portion in a direction parallel to the first detection axis, a second detecting element which detects an inclination of said first weight portion in a direction parallel to the second detection axis, a third detecting element which detects an inclination of said second weight portion in the direction parallel to the first detection axis, and a fourth detecting element which detects an inclination of said second weight portion in the direction parallel to the second detection axis, said first detecting element and said third detecting element being arranged to output signals of the same polarity with respect to inclinations of said first and second weight portions in the same direction, said second detecting element and said fourth detecting element being arranged to output signals of opposite polarity with respect to inclinations of said second and fourth weight portions in the same direction.

15. A sensor according to claim 13, wherein each of said first to fourth detecting elements includes a piezoelectric element.

16. A sensor according to claim 13, wherein each of said first to fourth detecting elements includes a piezoresistive element.

17. A sensor according to claim 13, wherein each of said first to fourth detecting elements includes a capacitor for detecting a variation in electrostatic capacity.

18. A sensor according to claim 1, wherein the deviation of the swivel locus of each of said columnar weight portions is a displacement in swivel radius of each of said columnar weight portions.

19. A sensor according to claim 2, wherein the deviation of the swivel locus of each of said columnar weight portions is a displacement in swivel radius of each of said columnar weight portions.

20. A sensor according to claim 3, wherein the deviation of the swivel locus of each of said columnar weight portions is a displacement in swivel radius of each of said columnar weight portions.

21. A sensor according to claim 4, wherein the deviation of the swivel locus of each of said weight portions is an inclination of a swivel central axis of each of said weight portions.

22. A sensor comprising:
(A) a plurality of weight portions;
(B) support parts each of which supports at one end a corresponding one of said plurality of weight portions in the same direction or supports the corresponding one of said plurality of weight portions in a planar manner;
(C) a driving part for swiveling at least one of said plurality of weight portions in a first direction and a remaining weight portion in a second direction opposite to the first direction; and
(D) a detecting part for computing a sum of a deviation of a swivel locus of said weight portion which is swiveled in the first direction from a corresponding one of predetermined swivel loci in which said weight portions are respectively swiveled by said driving part and a deviation of a swivel locus of said weight portion which is swiveled in the second direction from a corresponding one of the predetermined swivel loci, and detecting an acceleration in the direction of an axis parallel to the predetermined swivel loci, excluding an angular velocity component about the axis.

23. A sensor comprising:
(A) a plurality of weight portions;
(B) support parts one of which supports at one end at least one of said plurality of weight portions on one side and another of which supports at one end a remaining weight portion on an opposite side;
(C) a driving part for swiveling said at least one of said plurality of weight portions and said remaining weight portion in the same direction; and
(D) a detecting part for computing a sum of a deviation of a swivel locus of said at least one of said plurality of weight portions from a corresponding one of predetermined swivel loci in which said weight portions are respectively swiveled by said driving part and a deviation of a swivel locus of said remaining weight portion from a corresponding one of the predetermined swivel loci, and detecting an acceleration in the direction of an axis parallel to the predetermined swivel loci, excluding an angular velocity component about the axis.

24. A sensor comprising:
(A) a plurality of weight portions;
(B) support parts each of which supports at one end a corresponding one of said plurality of weight portions in the same direction;
(C) a driving part for swiveling at least one of said plurality of weight portions in a first direction and a remaining weight portion in a second direction opposite to the first direction; and
(D) a detecting part for computing a sum of a deviation of a swivel locus of said weight portion which is swiveled in the first direction from a corresponding one of predetermined swivel loci in which said weight portions are respectively swiveled by said driving part and a deviation of a swivel locus of said remaining weight portion which is swiveled in the second direction from a corresponding one of the predetermined swivel loci, and detecting an acceleration in the direction of an axis parallel to the predetermined swivel loci, excluding an angular velocity component about the axis.

25. A sensor according to claim 22, wherein said detecting part computes a difference between the deviation of the swivel locus of said weight portion which is swiveled in the first direction from the corresponding one of the predetermined swivel loci and the deviation of the swivel locus of said weight portion which is swiveled in the second direction from the corresponding one of the predetermined swivel loci, and detects an angular velocity about the axis, excluding an acceleration component in the direction of the axis.

26. A sensor according to claim 23, wherein said detecting part computes a difference between the deviation of the swivel locus of said at least one of said plurality of weight portions from the corresponding one of the predetermined swivel loci and the deviation of the swivel locus of said remaining weight portion from the corresponding one of the predetermined swivel loci, and detects an angular velocity about the axis, excluding an acceleration component in the direction of the axis.

27. A sensor according to claim 24, wherein said detecting part computes a difference between the deviation of the swivel locus of said weight portion which is swiveled in the first direction from the corresponding one of predetermined swivel loci and the deviation of the swivel locus of said remaining weight portion which is swiveled in the second direction from the corresponding one of the predetermined swivel loci, and detects an angular velocity about the axis, excluding an acceleration component in the direction of the axis.

28. A sensor comprising:
(A) a plurality of weight portions;
(B) support parts each of which supports at one end a corresponding one of said plurality of weight portions in the same direction or supports the corresponding one of said plurality of weight portions in a planar manner;
(C) a driving part for swiveling at least one of said plurality of weight portions in a first direction and a remaining weight portion in a second direction opposite to the first direction; and
(D) a detecting part for computing a sum of a deviation of a swivel locus of said weight portion which is swiveled in the first direction from a corresponding one of predetermined swivel loci in which said weight portions are respectively swiveled by said driving part and a deviation of a swivel locus of said remaining weight portion which is swiveled in the second direction from a corresponding one of the predetermined swivel loci, and detecting accelerations in the directions of two axes parallel to the predetermined swivel loci, excluding angular velocity components about the two axes.

29. A sensor comprising:
(A) a plurality of weight portions;
(B) support parts one of which supports at one end at least one of said plurality of weight portions on one side and another of which supports at one end a remaining weight portion on an opposite side;
(C) a driving part for swiveling said at least one of said plurality of weight portions and said remaining weight portion in the same direction; and
(D) a detecting part for computing a sum of a deviation of a swivel locus of said at least one of said plurality of weight portions from a corresponding one of predetermined swivel loci in which said weight portions are respectively swiveled by said driving part and a deviation of a swivel locus of said remaining weight portion from a corresponding one of the predetermined swivel loci, and detecting accelerations in the directions of two axes parallel to the predetermined swivel loci, excluding angular velocity components about the two axes.

30. A sensor comprising:
(A) a plurality of weight portions;
(B) support parts each of which supports at one end a corresponding one of said plurality of weight portions in the same direction;
(C) a driving part for swiveling at least one of said plurality of weight portions in a first direction and a remaining weight portion in a second direction opposite to the first direction; and
(D) a detecting part for computing a sum of a deviation of a swivel locus of said weight portion which is swiveled in the first direction from a corresponding one of predetermined swivel loci in which said weight portions are respectively swiveled by said driving part and a deviation of a swivel locus of said remaining weight portion which is swiveled in the second direction from a corresponding one of the predetermined swivel loci, and detecting accelerations in the directions of two axes parallel to the predetermined swivel loci, excluding angular velocity components about the two axes.

31. A sensor according to claim 28, wherein said detecting part computes a difference between the deviation of the swivel locus of said weight portion which is swiveled in the first direction from the corresponding one of the predetermined swivel loci and the deviation of the swivel locus of said remaining weight portion which is swiveled in the second direction from the corresponding one of the predetermined swivel loci, and detects angular velocities about the two axes, excluding acceleration components in the direction of the two axes.

32. A sensor according to claim 29, wherein said detecting part computes a difference between the deviation of the swivel locus of said at least one of said plurality of weight portions from the corresponding one of the predetermined swivel loci and the deviation of the swivel locus of said remaining weight portion from the corresponding one of the predetermined swivel loci, and detecting angular velocities about the two axes, excluding acceleration components in the directions of the two axes.

33. A sensor according to claim 30, wherein said detecting part computes a difference between the deviation of the swivel locus of said weight portion which is swiveled in the first direction from the corresponding one of the predetermined swivel loci and the deviation of the swivel locus of said remaining weight portion which is swiveled in the second direction from the corresponding one of the predetermined swivel loci, and detects angular velocities about the two axes, excluding accelerations in the directions of the two axes.

34. A sensor according to claim 22, further comprising:

an oscillating signal supplying part which supplies to said driving part an oscillating signal for swiveling said plurality of weight portions in the first and second directions, said detecting part detecting the acceleration by passing through a low-pass filter and an amplifier a computation result signal indicative of a sum of a computation result signal obtained by computing a difference between a component of a force which acts on said weight portion and an oscillation component of the oscillating signal, relative to the direction of the axis parallel to the predetermined swivel locus in which said weight portion is swiveled in the first direction, and a computation result signal obtained by computing a difference between a component of a force which acts on said weight portion and an oscillation component of the oscillating signal, relative to the direction of the axis parallel to the predetermined swivel locus in which said weight portion is swiveled in the second direction.

35. A sensor according to claim 23, further comprising:

an oscillating signal supplying part which supplies to said driving part an oscillating signal for swiveling said plurality of weight portions in the first and second directions, said detecting part detecting the acceleration by passing through a low-pass filter and an amplifier a computation result signal indicative of a sum of a computation result signal obtained by computing a difference between a component of a force which acts on said weight portion and an oscillation component of the oscillating signal, relative to the direction of the axis parallel to the predetermined swivel locus in which said weight portion is swiveled in the first direction, and a computation result signal obtained by computing a difference between a component of a force which acts on said weight portion and an oscillation component of the oscillating signal, relative to the direction of the axis parallel to the predetermined swivel locus in which said weight portion is swiveled in the second direction.

36. A sensor according to claim 24, further comprising:

an oscillating signal supplying part which supplies to said driving part an oscillating signal for swiveling said plurality of weight portions in the first and second directions, said detecting part detecting the acceleration by passing through a low-pass filter and an amplifier a computation result signal indicative of a sum of a computation result signal obtained by computing a difference between a component of a force which acts on said weight portion and an oscillation component of the oscillating signal, relative to the direction of the axis parallel to the predetermined swivel locus in which said weight portion is swiveled in the first direction, and a computation result signal obtained by computing a difference between a component of a force which acts on said weight portion and an oscillation component of the oscillating signal, relative to the direction of the axis parallel to the predetermined swivel locus in which said weight portion is swiveled in the second direction.

37. A sensor comprising:

(A) a plurality of weight portions;

(B) support parts each of which supports at one end a corresponding one of said plurality of weight portions in the same direction;

(C) a driving part for swiveling at least one of said plurality of weight portions in a first direction and a remaining weight portion in a second direction opposite to the first direction; and (D) a detecting part for computing a difference between a spread of a swivel locus of said weight portion which is swiveled in the first direction by said driving part and a spread of a swivel locus of said weight portion which is swiveled in the second direction by said driving part, and detecting an angular velocity about a swivel axis of a predetermined swivel locus in which said weight portions are swiveled by said driving part, excluding an acceleration component in the direction of the swivel axis.

38. A sensor according to claim 37, wherein said detecting part computes an angular velocity component about the swivel axis of the predetermined swivel locus in which said weight portions are swiveled by said driving part, from a difference between a deviation of the swivel locus of said weight portion, which is swiveled in the first direction on an axis parallel to the predetermined swivel locus, from the predetermined swivel locus and a deviation of the swivel locus of said weight portion, which is swiveled in the second direction on the axis, from the predetermined swivel locus.

39. A sensor according to claim 37, wherein said detecting part obtains the deviation of the swivel locus of said weight portion which is swiveled in the first direction and the deviation of the swivel locus of said weight portion which is swiveled in the second direction, as values equivalent to average values per cycle of swivel motions of said respective weight parts.

40. A sensor comprising:

(A) a plurality of weight portions;

(B) support parts each of which supports at one end a corresponding one of said plurality of weight portions in the same direction;

(C) a driving part for swiveling at least one of said plurality of weight portions in a first direction and a remaining weight portion in a second direction opposite to the first direction; and (D) a detecting part for computing a sum of a spread of a swivel locus of said weight portion which is swiveled in the first direction by said driving part and a spread of a swivel locus of said weight portion which is swiveled in the second direction by said driving part, and detecting an acceleration in the direction of a swivel axis of a predetermined swivel locus in which said weight portions are swiveled by said driving part, excluding an angular velocity about the swivel axis.

41. A sensor according to claim 40, wherein said detecting part computes an acceleration component in the direction of the swivel axis of the predetermined swivel locus in which said weight portions are swiveled by said driving part, from a sum of a deviation of the swivel locus of said weight portion, which is swiveled in the first direction on an axis parallel to the predetermined swivel locus, from the predetermined swivel locus and a deviation of the swivel locus of said weight portion, which is swiveled in the second direction on the axis, from the predetermined swivel locus.

42. A sensor according to claim 40, wherein said detecting part obtains the deviation of the swivel locus of said weight portion which is swiveled in the first direction and the deviation of the swivel locus of said weight portion which is swiveled in the second direction, as values equivalent to average values per cycle of swivel motions of said respective weight parts.

43. A sensor comprising:
(A) a plurality of weight portions;
(B) support parts each of which supports at one end a corresponding one of said plurality of weight portions in the same direction or supports the corresponding one of said plurality of weight portions in a planar manner; and
(C) a driving part which supplies driving power to said support parts to swivel said plurality of weight portions, said driving part swiveling at least one weight portion of said plurality of weight portions in a clockwise direction and swiveling the other weight portions in a counterclockwise direction so that an angular velocity about a predetermined detection axis parallel to a predetermined swivel locus of said weight portion, excluding an acceleration component in the predetermined detection axis direction in a plane parallel to the predetermined swivel locus of the weight portion, can be detected from a difference between a deviation of a swivel locus of said at least one weight portion from the predetermined seivel locus and a deviation of a swivel locus of said other weight portions from a predetermined swivel locus thereof.

44. A sensor comprising:
(A) a plurality of weight portions;
(B) support parts each of which supports at one end of corresponding one of said plurality of weight portions in the same direction or supports the corresponding one of said plurality of weight portions in a planar manner; and
(C) a driving part which supplied driving power to said support parts to swivel said plurality of weight portions, said driving part swiveling at least one weight portion of said plurality of weight portions in a clockwise direction and swiveling the other weight portions in a counterclockwise direction so that an angular velocity about two predetermined detection axes parallel to a predetermined swivel locus of said weight portion, excludidng an acceleration component in the two predetermined detection axes directions in a plane parallel to the predetermined swivel locus of the weight portion, can be detected from a difference between a deviation of a swivel locus of said at least one weight portion from the predetermined swivel locus and a deviation of a swivel locus of said other weight portions from a predetermined swivel locus thereof.

45. A sensor comprising:
(A) a plurality of weight portions;
(B) support parts, one of which supports at one end at least one of said plurality of weight portions one one side and another which supports at one end a remaining weight portion on an opposite side; and
(C) a driving part which supplied driving power to said support parts to swivel said plurality of weight portions, said driving part swiveling said at least one weight portion of said plurality of weight portions in a clockwise direction and swiveling said remaining weight portion in a counterclockwise direction so that an angular velocity about a predetermined detection axis parallel to a predetermined swivel locus of said weight portion, excluding an acceleration component in the predetermined detection axis direction in a plane parallel to the predetermined seivel locus of the weight portion, can be detected from a difference between a deviation of a swivel locus of said at least one weight portion from the predetermined swivel locus of said remaining weight portion from a predetermined swivel locus thereof.

46. A sensor comprising:
(A) a plurality of weight portions;
(B) support parts, one of which supports at one end at least one of said plurality of weight portions on one side and another of which supports at one end a remaining weight portion on an opposite side;
(C) a driving part which supplies driving power to said support parts to swivel said plurality of weight portions, said driving part swiveling said at least one weight portion of said plurality of weight portions in a clockwise direction and swiveling said remaining weight portion in a counterclockwise direction so that an angular velocity about two predetermined detection axes parallel to a predetermined swivel locus of said weight portion, excluding an acceleration component in the two predetermined detection axes directions in a plane parallel to the predetermined swivel locus of the weight portion, can be detected from a difference between a deviation of a swivel locus of said at least one weight portion from the predetermined swivel locus and a deviation of a swivel locus of said remaining weight portion from a predetermined swivel locus thereof.

47. A sensor comprising:
(A) a plurality of weight portions;
(B) support parts each of which supports at one end corresponding one of said plurality of weight portions in the same direction or supports the corresponding one of said plurality of weight portions in a planar manner;
(C) a driving part for swiveling at least one of said plurality of weight portions in a first direction and a remaining weight portion in a second direction opposite to the first direction; and
(D) a detecting part computing a difference between the deviation of the swivel locus of said weight portion which is swiveled in the first direction from the corresponding one of the predetermined swivel loci and the deviation of the swivel locus of said weight portion which is swiveled in the second direction from the corresponding one of the predetermined swivel loci, and detecting an angular velocity about an axis parallel to the predetermined swivelloci, excluding an acceleration component in the direction of the axis.

48. A sensor comprising:
(A) a plurality of weight portions;
(B) support parts each of which supports at one end a corresponding one of said plurality of weight portions in the same direction or supports the corresponding one of said plurality of weight portions in a planar manner;
(C) a driving part for swiveling at least one of said plurality of weight portions in a first direction and a remaining weight portion in a second direction opposite to the first direction; and
(D) a detecting part computing a difference between the deviation of the swivel locus of said weight portion which is swiveled in the first direction from the corresponding one of the predetermined swivel loci and the deviation of the swivel locus of said weight portion which is swiveled in the second direction from the corresponding one of the predetermined swivel loci, and detecting an angular velocity about two axes parallel to the predetermined swivel loci, excluding an acceleration component in the direction of the two axes.

49. A sensor comprising:

(A) a plurality of weight portions;

(B) support parts, one of which supports at one end at least one of said plurality of weight portions on one side and another of which supports at one end a remaining weight portion on an opposite side;

(C) a driving part for swiveling at least one of said plurality of weight portions in a first direction and a remaining weight portion in a second direction opposite to the first direction; and (D) a detecting part computing a difference between the deviation of the swivel locus of said weight portion which is swiveled in the first direction from the corresponding one of the predetermined swivel loci and the deviation of the swivel locus of said weight portion which is swiveled in the second direction from the corresponding one of the predetermined swivel loci, and detecting an angular velocity about an axis parallel to the predetermined swivel loci, excluding an acceleration component in the direction of the axis.

50. A sensor comprising:

(A) a plurality of weight portions;

(B) support parts, one of which supports at one end at least one of said plurality of weight portions on one side and another of which supports at one end a remaining weight portion on an opposite side;

(C) a driving part for swiveling at least one of weight portions in a first direction and a remaining weight portion in a second direction opposite to the first direction; and (D) a detecting part computing a difference between the deviation of the swivel locus of said weight portion which is swiveled in the first direction from the corresponding one of the predetermined swivel loci and the deviation of the swivel locus of said weight portion which is swiveled in the second direction from the corresponding one of the predetermined swivel loci, and detecting an angular velocity about two axes parallel to the predetermined swivel loci, excluding an acceleration component in the direction of the two axes.

* * * * *

UNITED STATES PATENT AND TRADEMARK OFFICE
CERTIFICATE OF CORRECTION

PATENT NO. : 6,338,199 B1
DATED : January 15, 2002
INVENTOR(S) : Tatsuo Chigira et al.

It is certified that error appears in the above-identified patent and that said Letters Patent is hereby corrected as shown below:

Column 6,
Line 60, "a-B direction" should read -- a -B direction --.

Column 46,
Line 2, "33" should read -- 335 --.

Column 54,
Line 17, "ship" should read -- chip --.

Column 56,
Line 19, "plurality" should be deleted.
Lines 20-22, should be deleted.
Line 23, "direction opposite to said" should be deleted.

Column 63,
Line 30, "seivel" should read -- swivel --.
Line 35, "of" (second occurrence) should read -- a --.
Line 40, "supplied" should read -- supplies --.
Line 48, "excludidng" should read -- excluding --.

Column 64,
Line 5, "seivel" should read -- swivel --.
Line 37, "end" should read -- end a --.
Line 53, "swivelloci," should read -- swivel loci, --.

Signed and Sealed this

Twenty-second Day of October, 2002

Attest:

JAMES E. ROGAN
Attesting Officer  Director of the United States Patent and Trademark Office